United States Patent
Shteynberg et al.

(10) Patent No.: US 8,410,717 B2
(45) Date of Patent: Apr. 2, 2013

(54) APPARATUS, METHOD AND SYSTEM FOR PROVIDING AC LINE POWER TO LIGHTING DEVICES

(75) Inventors: Anatoly Shteynberg, San Jose, CA (US); Dongsheng Zhou, San Jose, CA (US); Harry Rodriguez, Gilroy, CA (US); Mark Eason, Hollister, CA (US); Bradley M. Lehman, Belmont, MA (US); Stephen F. Dreyer, Santa Clara, CA (US); Thomas J. Riordan, Los Altos, CA (US)

(73) Assignee: Point Somee Limited Liability Company, Dover, DE (US)

( * ) Notice: Subject to any disclaimer, the term of this patent is extended or adjusted under 35 U.S.C. 154(b) by 579 days.

(21) Appl. No.: 12/729,081

(22) Filed: Mar. 22, 2010

(65) Prior Publication Data
US 2010/0308738 A1   Dec. 9, 2010

Related U.S. Application Data

(63) Continuation-in-part of application No. 12/478,293, filed on Jun. 4, 2009, now Pat. No. 8,324,840.

(51) Int. Cl.
*G05F 1/00* (2006.01)
(52) U.S. Cl. ........ 315/291; 315/294; 315/307; 315/360; 315/312; 315/185 R; 315/193
(58) Field of Classification Search .................. 315/121, 315/122, 185 R, 193, 224, 246, 291, 294, 315/297, 307, 308, 312, 320
See application file for complete search history.

(56) References Cited

U.S. PATENT DOCUMENTS

| 6,989,807 | B2 | 1/2006 | Chiang |
| 7,081,722 | B1 | 7/2006 | Huynh |
| 7,276,861 | B1 * | 10/2007 | Shteynberg et al. ......... 315/291 |

(Continued)

FOREIGN PATENT DOCUMENTS

| JP | 2006-147933 A | 6/2006 |
| JP | 4581646 B2 | 9/2010 |

(Continued)

OTHER PUBLICATIONS

International Search Report mailed Aug. 2, 2010, issued in International Application No. PCT/US2010/037206, filed Jun. 3, 2010, 1 page.

*Primary Examiner* — Haiss Philogene
(74) *Attorney, Agent, or Firm* — Christensen O'Connor Johnson Kindness PLLC

(57) ABSTRACT

An apparatus, method, and system are disclosed for providing AC line power to lighting devices such as light emitting diodes ("LEDs"). A representative apparatus comprises: a plurality of LEDs coupled in series to form a first plurality of segments of LEDs; a plurality of switches coupled to the plurality of segments of LEDs to switch a selected segment into or out of a series LED current path in response to a control signal; a current sensor; and a controller which, in response to a first parameter and during a first part of an AC voltage interval, generates a first control signal to switch a corresponding segment of LEDs into the series LED current path; and during a second part of the AC voltage interval, generates a second control signal to switch the corresponding segment of LEDs out of the first series LED current path.

86 Claims, 30 Drawing Sheets

U.S. PATENT DOCUMENTS

| | | |
|---|---|---|
| 7,327,078 B2 | 2/2008 | Setlur |
| 7,439,944 B2 | 10/2008 | Huynh |
| 7,528,551 B2 | 5/2009 | Ball |
| 7,592,755 B2 | 9/2009 | Chen |
| 7,663,598 B2 | 2/2010 | Kim |
| 7,710,047 B2 * | 5/2010 | Shteynberg et al. .......... 315/291 |
| 7,888,881 B2 * | 2/2011 | Shteynberg et al. .......... 315/291 |
| 7,902,771 B2 * | 3/2011 | Shteynberg et al. .......... 315/307 |
| 7,986,107 B2 | 7/2011 | Weaver |
| 8,164,276 B2 | 4/2012 | Kuwabara |
| 8,258,719 B2 * | 9/2012 | Hoogzaad ..................... 315/291 |
| 2008/0116818 A1 | 5/2008 | Shteynberg |
| 2008/0129220 A1 | 6/2008 | Shteynberg |
| 2008/0191642 A1 | 8/2008 | Slot |
| 2009/0079357 A1 | 3/2009 | Shteynberg |
| 2010/0308739 A1 * | 12/2010 | Shteynberg et al. .......... 315/193 |
| 2012/0081009 A1 * | 4/2012 | Shteynberg et al. .......... 315/122 |
| 2012/0299483 A1 * | 11/2012 | Lethellier ..................... 315/121 |

FOREIGN PATENT DOCUMENTS

| | | |
|---|---|---|
| KR | 10-0941195 B1 | 2/2010 |
| KR | 10-0942234 B1 | 2/2010 |
| KR | 10-0943656 B1 | 2/2010 |
| KR | 20-2010-0006345 U | 6/2010 |
| KR | 10-2011-0027177 A | 3/2011 |
| WO | 2005/015529 A2 | 2/2005 |
| WO | 2010/131819 A1 | 11/2010 |
| WO | 2011/010774 A1 | 1/2011 |

* cited by examiner

APPARATUS, METHOD AND SYSTEM FOR PROVIDING AC LINE POWER TO LIGHTING DEVICES

CROSS-REFERENCE TO RELATED APPLICATIONS

This application is a continuation-in-part of and claims priority to Anatoly Shteynberg et al., U.S. patent application Ser. No. 12/478,293, filed Jun. 4, 2009, now U.S. Pat. No. 8,324,840 entitled "Apparatus, Method and System for Providing AC Line Power to Lighting Devices," which is commonly assigned herewith, the entire contents of which are incorporated herein by reference with the same full force and effect as if set forth in its entirety herein, and with priority claimed for all commonly disclosed subject matter.

BACKGROUND

Widespread proliferation of solid state lighting systems (semiconductor, LED-based lighting sources) has created a demand for highly efficient power converters, such as LED drivers, with high conversion ratios of input to output voltages, to provide corresponding energy savings. A wide variety of off-line LED drivers are known, but are unsuitable for direct replacement of incandescent bulbs or compact fluorescent bulbs utilizable in a typical "Edison" type of socket, such as for a lamp or household lighting fixture, which is couplable to an alternating current ("AC") input voltage, such as a typical (single-phase) AC line (or AC mains) used in a home or business.

Early attempts at a solution have resulted in LED drivers which are non-isolated, have low efficiency, deliver relatively low power, and at most can deliver a constant current to the LEDs with no temperature compensation, no dimming arrangements or compatibility with existing dimmer switches, and no voltage or current protection for the LEDs. In order to reduce the component count, such converters may be constructed without isolation transformers by using two-stage converters with the second stage running at a very low duty cycle (equivalently referred to as a duty ratio), thereby limiting the maximum operating frequency, resulting in an increase in the size of the converter (due to the comparatively low operating frequency), and ultimately defeating the purpose of removing coupling transformers. In other instances, the LED drivers utilize high brightness LEDs, requiring comparatively large currents to produce the expected light output, resulting in reduced system efficiency and increased energy costs.

Other LED drivers are overly complicated. Some require control methods that are complex, some are difficult to design and implement, and others require many electronic components. A large number of components results in an increased cost and reduced reliability. Many drivers utilize a current mode regulator with a ramp compensation in a pulse width modulation ("PWM") circuit. Such current mode regulators require relatively many functional circuits, while nonetheless continuing to exhibit stability problems when used in the continuous current mode with a duty cycle or ratio over fifty percent. Various attempts to solve these problems utilized a constant off-time boost converter or hysteretic pulse train booster. While these solutions addressed problems of instability, these hysteretic pulse train converters exhibited other difficulties, such as elevated electromagnetic interference, inability to meet other electromagnetic compatibility requirements, and relative inefficiency. Other attempts provide solutions outside the original power converter stages, adding additional feedback and other circuits, rendering the LED driver even larger and more complicated.

Another proposed solution provides a reconfigurable circuit to provide a number of LEDs in each circuit based on a sensed voltage, but is also overly complicated, with a separate current regulator for each current path, with its efficiency compromised by its requirement of a significant number of diodes for path breaking. Such complicated LED driver circuits result in an increased cost which renders them unsuitable for use by consumers as replacements for typical incandescent bulbs or compact fluorescent bulbs.

Other LED bulb replacement solutions are incapable of responding to different input voltage levels. Instead, multiple, different products are required, each for different input voltage levels (110V, 120V, 220V, 230V).

This is a significant problem in many parts of the world, however, because typical AC input voltage levels have a high variance (of RMS levels), such as ranging from 85V to 135V for what is supposed to be 110V. As a consequence, in such devices, output brightness varies significantly, with a variation of 85V to 135V resulting in a 3-fold change in output luminous flux. Such variations in output brightness are unacceptable for typical consumers.

Another significant problem with devices used with a standard AC input voltage is significant underutilization: because of the variable applied AC voltage, the LEDs are not conducting during the entire AC cycle. More specifically, when the input voltage is comparatively low during the AC cycle, there is no LED current, and no light emitted. For example, there may only be LED current during the approximately middle third of a rectified AC cycle, with no LED current during the first and last 60 degrees of a 180 degree rectified AC cycle. In these circumstances, LED utilization may be as low as twenty percent, which is comparatively very low, especially given the comparatively high costs involved.

There are myriad other issues with prior art attempts at LED drivers for consumer applications. For example, some require the use of a large, expensive resistor to limit the excursion of current, resulting in corresponding power losses, which can be quite significant and which may defeat some of the purposes of switching to solid state lighting.

Accordingly, a need remains for an apparatus, method, and system for supplying AC line power to one or more LEDs, including LEDs for high brightness applications, while simultaneously providing an overall reduction in the size and cost of the LED driver and increasing the efficiency and utilization of LEDs. Such an apparatus, method, and system should be able to function properly over a relatively wide AC input voltage range, while providing the desired output voltage or current, and without generating excessive internal voltages or placing components under high or excessive voltage stress. In addition, such an apparatus, method, and system should provide significant power factor correction when connected to an AC line for input power. Also, it would be desirable to provide such an apparatus, method, and system for controlling brightness, color temperature, and color of the lighting device.

SUMMARY

The representative embodiments of the present disclosure provide numerous advantages for supplying power to non-linear loads, such as LEDs. The various representative embodiments supply AC line power to one or more LEDs, including LEDs for high brightness applications, while simultaneously providing an overall reduction in the size and cost of the LED driver and increasing the efficiency and utilization of LEDs. Representative apparatus, method, and system embodiments adapt and function properly over a relatively wide AC input voltage range, while providing the desired output voltage or current, and without generating excessive internal voltages or placing components under high or excessive voltage stress. In addition, various representative apparatus, method, and system embodiments provide significant power factor correction when connected to an AC line for input power. Representative embodiments also substantially reduce the capacitance at the output of the LEDs, thereby significantly improving reliability. Lastly, various representative apparatus, method, and system embodiments provide the capability for controlling brightness, color temperature, and color of the lighting device.

Indeed, several significant advantages of the representative embodiment should be emphasized. First, representative embodiments are capable of implementing power factor correction, which results both in a substantially increased output brightness and significant energy savings. Second, the utilization of the LEDs is quite high, with at least some LEDs in use during the vast majority of every part of an AC cycle. With this high degree of utilization, the overall number of LEDs may be reduced to nonetheless produce a light output comparable to other devices with more LEDs.

A representative method embodiment is disclosed for providing power to a plurality of light emitting diodes couplable to receive an AC voltage, the plurality of light emitting diodes coupled in series to form a plurality of segments of light emitting diodes each comprising at least one light emitting diode, with the plurality of segments of light emitting diodes coupled to a corresponding plurality of switches to switch a selected segment of light emitting diodes into or out of a series light emitting diode current path. This representative method embodiment comprises: monitoring a first parameter; during a first part of an AC voltage interval, when the first parameter has reached a first predetermined level, switching a corresponding segment of light emitting diodes into the series light emitting diode current path; and during a second part of the AC voltage interval, when the first parameter has decreased to a second predetermined level, switching the corresponding segment of light emitting diodes out of the series light emitting diode current path.

In a representative embodiment, the first parameter is a current level of the series light emitting diode current path. In various representative embodiments, the method may further comprise maintaining the current level of the series light emitting diode current path substantially constant at the first predetermined level. Also in various representative embodiments, the method may further comprise: during the first part of the AC voltage interval, when the first parameter has reached a third predetermined level, switching a next corresponding segment of light emitting diodes into the series light emitting diode current path, and during the second part of the AC voltage interval, when the first parameter has decreased to a fourth predetermined level, switching the corresponding segment of light emitting diodes out of the series light emitting diode current path.

Various representative method embodiments may also further comprise: during the first part of the AC voltage interval, as a light emitting diode current successively reaches a predetermined peak level, successively switching the corresponding segment of light emitting diodes into the series light emitting diode current path; and during the second part of the AC voltage interval, as the AC voltage level decreases to a corresponding voltage level, switching the corresponding segment of light emitting diodes out of the series light emitting diode current path. In various representative embodiments, the switching of the corresponding segment of light emitting diodes out of the series light emitting diode current path is in a reverse order to the switching of the corresponding segment of light emitting diodes into the series light emitting diode current path.

In a representative method embodiment, time or time intervals may be utilized as parameters. For example, the first parameter and the second parameter may be time, or one or more time intervals, or time-based, or one or more clock cycle counts. Also for example, the representative method embodiment may further comprise: determining a first plurality of time intervals corresponding to a number of segments of light emitting diodes for the first part of the AC voltage interval; and determining a second plurality of time intervals corresponding to the number of segments of light emitting diodes for the second part of the AC voltage interval. For such a representative embodiment, the method may further include, during the first part of the AC voltage interval, at the expiration of each time interval of the first plurality of time intervals, switching a next segment of light emitting diodes into the series light emitting diode current path; and during the second part of the AC voltage interval, at the expiration of each time interval of the second plurality of time intervals, in a reverse order, switching the next segment of light emitting diodes out of the series light emitting diode current path.

Various representative method embodiments may also further comprise determining whether the AC voltage is phase modulated, such as by a dimmer switch. Such a representative method embodiment may further comprise, when the AC voltage is phase modulated, switching a segment of light emitting diodes into the series light emitting diode current path which corresponds to a phase modulated AC voltage level; or when the AC voltage is phase modulated, switching a segment of light emitting diodes into the series light emitting diode current path which corresponds to a time interval of the phase modulated AC voltage. In addition, representative method embodiments, when the AC voltage is phase modulated, may further comprise maintaining a parallel light emitting diode current path through a first switch concurrently with switching a next segment of light emitting diodes into the series light emitting diode current path through a second switch.

Various representative method embodiments may also further comprise determining whether the AC voltage is phase modulated. The method may further comprise, when the AC voltage is phase modulated, switching a segment of light emitting diodes into the series light emitting diode current path which corresponds to a phase modulated AC voltage level; when the AC voltage is phase modulated, switching a segment of light emitting diodes into the series light emitting diode current path which corresponds to a phase modulated AC current level; when the AC voltage is phase modulated, switching a segment of light emitting diodes into the series light emitting diode current path which corresponds to a time interval of the phase modulated AC voltage; or when the AC voltage is phase modulated, maintaining a parallel light emitting diode current path through a first switch concurrently with switching a next segment of light emitting diodes into the series light emitting diode current path through a second switch.

Various representative embodiments may also provide for power factor correction. Such a representative method embodiment may further comprise determining whether sufficient time remains in the first part of the AC voltage interval for a light emitting diode current to reach a predetermined peak level if a next segment of light emitting diodes is switched into the series light emitting diode current path, and when sufficient time remains in the first part of the AC voltage interval for the light emitting diode current to reach the predetermined peak level, switching the next segment of light emitting diodes into the series light emitting diode current path. Similarly, when sufficient time does not remain in the first part of the AC voltage interval for the light emitting diode current to reach the predetermined peak level, the representative method embodiment may further include not switching the next segment of light emitting diodes into the series light emitting diode current path.

Also in various representative embodiments, the method may further comprise: switching a first plurality of segments of light emitting diodes to form a first series light emitting diode current path; and switching a second plurality of segments of light emitting diodes to form a second series light emitting diode current path in parallel with the first series light emitting diode current path.

In a representative embodiment, selected segments of light emitting diodes of the plurality of segments of light emitting diodes may each comprise light emitting diodes having light emission spectra of different colors or wavelengths. For such a representative embodiment, the method may further comprise selectively switching the selected segments of light emitting diodes into the series light emitting diode current path to provide a corresponding lighting effect, and/or selectively switching the selected segments of light emitting diodes into the series light emitting diode current path to provide a corresponding color temperature.

In a representative embodiment, an apparatus is disclosed which is couplable to receive an AC voltage, with the apparatus comprising: a rectifier to provide a rectified AC voltage; a plurality of light emitting diodes coupled in series to form a plurality of segments of light emitting diodes; a plurality of switches correspondingly coupled to the plurality of segments of light emitting diodes to switch a selected segment of light emitting diodes into or out of a series light emitting diode current path; a current sensor to sense a light emitting diode current level; and a controller coupled to the plurality of switches and to the current sensor, the controller, during a first part of a rectified AC voltage interval and when the light emitting diode current level has increased to a first predetermined current level, to switch a corresponding segment of light emitting diodes into the series light emitting diode current path; and during a second part of a rectified AC voltage interval and when the light emitting diode current level has decreased to a second predetermined current level, the controller to switch the corresponding segment of light emitting diodes out of the series light emitting diode current path.

In a representative embodiment, the controller further is to maintain the light emitting diode current level substantially constant at the first predetermined level. During the first part of an AC voltage interval, when the light emitting diode current level has reached a third predetermined level, the controller further is to switch a next corresponding segment of light emitting diodes into the series light emitting diode current path, and during a second part of the AC voltage interval, when the light emitting diode current level has decreased to a fourth predetermined level, the controller further is to switch a corresponding segment of light emitting diodes out of the series light emitting diode current path.

In such a representative apparatus embodiment, the apparatus may further comprise a plurality of resistors, each resistor of the plurality of resistors coupled in series to a corresponding switch of the plurality of switches. Each resistor may be coupled on a high voltage side of the corresponding switch, or each resistor may be coupled on a low voltage side of the corresponding switch. The representative apparatus may further comprise a switch and a resistor coupled in series with at least one segment of light emitting diodes of the plurality of segments of light emitting diodes.

In a representative embodiment, an ultimate segment of light emitting diodes of the plurality of segments of light emitting diodes is always coupled in the series light emitting diode current path. The controller may be further coupled to the plurality of segments of light emitting diodes to receive corresponding node voltage levels. In another representative embodiment, at least one switch of the plurality of switches is coupled to the rectifier to receive the rectified AC voltage.

In another representative apparatus embodiment, during the first part of the rectified AC voltage interval, as the light emitting diode current level reaches the predetermined peak level, the controller further may determine and store a corresponding value of the rectified AC voltage level and successively switch a corresponding segment of light emitting diodes into the series light emitting diode current path; and during the second part of a rectified AC voltage interval, as the rectified AC voltage level decreases to a corresponding value, the controller further may switch the corresponding segment of light emitting diodes out of the series light emitting diode current path, and may do so in a reverse order to the switching of the corresponding segments of light emitting diodes into the series light emitting diode current path.

In various representative embodiments, the controller further may determine whether the rectified AC voltage is phase modulated. In such a representative embodiment, the controller, when the rectified AC voltage is phase modulated, further may switch a segment of light emitting diodes into the series light emitting diode current path which corresponds to the rectified AC voltage level, or may switch a segment of light emitting diodes into the series light emitting diode current path which corresponds to a time interval of the rectified AC voltage level. In another representative apparatus embodiment, the controller, when the rectified AC voltage is phase modulated, further may maintain a parallel light emitting diode current path through a first switch concurrently with switching a next segment of light emitting diodes into the series light emitting diode current path through a second switch.

In various representative embodiments, the controller may also implement a form of power factor correction. In such a representative apparatus embodiment, the controller further may determine whether sufficient time remains in the first part of the rectified AC voltage interval for the light emitting diode current level to reach the predetermined peak level if a next segment of light emitting diodes is switched into the series light emitting diode current path. For such a representative embodiment, the controller, when sufficient time remains in the first part of the rectified AC voltage interval for the light emitting diode current level to reach the predetermined peak level, further may switch the next segment of light emitting diodes into the series light emitting diode current path; and when sufficient time does not remain in the first part of the rectified AC voltage interval for the light emitting diode current level to reach the predetermined peak level, the controller further may not switch the next segment of light emitting diodes into the series light emitting diode current path.

In another representative embodiment, the controller further is to switch a plurality of segments of light emitting diodes to form a first series light emitting diode current path, and to switch a plurality of segments of light emitting diodes to form a second series light emitting diode current path in parallel with the first series light emitting diode current path.

In various representative embodiments, the apparatus may operate at a rectified AC voltage frequency of substantially about 100 Hz, 120 Hz, 300 Hz, 360 Hz, or 400 Hz. In addition, the apparatus may further comprise a plurality of phosphor coatings or layers, with each phosphor coating or layer coupled to a corresponding light emitting diode of the plurality of light emitting diodes, and with each phosphor coating or layer having a luminous or light emitting decay time constant between about 2 to 3 msec.

Another representative apparatus is couplable to receive an AC voltage, with the apparatus comprising: a first plurality of light emitting diodes coupled in series to form a first plurality of segments of light emitting diodes; a first plurality of switches coupled to the first plurality of segments of light emitting diodes to switch a selected segment of light emitting diodes into or out of a first series light emitting diode current path in response to a control signal; a current sensor to determine a light emitting diode current level; and a controller coupled to the plurality of switches and to the current sensor, the controller, during a first part of an AC voltage interval and in response to the light emitting diode current level, to generate a first control signal to switch a corresponding segment of light emitting diodes of the first plurality of segments of light emitting diodes into the first series light emitting diode current path; and during a second part of the AC voltage interval and in response to the light emitting diode current level, to switch a corresponding segment of light emitting diodes of the first plurality of segments of light emitting diodes out of the first series light emitting diode current path.

In a representative apparatus embodiment, the apparatus may further comprise: a second plurality of light emitting diodes coupled in series to form a second plurality of segments of light emitting diodes; and a second plurality of switches coupled to the second plurality of segments of light emitting diodes to switch a selected segment of the second plurality of segments of light emitting diodes into or out of a second series light emitting diode current path; wherein the controller is further coupled to the second plurality of switches, and further is to generate corresponding control signals to switch a plurality of segments of the second plurality of segments of light emitting diodes to form the second series light emitting diode current path in parallel with the first series light emitting diode current path. The second series light emitting diode current path may have a polarity opposite the first series light emitting diode current path, or a first current flow through the first series light emitting diode current path has an opposite direction to second current flow through the second series light emitting diode current path.

In yet another of the various representative embodiments, the apparatus may further comprise a current limiting circuit; a dimming interface circuit; a DC power source circuit coupled to the controller, and/or a temperature protection circuit.

Another representative method embodiment is disclosed for providing power to a plurality of light emitting diodes couplable to receive an AC voltage, the plurality of light emitting diodes coupled in series to form a plurality of segments of light emitting diodes each comprising at least one light emitting diode, with the plurality of segments of light emitting diodes coupled to a corresponding plurality of switches to switch a selected segment of light emitting diodes into or out of a series light emitting diode current path. This representative method embodiment comprises: in response to a first parameter during a first part of an AC voltage interval, determining and storing a value of a second parameter and switching a corresponding segment of light emitting diodes into the series light emitting diode current path; and during a second part of the AC voltage interval, monitoring the second parameter and when the current value of the second parameter is substantially equal to the stored value, switching a corresponding segment of light emitting diodes out of the series light emitting diode current path.

In a representative embodiment, the AC voltage comprises a rectified AC voltage, and the representative method further comprises: determining when the rectified AC voltage is substantially close to zero; and generating a synchronization signal. The representative method also may further comprise: determining the AC voltage interval from at least one determination of when the rectified AC voltage is substantially close to zero.

In various representative embodiments, the method may further comprise rectifying the AC voltage to provide a rectified AC voltage. For example, in such a representative embodiment, the first parameter may be a light emitting diode current level and the second parameter may be a rectified AC input voltage level. Other parameter combinations are also within the scope of the claimed disclosure, including LED current levels, peak LED current levels, voltage levels, and optical brightness levels, for example. In such representative embodiments, the method may further comprise: when a light emitting diode current level has reached a predetermined peak value during the first part of the AC voltage interval, determining and storing a first value of the rectified AC input voltage level and switching a first segment of light emitting diodes into the series light emitting diode current path; monitoring the light emitting diode current level; and when the light emitting diode current subsequently has reached the predetermined peak value during the first part of the AC voltage interval, determining and storing a second value of the rectified AC input voltage level and switching a second segment of light emitting diodes into the series light emitting diode current path. (Such predetermined values may be determined in a wide variety of ways, such as specified in advance off line or specified or calculated ahead of time while the circuit is operating, such as during a previous AC cycle). The representative method also may further comprise: monitoring the rectified AC voltage level; when the rectified AC voltage level has reached the second value during the second part of the AC voltage interval, switching the second segment of light emitting diodes out of the series light emitting diode current path; and when the rectified AC voltage level has reached the first value during the second part of the AC voltage interval, switching the first segment of light emitting diodes out of the series light emitting diode current path.

Also in various representative embodiments, the method may further comprise: during the first part of the AC voltage interval, as a light emitting diode current successively reaches a predetermined peak level, determining and storing a corresponding value of the rectified AC voltage level and successively switching a corresponding segment of light emitting diodes into the series light emitting diode current path; and during the second part of the AC voltage interval, as the rectified AC voltage level decreases to a corresponding voltage level, switching the corresponding segment of light emitting diodes out of the series light emitting diode current path. For such a representative method embodiment, the switching of the corresponding segment of light emitting diodes out of the series light emitting diode current path may be in a reverse order to the switching of the corresponding segment of light emitting diodes into the series light emitting diode current path.

In another representative embodiment, the method may further comprise: when a light emitting diode current has reached a predetermined peak level during the first part of the AC voltage interval, determining and storing a first value of the rectified AC input voltage level; and when the first value of the rectified AC input voltage is substantially equal to or greater than a predetermined voltage threshold, switching the corresponding segment of light emitting diodes into the series light emitting diode current path.

In various representative embodiments, the method may further comprise monitoring a light emitting diode current level; during the second part of the AC voltage interval, when the light emitting diode current level is greater than a predetermined peak level by a predetermined margin, determining and storing a new value of the second parameter and switching the corresponding segment of light emitting diodes into the series light emitting diode current path.

In another representative method embodiment, the method may further comprise: switching a plurality of segments of light emitting diodes to form a first series light emitting diode current path; and switching a plurality of segments of light emitting diodes to form a second series light emitting diode current path in parallel with the first series light emitting diode current path.

Various representative embodiments may also provide for a second series light emitting diode current path which has a direction or polarity opposite the first series light emitting diode current path, such as for conducting current during a negative part of an AC cycle, when the first series light emitting diode current path conducts current during a positive part of the AC cycle. For such a representative embodiment, the method may further comprise, during a third part of the AC voltage interval, switching a second plurality of segments of light emitting diodes to form a second series light emitting diode current path having a polarity opposite the series light emitting diode current path formed in the first part of the AC voltage interval; and during a fourth part of the AC voltage interval switching the second plurality of segments of light emitting diodes out of the second series light emitting diode current path.

Another representative embodiment is an apparatus couplable to receive an AC voltage. A representative apparatus comprises: a rectifier to provide a rectified AC voltage; a plurality of light emitting diodes coupled in series to form a plurality of segments of light emitting diodes; a plurality of switches correspondingly coupled to the plurality of segments of light emitting diodes to switch a selected segment of light emitting diodes into or out of a series light emitting diode current path; a current sensor to sense a light emitting diode current level; a voltage sensor to sense a rectified AC voltage level; a memory to store a plurality of parameters; and a controller coupled to the plurality of switches, to the memory, to the current sensor, and to the voltage sensor, during a first part of a rectified AC voltage interval and when the light emitting diode current level has reached a predetermined peak light emitting diode current level, the controller to determine and store in the memory a corresponding value of the rectified AC voltage level and to switch a corresponding segment of light emitting diodes into the series light emitting diode current path; and during a second part of a rectified AC voltage interval, the controller to monitor the rectified AC voltage level and when the current value of the rectified AC voltage level is substantially equal to the stored corresponding value of the rectified AC voltage level, to switch the corresponding segment of light emitting diodes out of the series light emitting diode current path.

In such a representative apparatus embodiment, when the rectified AC voltage level is substantially close to zero, the controller further is to generate a corresponding synchronization signal. In various representative embodiments, the controller further may determine the rectified AC voltage interval from at least one determination of the rectified AC voltage level being substantially close to zero.

In a representative embodiment, the controller, when the light emitting diode current level has reached the predetermined peak light emitting diode current level during the first part of a rectified AC voltage interval, further is to determine and store in the memory a first value of the rectified AC voltage level, switch a first segment of light emitting diodes into the series light emitting diode current path, monitor the light emitting diode current level, and when the light emitting diode current level subsequently has reached the predetermined peak light emitting diode current level during the first part of the rectified AC voltage interval, the controller further is to determine and store in the memory a second value of the rectified AC voltage level and switch a second segment of light emitting diodes into the series light emitting diode current path.

In such a representative apparatus embodiment, the controller further is to monitor the rectified AC voltage level and when the rectified AC voltage level has reached the stored second value during the second part of a rectified AC voltage interval, to switch the second segment of light emitting diodes out of the series light emitting diode current path, and when the rectified AC voltage level has reached the stored first value during the second part of a rectified AC voltage interval, to switch the first segment of light emitting diodes out of the series light emitting diode current path.

In another representative apparatus embodiment, the controller further is to monitor the light emitting diode current level and when the light emitting diode current level has again reached the predetermined peak level during the first part of a rectified AC voltage interval, the controller further may determine and store in the memory a corresponding next value of the rectified AC voltage level and switch a next segment of light emitting diodes into the series light emitting diode current path. In such a representative apparatus embodiment, the controller further may monitor the rectified AC voltage level, and when the rectified AC voltage level has reached the next rectified AC voltage level during the second part of a rectified AC voltage interval, to switch the corresponding next segment of light emitting diodes out of the series light emitting diode current path.

In various representative embodiments, the controller further may monitor a light emitting diode current level; and during the second part of the rectified AC voltage interval, when the light emitting diode current level is greater than a predetermined peak level by a predetermined margin, the controller further may determine and store another corresponding value of the rectified AC voltage level and switch the corresponding segment of light emitting diodes into the series light emitting diode current path.

Also in various representative embodiments, the controller further may switch a plurality of segments of light emitting diodes to form a first series light emitting diode current path, and to switch a plurality of segments of light emitting diodes to form a second series light emitting diode current path in parallel with the first series light emitting diode current path.

As mentioned above, in various representative embodiments, selected segments of light emitting diodes of the plurality of segments of light emitting diodes may each comprise light emitting diodes having light emission spectra of different colors or wavelengths. In such a representative apparatus embodiment, the controller further may selectively switch the selected segments of light emitting diodes into the series light emitting diode current path to provide a corresponding lighting effect, and/or selectively switch the selected segments of light emitting diodes into the series light emitting diode current path to provide a corresponding color temperature.

Another representative apparatus embodiment is also couplable to receive an AC voltage, with the representative apparatus comprising: a first plurality of light emitting diodes coupled in series to form a first plurality of segments of light emitting diodes; a first plurality of switches coupled to the first plurality of segments of light emitting diodes to switch a selected segment of light emitting diodes into or out of a first series light emitting diode current path in response to a control signal; a memory; and a controller coupled to the plurality of switches and to the memory, the controller, in response to a first parameter and during a first part of an AC voltage interval, to determine and store in the memory a value of a second parameter and to generate a first control signal to switch a corresponding segment of light emitting diodes of the first plurality of segments of light emitting diodes into the first series light emitting diode current path; and during a second part of the AC voltage interval, when a current value of the second parameter is substantially equal to the stored value, to generate a second control signal to switch a corresponding segment of light emitting diodes of the first plurality of segments of light emitting diodes out of the first series light emitting diode current path.

In a representative embodiment, the first parameter and the second parameter comprise at least one of the following: a time parameter, or one or more time intervals, or a time-based parameter, or one or more clock cycle counts. In such a representative apparatus embodiment, the controller further may determine a first plurality of time intervals corresponding to a number of segments of light emitting diodes of the first plurality of segments of light emitting diodes for the first part of the AC voltage interval, and may determine a second plurality of time intervals corresponding to the number of segments of light emitting diodes for the second part of the AC voltage interval.

In another representative embodiment, the controller further may retrieve from the memory a first plurality of time intervals corresponding to a number of segments of light emitting diodes of the first plurality of segments of light emitting diodes for the first part of the AC voltage interval, and a second plurality of time intervals corresponding to the number of segments of light emitting diodes for the second part of the AC voltage interval.

For such representative embodiments, the controller, during the first part of the AC voltage interval, at the expiration of each time interval of the first plurality of time intervals, further may generate a corresponding control signal to switch a next segment of light emitting diodes into the series light emitting diode current path, and during the second part of the AC voltage interval, at the expiration of each time interval of the second plurality of time intervals, in a reverse order, may generate a corresponding control signal to switch the next segment of light emitting diodes out of the series light emitting diode current path.

In various representative embodiments, the apparatus may further comprise a rectifier to provide a rectified AC voltage. For such representative embodiments, the controller may, when the rectified AC voltage is substantially close to zero, generate a corresponding synchronization signal. Also for such representative embodiments, the controller further may determine the AC voltage interval from at least one determination of the rectified AC voltage being substantially close to zero.

Also in various representative embodiments, the apparatus may further comprise a current sensor coupled to the controller; and a voltage sensor coupled to the controller. For example, the first parameter may be a light emitting diode current level and the second parameter may be a voltage level.

For such representative embodiments, the controller, when a light emitting diode current has reached a predetermined peak level during the first part of the AC voltage interval, further may determine and store in the memory a first value of the AC voltage level and generate the first control signal to switch a first segment of the first plurality of segments of light emitting diodes into the first series light emitting diode current path; and when the light emitting diode current subsequently has reached the predetermined peak level during the first part of the AC voltage interval, the controller further may determine and store in the memory a next value of the AC voltage level and generate a next control signal to switch a next segment of the first plurality of segments of light emitting diodes into the first series light emitting diode current path. When the AC voltage level has reached the next value during the second part of a rectified AC voltage interval, the controller further may generate another control signal to switch the next segment out of the first series light emitting diode current path; and when the AC voltage level has reached the first value during the second part of a rectified AC voltage interval, the controller may generate the second control signal to switch the first segment out of the first series light emitting diode current path.

In various representative embodiments, during the first part of the AC voltage interval, as a light emitting diode current successively reaches a predetermined peak level, the controller further may determine and store a corresponding value of the AC voltage level and successively generate a corresponding control signal to switch a corresponding segment of the first plurality of segments of light emitting diodes into the first series light emitting diode current path; and during the second part of the AC voltage interval, as the AC voltage level decreases to a corresponding voltage level, the controller further may successively generate a corresponding control signal to switch the corresponding segment of the first plurality of segments of light emitting diodes out of the first series light emitting diode current path. For example, the controller further may successively generate a corresponding control signal to switch the corresponding segment out of the first series light emitting diode current path in a reverse order to the switching of the corresponding segment into the first series light emitting diode current path.

In various representative embodiments, the controller further may determine whether the AC voltage is phase modulated. For such representative embodiments, the controller, when the AC voltage is phase modulated, further may generate a corresponding control signal to switch a segment of the first plurality of segments of light emitting diodes into the first series light emitting diode current path which corresponds to a phase modulated AC voltage level and/or to a time interval of the phase modulated AC voltage level. For such representative embodiments, the controller, when the AC voltage is phase modulated, further may generate corresponding control signals to maintain a parallel second light emitting diode current path through a first switch concurrently with switching a next segment of the first plurality of segments of light emitting diodes into the first series light emitting diode current path through a second switch.

In another of the various representative embodiments, the controller further may determine whether sufficient time remains in the first part of the AC voltage interval for a light emitting diode current to reach a predetermined peak level if a next segment of the first plurality of segments of light emitting diodes is switched into the first series light emitting diode current path, and if so, further may generate a corresponding control signal to switch the next segment of the first plurality of segments of light emitting diodes into the first series light emitting diode current path.

In yet another of the various representative embodiments, during the second part of the AC voltage interval and when the light emitting diode current level is greater than a predetermined peak level by a predetermined margin, the controller further may determine and store a new value of the second parameter and generate a corresponding control signal to switch the corresponding segment of the first plurality of segments of light emitting diodes into the first series light emitting diode current path.

In various representative embodiments, the controller further may generate corresponding control signals to switch a plurality of segments of the first plurality of segments of light emitting diodes to form a second series light emitting diode current path in parallel with the first series light emitting diode current path.

In various representative embodiments, the apparatus may further comprise a second plurality of light emitting diodes coupled in series to form a second plurality of segments of light emitting diodes; and a second plurality of switches coupled to the second plurality of segments of light emitting diodes to switch a selected segment of the second plurality of segments of light emitting diodes into or out of a second series light emitting diode current path; wherein the controller is further coupled to the second plurality of switches, and further may generate corresponding control signals to switch a plurality of segments of the second plurality of segments of light emitting diodes to form the second series light emitting diode current path in parallel with the first series light emitting diode current path. For example, the second series light emitting diode current path may have a polarity opposite the first series light emitting diode current path. Also for example, a first current flow through the first series light emitting diode current path may have an opposite direction to second current flow through the second series light emitting diode current path. Also for example, the controller further may generate corresponding control signals to switch a plurality of segments of the first plurality of segments of light emitting diodes to form the first series light emitting diode current path during a positive polarity of the AC voltage and further may generate corresponding control signals to switch a plurality of segments of the second plurality of segments of light emitting diodes to form the second series light emitting diode current path during a negative polarity of the AC voltage.

In various representative apparatus embodiments, the first plurality of switches may comprise a plurality of bipolar junction transistors or a plurality of field effect transistors. Also in various representative apparatus embodiments, the apparatus also may further comprise a plurality of tri-state switches, comprising: a plurality of operational amplifiers correspondingly coupled to the first plurality of switches; a second plurality of switches correspondingly coupled to the first plurality of switches; and a third plurality of switches correspondingly coupled to the first plurality of switches.

Various representative embodiments may also provide for various switching arrangements or structures. In various representative embodiments, each switch of the first plurality of switches is coupled to a first terminal of a corresponding segment of the first plurality of segments of light emitting diodes and coupled to a second terminal of the last segment of the first plurality of segments of light emitting diodes. In another of the various representative embodiments, each switch of the first plurality of switches is coupled to a first terminal of a corresponding segment of the first plurality of segments of light emitting diodes and coupled to a second terminal of the corresponding segment of the first plurality of segments of light emitting diodes.

In yet another of the various representative embodiments, the apparatus may further comprise a second plurality of switches. For such a representative embodiment, each switch of the first plurality of switches may be coupled to a first terminal of the first segment of the first plurality of segments of light emitting diodes and coupled to a second terminal of a corresponding segment of the first plurality of segments of light emitting diodes; and wherein each switch of the second plurality of switches may be coupled to a second terminal of a corresponding segment of the first plurality of segments of light emitting diodes and coupled to a second terminal of the last segment of the first plurality of segments of light emitting diodes.

In yet another representative embodiment, selected segments of light emitting diodes of the plurality of segments of light emitting diodes each comprise light emitting diodes having light emission spectra of different colors. For such representative embodiments, the controller further may generate corresponding control signals to selectively switch the selected segments of light emitting diodes into the first series light emitting diode current path to provide a corresponding lighting effect, and/or to provide a corresponding color temperature.

In various representative embodiments, the controller may further comprise: a first analog-to-digital converter couplable to a first sensor; a second analog-to-digital converter couplable to a second sensor; a digital logic circuit; and a plurality of switch drivers correspondingly coupled to the first plurality of switches. In another representative embodiment, the controller may comprise a plurality of analog comparators.

In various representative embodiments, the first parameter and the second parameter comprise at least one of the following parameters: a time period, a peak current level, an average current level, a moving average current level, an instantaneous current level, a peak voltage level, an average voltage level, a moving average voltage level, an instantaneous voltage level, an average output optical brightness level, a moving average output optical brightness level, a peak output optical brightness level, or an instantaneous output optical brightness level. In addition, in another representative embodiment, the first parameter and the second parameter are the same parameter, such as a voltage level or a current level.

Another representative apparatus embodiment is couplable to receive an AC voltage, with the apparatus comprising: a first plurality of light emitting diodes coupled in series to form a first plurality of segments of light emitting diodes; a first plurality of switches coupled to the first plurality of segments of light emitting diodes to switch a selected segment of light emitting diodes into or out of a first series light emitting diode current path in response to a control signal; at least one sensor; and a control circuit coupled to the plurality of switches and to the at least one sensor, the controller, in response to a first parameter and during a first part of an AC voltage interval, to determine a value of a second parameter and to generate a first control signal to switch a corresponding segment of light emitting diodes of the first plurality of segments of light emitting diodes into the first series light emitting diode current path; and during a second part of the AC voltage interval, when a current value of the second parameter is substantially equal to a corresponding determined value, to generate a second control signal to switch a corresponding segment of light emitting diodes of the first plurality of segments of light emitting diodes out of the first series light emitting diode current path.

In a representative embodiment, the control circuit further is to calculate or obtain from a memory a first plurality of time intervals corresponding to a number of segments of light emitting diodes of the first plurality of segments of light emitting diodes for the first part of the AC voltage interval, and to calculate or obtain from a memory a second plurality of time intervals corresponding to the number of segments of light emitting diodes for the second part of the AC voltage interval. In such a representative embodiment, during the first part of the AC voltage interval, at the expiration of each time interval of the first plurality of time intervals, the control circuit further is to generate a corresponding control signal to switch a next segment of light emitting diodes into the series light emitting diode current path, and during the second part of the AC voltage interval, at the expiration of each time interval of the second plurality of time intervals, in a reverse order, to generate a corresponding control signal to switch the next segment of light emitting diodes out of the series light emitting diode current path.

In another representative embodiment, the apparatus further comprises a memory to store a plurality of determined values. In various representative embodiments, the first parameter is a light emitting diode current level and the second parameter is a voltage level, and wherein during the first part of the AC voltage interval, as a light emitting diode current successively reaches a predetermined level, the control circuit further is to determine and store in the memory a corresponding value of the AC voltage level and successively generate a corresponding control signal to switch a corresponding segment of the first plurality of segments of light emitting diodes into the first series light emitting diode current path; and during the second part of the AC voltage interval, as the AC voltage level decreases to a corresponding voltage level, the controller further is to successively generate a corresponding control signal to switch the corresponding segment of the first plurality of segments of light emitting diodes out of the first series light emitting diode current path. In another representative embodiment, the first parameter and the second parameter are the same parameter comprising a voltage or a current level, and wherein during the first part of the AC voltage interval, as the voltage or current level successively reaches a predetermined level, the control circuit further is to successively generate a corresponding control signal to switch a corresponding segment of the first plurality of segments of light emitting diodes into the first series light emitting diode current path; and during the second part of the AC voltage interval, as the voltage or current level decreases to a corresponding level, the controller further is to successively generate a corresponding control signal to switch the corresponding segment of the first plurality of segments of light emitting diodes out of the first series light emitting diode current path.

Another representative apparatus embodiment is couplable to receive an AC voltage, with the apparatus comprising: a rectifier to provide a rectified AC voltage; a plurality of light emitting diodes coupled in series to form a plurality of segments of light emitting diodes; a plurality of switches, each switch of the plurality of switches coupled to a first terminal of a corresponding segment of the first plurality of segments of light emitting diodes and coupled to a second terminal of the last segment of the first plurality of segments of light emitting diodes; a current sensor to sense a light emitting diode current level; a voltage sensor to sense a rectified AC voltage level; a memory to store a plurality of parameters; and a controller coupled to the plurality of switches, to the memory, to the current sensor and to the voltage sensor, during a first part of a rectified AC voltage interval and when the light emitting diode current level has reached a predetermined peak light emitting diode current level, the controller to determine and store in the memory a corresponding value of the rectified AC voltage level and to generate corresponding control signals to switch a corresponding segment of light emitting diodes into the series light emitting diode current path; and during a second part of a rectified AC voltage interval and when the current value of the rectified AC voltage level is substantially equal to the stored corresponding value of the rectified AC voltage level, the controller to generate corresponding control signals to switch the corresponding segment of light emitting diodes out of the series light emitting diode current path.

Numerous other advantages and features of the present disclosure will become readily apparent from the following detailed description, from the claims, and from the accompanying drawings.

DESCRIPTION OF THE DRAWINGS

The features and advantages of the present disclosure will be more readily appreciated upon reference to the following description when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION

Figure 1:
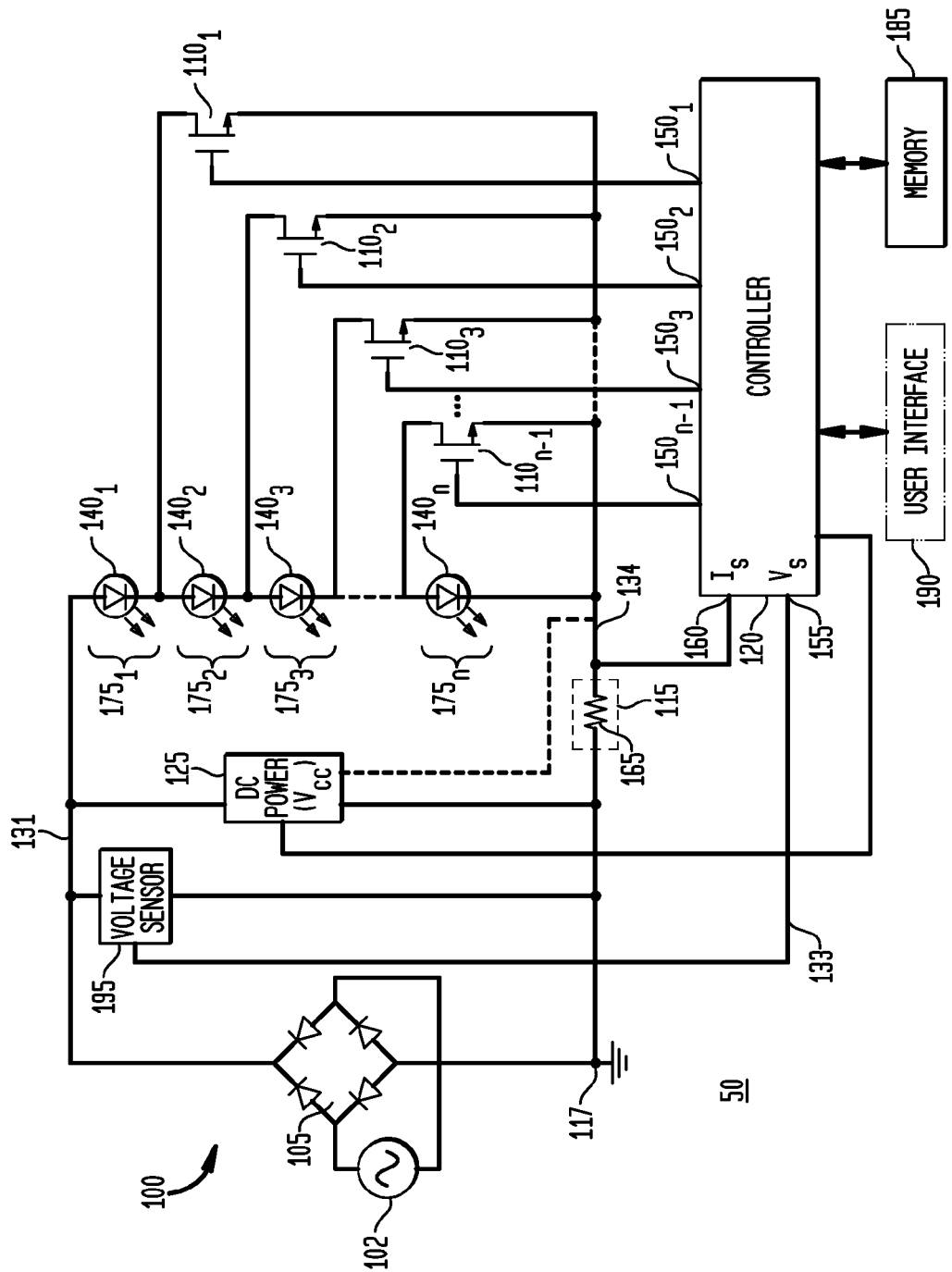
FIG. 1 is a circuit and block diagram illustrating a first representative system and a first representative apparatus in accordance with the teachings of the present disclosure.

While the present disclosure is susceptible of embodiment in many different forms, there are shown in the drawings and will be described herein in detail specific representative embodiments thereof, with the understanding that the present disclosure is to be considered as an exemplification of the principles of the disclosure and is not intended to limit the disclosure to the specific embodiments illustrated. In this respect, before explaining at least one embodiment consistent with the present disclosure in detail, it is to be understood that the disclosure is not limited in its application to the details of construction and to the arrangements of components set forth above and below, illustrated in the drawings, or as described in the examples. Methods and apparatuses consistent with the present disclosure are capable of other embodiments and of being practiced and carried out in various ways. Also, it is to be understood that the phraseology and terminology employed herein, as well as the abstract included below, are for the purposes of description and should not be regarded as limiting.

FIG. 1 is a circuit and block diagram illustrating a first representative system 50 and a first representative apparatus 100 in accordance with the teachings of the present disclosure. First representative system 50 comprises the first representative apparatus 100 (also referred to equivalently as an off line AC LED driver) coupled to an alternating current ("AC") line 102, also referred to herein equivalently as an AC power line or an AC power source, such as a household AC line or other AC mains power source provided by an electrical utility. While representative embodiments are described with reference to such an AC voltage or current, it should be understood that the claimed disclosure is applicable to any time-varying voltage or current, as defined in greater detail below. The first representative apparatus 100 comprises a plurality of LEDs 140, a plurality of switches 110 (illustrated as MOSFETs, as an example), a controller 120, a (first) current sensor 115, a rectifier 105, and as options, a voltage sensor 195 and a DC power source ("Vcc") for providing power to the controller 120 and other selected components. Representative DC power source circuits 125 may be implemented in a wide variety of configurations and may be provided in a wide variety of locations within the various representative apparatuses (100, 200, 300, 400, 500, 600, 700, 800, 900, 1000, 1100, 1200, 1300), with several representative DC power source circuits 125 illustrated and discussed with reference to FIGS. 18-20. Also for example, representative DC power sources 125 may be coupled into the representative apparatuses in a wide variety of ways, such as between nodes 131 and 117 or between nodes 131 and 134, for example and without limitation. Representative voltage sensors 195 also may be implemented in a wide variety of configurations and may be provided in a wide variety of locations within the various representative apparatuses (100, 200, 300, 400, 500, 600, 700, 800, 900, 1000, 1100, 1200, 1300), with a representative voltage sensor 195A implemented as a voltage divider circuit illustrated and discussed with reference to FIGS. 4 and 5. Also for example, representative voltage sensor 195 may be coupled into the representative apparatuses in a wide variety of ways, such as between nodes 131 and 117 or in other locations, for example and without limitation. Also optional, a memory 185 may be included, such as to store various time periods, current or voltage levels; in various representative embodiments, controller 120 may already include various types of memory 185 (e.g., registers), such that memory 185 may not be a separate component. A user interface 190 (for user input of various selections such as light output, for example) also may be included as an option in various representative embodiments, such as for input of desired or selected lighting effects. Not separately illustrated in the figures, equivalent implementations may also include isolation, such as through the use of isolation transformers, and are within the scope of the disclosure.

It should be noted that any of the switches 110 of the plurality of switches 110 may be any type or kind of switch or transistor, in addition to the illustrated n-channel MOSFETs, including without limitation a bipolar junction transistor ("BJT"), a p-channel MOSFET, various enhancement or depletion mode FETs, etc., and that a plurality of other power switches of any type or kind also may be utilized in the circuitry, depending on the selected embodiment.

The rectifier 105, illustrated as a bridge rectifier, is coupled to the AC line 102, to provide a full (or half) wave rectified input voltage ("$V_{IN}$") and current to a first light emitting diode $140_1$ of a plurality of series-coupled light emitting diodes ("LEDs") 140, illustrated as LEDs $140_1$, $140_2$, $140_3$, through $140_n$, which are arranged or configured as a plurality of series-coupled segments (or strings) 175 (illustrated as LED segments $175_1$, $175_2$, $175_3$, through $175_n$). (Rectifier 105 may be a full-wave rectifier, a full-wave bridge, a half-wave rectifier, an electromechanical rectifier, or another type of rectifier.) While each LED segment 175 is illustrated in FIG. 1 as having only one corresponding LED 140 for ease of illustration, it should be understood that each such LED segment 175 typically comprises a corresponding plurality of series-coupled LEDs 140, from one to "n" LEDs 140 in each LED segment 175, which are successively coupled in series. It should also be understood that the various LED segments 175 may be comprised of the same (equal) number of LEDs 140 or differing (unequal) numbers of LEDs 140, and all such variations are considered equivalent and within the scope of the present disclosure. For example and without limitation, in a representative embodiment, as many as five to seven LEDs 140 are included in each of nine LED segments 175. The various LED segments 175, and the corresponding LEDs 140 which comprise them, are successively coupled in series to each other, with a first LED segment $175_1$ coupled in series to a second LED segment $175_2$, which in turn is coupled in series to a third LED segment $175_3$, and so on, with a penultimate LED segment $175_{n-1}$, coupled in series to the last or ultimate LED segment $175_n$.

As illustrated, rectifier 105 is directly coupled to an anode of a first LED $140_1$, although other coupling arrangements are also within the scope of the present disclosure, such as coupling through a resistance or other components, such as coupling to a current limiter circuit 280, or an interface circuit 240, or a DC power source 125, as illustrated and as discussed in greater detail with reference to FIG. 8. Equivalent implementations are also available without use of a rectifier 105, and are discussed below. Current sensor 115 is illustrated and embodied as a current sense resistor 165, as a representative type of current sensor, and all current sensor variations are considered equivalent and within the scope of the disclosure. Such a current sensor 115 may also be provided in other locations within the apparatus 100, with all such configuration variations considered equivalent and within the scope of the disclosure as claimed. As current sensor 115 is illustrated as coupled to a ground potential 117, feedback of the level of current through the LED segments 175 and/or switches 110 ("$I_S$") can be provided using one input 160 of controller 120; in other embodiments, additional inputs may also be utilized, such as for input of two or more voltage levels utilized for current sensing, for example and without limitation. Other types of sensors may also be utilized, such as an optical brightness sensor (such as second sensor 225 in FIG. 7), in lieu of or in addition to current sensor 115 and/or voltage sensor 195, for example and without limitation. In addition, a current sense resistor 165 may also function as a current limiting resistor. A wide variety of DC power sources 125 for the controller 120 may be implemented, and all such variations are considered equivalent and within the scope of the disclosure.

The controller 120 (and the other controllers 120A-120I discussed below) may be implemented using any type of circuitry, as discussed in greater detail below, and more generally may also be considered to be a control circuit. For example and without limitation, the controller 120 (and the other controllers 120A-120I) or an equivalent control circuit may be implemented using digital circuitry, analog circuitry, or a combination of both digital and analog circuitry, with or without a memory circuit. The controller 120 is utilized primarily to provide switching control, to monitor and respond to parameter variations (e.g., LED 140 current levels, voltage levels, optical brightness levels, etc.), and may also be utilized to implement any of various lighting effects, such as dimming or color temperature control.

The switches 110, illustrated as switches $110_1$, $110_2$, $110_3$, through $110_{n-1}$, may be any type of switch, such as the illustrated MOSFETs as a representative type of switch, with other equivalent types of switches 110 discussed in greater detail below, and all such variations are considered equivalent and within the scope of the disclosure. The switches 110 are correspondingly coupled to a terminal of LED segments 175. As illustrated, corresponding switches 110 are coupled in a one-to-one correspondence to a cathode of an LED 140 at a terminal of each LED segment 175, with the exception of the last LED segment $175_n$. More particularly, in this representative embodiment, a first terminal of each switch 110 (e.g., a drain terminal) is coupled to a corresponding terminal (cathode in this illustration) of a corresponding LED 140 of each LED segment 175, and a second terminal of each switch 110 (e.g., a source terminal) is coupled to the current sensor 115 (or, for example, to a ground potential 117, or to another sensor, a current limiter (discussed below) or to another node (e.g., 132, as shown in FIG. 8). A gate of each switch 110 is coupled to a corresponding output 150 of (and is under the control of) the controller 120, illustrated as outputs $150_1$, $150_2$, $150_3$, through $150_{n-1}$. In this first representative apparatus 100, each switch 110 performs a current bypass function, such that when a switch 110 is on and conducting, current flows through the corresponding switch and bypasses remaining (or corresponding) one or more LED segments 175. For example, when switch $110_1$ is on and conducting and the remaining switches 110 are off, current flows through LED segment $175_1$, and bypasses LED segments $175_2$ through $175_n$; when switch $110_2$ is on and conducting and the remaining switches 110 are off, current flows through LED segments $175_1$ and $175_2$, and bypasses LED segments $175_3$ through $175_n$; when switch $110_3$ is on and conducting and the remaining switches 110 are off, current flows through LED segments $175_1$, $175_2$, and $175_3$, and bypasses the remaining LED segments (through $175_n$); and when none of the switches 110 are on and conducting (all switches 110 are off), current flows through all of the LED segments $175_1$, $175_2$, $175_3$ through $175_n$.

Accordingly, the plurality of LED segments $175_1$, $175_2$, $175_3$ through $175_n$ are coupled in series, and are correspondingly coupled to the plurality of switches 110 ($110_1$ through $110_{n-1}$). Depending on the state of the various switches, selected LED segments 175 may be coupled to form a series LED 140 current path, also referred to herein equivalently as a series LED 140 path, such that electrical current flows through the selected LED segments 175 and bypasses the remaining (unselected) LED segments 175 (which, technically, are still physically coupled in series to the selected LED segments 175, but are no longer electrically coupled in series to the selected LED segments 175, as current flow to them has been bypassed or diverted). Depending on the circuit configuration, if all switches 110 are off, then all of the LED segments 175 of the plurality of LED segments 175 have been coupled to form the series LED 140 current path, i.e., no current flow to the LED segments 175 has been bypassed or diverted. For the illustrated circuit configuration, and depending on the circuit configuration (e.g., the location of various switches 110), at least one of the LED segments 175 of the plurality of LED segments 175 is coupled to form the series LED 140 current path, i.e., when there is current flow, it is going through at least one of the LED segments 175 for this configuration.

Under the control of the controller 120, the plurality of switches 110 may then be considered to switch selected LED segments 175 in or out of the series LED 140 current path from the perspective of electrical current flow, namely, an LED segment 175 is switched into the series LED 140 current path when it is not being bypassed by a switch 110, and an LED segment 175 is switched out of the series LED 140 current path when it is being bypassed by or through a switch 110. Stated another way, an LED segment 175 is switched into the series LED 140 current path when the current it receives has not been bypassed or routed elsewhere by a switch 110, and an LED segment 175 is switched out of the series LED 140 current path when it does not receive current because the current is being routed elsewhere by a switch 110.

Similarly, it is to be understood that the controller 120 generates corresponding control signals to the plurality of switches 110 to selectively switch corresponding LED segments 175 of the plurality of LED segments 175 into or out of the series LED 140 current path, such as a comparatively high voltage signal (binary logic one) to a corresponding gate or base of a switch 110 when embodied as a FET or BJT, and such as a comparatively low voltage signal (binary logic zero) to a corresponding gate or base of a switch 110 also when embodied as a FET or BJT. Accordingly, a reference to the controller 120 "switching" an LED segment 175 into or out of the series LED 140 current path is to be understood to implicitly mean and include the controller 120 generating corresponding control signals to the plurality of switches 110 and/or to any intervening driver or buffer circuits (illustrated in FIG. 21 as switch drivers 405) to switch the LED segment 175 into or out of the series LED 140 current path.

An advantage of this switching configuration is that by default, in the event of an open-circuit switch failure, LED segments 175 are electrically coupled into the series LED 140 current path, rather than requiring current flow through a switch in order for an LED segment 175 to be in the series LED 140 current path, such that the lighting device continues to operate and provide output light.

Various other representative embodiments, however, such as apparatus 400 discussed below with reference to FIG. 6, also provide for switching of LED segments 175 into and out of both parallel and series LED 140 current paths, such as one or more LED segments 175 switched into a first series LED 140 current path, one or more LED segments 175 switched into a second series LED 140 current path, which then may be switched to be in parallel with each other, for example and without limitation. Accordingly, to accommodate the various circuit structures and switching combinations of the representative embodiments, an "LED 140 current path" will mean and include either or both a series LED 140 current path or a parallel LED 140 current path, and/or any combinations thereof. Depending upon the various circuit structures, the LED 140 current paths may be a series LED 140 current path or may be a parallel LED 140 current path, or a combination of both.

Given this switching configuration, a wide variety of switching schemes are possible, with corresponding current provided to one or more LED segments 175 in any number of corresponding patterns, amounts, durations, and times, with current provided to any number of LED segments 175, from one LED segment 175 to several LED segments 175 to all LED segments 175. For example, for a time period $t_1$ (e.g., a selected starting time and a duration), switch $110_1$ is on and conducting and the remaining switches 110 are off, and current flows through LED segment $175_1$ and bypasses LED segments $175_2$ through $175_n$; for a time period $t_2$, switch $110_2$ is on and conducting and the remaining switches 110 are off, and current flows through LED segments $175_1$ and $175_2$, and bypasses LED segments $175_3$ through $175_n$; for a time period $t_3$, switch $110_3$ is on and conducting and the remaining switches 110 are off, and current flows through LED segments $175_1$, $175_2$, and $175_3$, and bypasses the remaining LED segments (through $175_n$); and for a time period $t_n$, none of the switches 110 are on and conducting (all switches 110 are off), and current flows through all of the LED segments $175_1$, $175_2$, $175_3$, through $175_n$.

In a first representative embodiment, a plurality of time periods $t_1$ through $t_n$ and/or corresponding input voltage levels ($V_{IN}$) ($V_{IN1}$, $V_{IN2}$, through $V_{INn}$,) and/or other parameter levels are determined for switching current (through switches 110), which substantially correspond to or otherwise track (within a predetermined variance or other tolerance or desired specification) the rectified AC voltage (provided by AC line 102 via rectifier 105) or more generally the AC voltage, such that current is provided through most or all LED segments 175 when the rectified AC voltage is comparatively high, and current is provided through fewer, one, or no LED segments 175 when the rectified AC voltage is comparatively low or close to zero. A wide variety of parameter levels may be utilized equivalently, such as time periods, peak current or voltage levels, average current or voltage levels, moving average current or voltage levels, instantaneous current or voltage levels, output (average, peak, or instantaneous) optical brightness levels, for example and without limitation, and that any and all such variations are within the scope of the disclosure. In a second representative embodiment, a plurality of time periods $t_1$ through $t_n$ and/or corresponding input voltage levels ($V_{IN}$) ($V_{IN1}$, $V_{IN2}$, through $V_{INn}$) and/or other parameter levels (e.g., output optical brightness levels) are determined for switching current (through switches 110) which correspond to a desired lighting effect such as dimming (selected or input into apparatus 100 via coupling to a dimmer switch or user input via (optional) user interface 190), such that current is provided through most or all LED segments 175 when the rectified AC voltage is comparatively high and a higher brightness is selected, and current is provided through fewer, one, or no LED segments 175 when a lower brightness is selected. For example, when a comparatively lower level of brightness is selected, current may be provided through comparatively fewer or no LED segments 175 during a given or selected time interval.

In another representative embodiment, the plurality of LED segments 175 may be comprised of different types of LEDs 140 having different light emission spectra, such as light emission having wavelengths in the red, green, blue, amber, etc., visible ranges. For example, LED segment $175_1$ may be comprised of red LEDs 140, LED segment $175_2$ may be comprised of green LEDs 140, LED segment $175_3$ may be comprised of blue LEDs 140, another LED segment $175_{n-1}$ may be comprised of amber or white LEDs 140, and so on. In such a representative embodiment, a plurality of time periods $t_1$ through $t_n$ and/or corresponding input voltage levels ($V_{IN}$) ($V_{IN1}$, $V_{IN2}$, through $V_{INn}$) and/or other parameter levels are determined for switching current (through switches 110) which correspond to another desired, architectural lighting effect such as ambient or output color control, such that current is provided through corresponding LED segments 175 to provide corresponding light emissions at corresponding wavelengths, such as red, green, blue, amber, and corresponding combinations of such wavelengths (e.g., yellow as a combination of red and green). Innumerable switching patterns and types of LEDs 140 may be utilized to achieve any selected lighting effect, any and all of which are within the scope of the disclosure as claimed.

Figure 3:
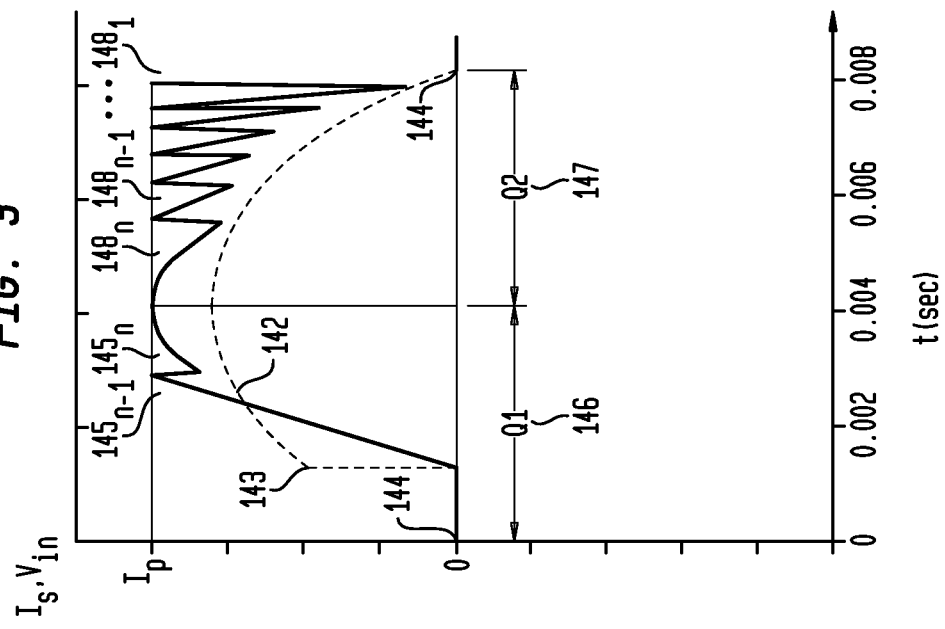
FIG. 3 is a graphical diagram illustrating a second representative load current waveform and input voltage levels in accordance with the teachings of the present disclosure.
Figure 2:
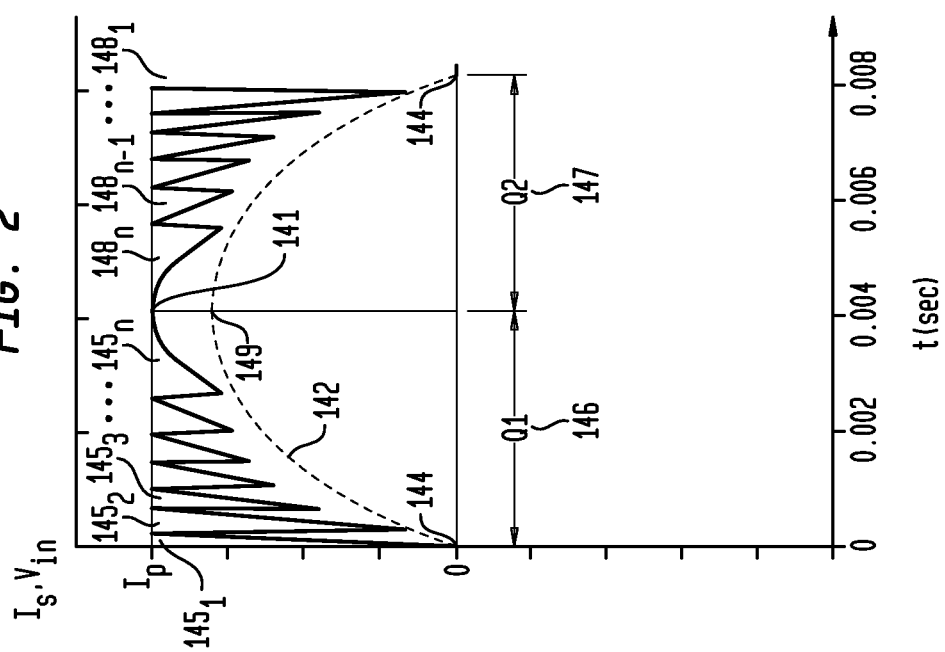
FIG. 2 is a graphical diagram illustrating a first representative load current waveform and input voltage levels in accordance with the teachings of the present disclosure.

In the first representative embodiment mentioned above, in which a plurality of time periods $t_1$ through $t_n$ and/or corresponding input voltage levels ($V_{IN}$) ($V_{IN1}$, $V_{IN2}$, through $V_{INn}$) and/or other parameter levels are determined for switching current (through switches 110) which substantially correspond to or otherwise track (within a predetermined variance or other tolerance or desired specification) the rectified AC voltage (provided by AC source 102 via rectifier 105), the controller 120 periodically adjusts the number of serially coupled LED segments 175 to which current is provided, such that current is provided through most or all LED segments 175 when the rectified AC voltage is comparatively high, and current is provided through fewer, one, or no LED segments 175 when the rectified AC voltage is comparatively low or close to zero. For example, in a selected embodiment, peak current ("$I_p$") through the LED segments 175 is maintained substantially constant, such that as the rectified AC voltage level increases and as current increases to a predetermined or selected peak current level through the one or more LED segments 175 which are currently connected in the series path, additional LED segments 175 are switched into the serial path; conversely, as the rectified AC voltage level decreases, LED segments 175 which are currently connected in the series path are successively switched out of the series path and bypassed. Such current levels through LEDs 140 due to switching in of LED segments 175 (into the series LED 140 current path), followed by switching out of LED segments 175 (from the series LED 140 current path) is illustrated in FIGS. 2 and 3. More particularly, FIG. 2 is a graphical diagram illustrating a first representative load current waveform (e.g., full brightness levels) and input voltage levels in accordance with the teachings of the present disclosure, and FIG. 3 is a graphical diagram illustrating a second representative load current waveform (e.g., lower or dimmed brightness levels) and input voltage levels in accordance with the teachings of the present disclosure.

Referring to FIGS. 2 and 3, current levels through selected LED segments 175 are illustrated during a first half of a rectified 60 Hz AC cycle (with input voltage $V_{IN}$ illustrated as dotted line 142), which is further divided into a first time period (referred to as time quadrant "Q1" 146) as a first part or portion of an AC (voltage) interval, during which the rectified AC line voltage increases from about zero volts to its peak level, and a second time period (referred to as time quadrant "Q2" 147) as a second part or portion of an AC (voltage) interval, during which the rectified AC line voltage decreases from its peak level to about zero volts. As the AC voltage is rectified, time quadrant "Q1" 146 and time quadrant "Q2" 147 and the corresponding voltage levels are repeated during a second half of a rectified 60 Hz AC cycle. (It should also be noted that the rectified AC voltage $V_{IN}$ is illustrated as an idealized, textbook example, and is likely to vary from this depiction during actual use.) Referring to FIG. 2, for each time quadrant "Q1" 146 and "Q2" 147, as an example and without limitation, seven time intervals are illustrated, corresponding to switching seven LED segments 175 into or out of the series LED 140 current path. During time interval $145_1$, at the beginning of the AC cycle, switch $110_1$ is on and conducting and the remaining switches 110 are off, current ("$I_S$") flows through LED segment $175_1$ and rises to a predetermined or selected peak current level $I_p$. Using current sensor 115, when the current reaches $I_p$, the controller 120 switches in a next LED segment $175_2$ by turning on switch $110_2$, turning off switch $110_1$, and keeping the remaining switches 110 off, thereby commencing time interval $145_2$. The controller 120 also measures or otherwise determines either the duration of the time interval $145_1$ or an equivalent parameter, such as the line voltage level at which $I_p$ was reached for this particular series combination LED segments $175_1$ (which, in this instance, is just the first LED segment $175_1$), such as by using a voltage sensor 195 illustrated in various representative embodiments, and stores the corresponding information in memory 185 or another register or memory. This interval information for the selected combination of LED segments 175, whether a time parameter, a voltage parameter, or another measurable parameter, is utilized during the second time quadrant "Q2" 147 for switching corresponding LED segments 175 out of the series LED 140 current path (generally in the reverse order).

Continuing to refer to FIG. 2, during time interval $145_2$, which is slightly later in the AC cycle, switch $110_2$ is on and conducting and the remaining switches 110 are off, current ("$I_S$") flows through LED segments $175_1$ and $175_2$, and again rises to a predetermined or selected peak current level $I_p$. Using current sensor 115, when the current reaches $I_p$, the controller 120 switches in a next LED segment $175_3$ by turning on switch $110_3$, turning off switch $110_2$, and keeping the remaining switches 110 off, thereby commencing time interval $145_3$. The controller 120 also measures or otherwise determines either the duration of the time interval $145_2$ or an equivalent parameter, such as the line voltage level at which $I_p$ was reached for this particular series combination LED segments 175 (which, in this instance, is LED segments $175_1$ and $175_2$), and stores the corresponding information in memory 185 or another register or memory. This interval information for the selected combination of LED segments 175, whether a time parameter, a voltage parameter, or another measurable parameter, is also utilized during the second time quadrant "Q2" 147 for switching corresponding LED segments 175 out of the series LED 140 current path. As the rectified AC voltage level increases, this process continues until all LED segments 175 have been switched into the series LED 140 current path (i.e., all switches 110 are off and no LED segments 175 are bypassed), during time interval $145_n$, with all corresponding interval information stored in memory 185.

Accordingly, as the rectified AC line voltage ($V_{IN}$ 142 in FIGS. 2 and 3) has increased, the number of LEDs 140 which are utilized has increased correspondingly, by the switching in of additional LED segments 175. In this way, LED 140 usage substantially tracks or corresponds to the AC line voltage, so that appropriate currents may be maintained through the LEDs 140 (e.g., within LED device specification), allowing full utilization of the rectified AC line voltage without complicated energy storage devices and without complicated power converter devices. This apparatus 100 configuration and switching methodology thereby provides a higher efficiency, increased LED 140 utilization, and allows use of many, generally smaller LEDs 140, which also provides higher efficiency for light output and better heat dissipation and management. In addition, due to the switching frequency, changes in output brightness through the switching of LED segments 175 in or out of the series LED 140 current path is generally not perceptible to the average human observer.

When there are no balancing resistors, the jump in current from before switching to after switching, during time quadrant "Q1" 146 (with increasing rectified AC voltage), is (Equation 1):

$$\Delta I = \frac{\Delta N}{N + \Delta N}\left(\frac{V_{switch}}{NRd}\right),$$

where "Vswitch" is the line voltage when switching occurs, "Rd" is the dynamic impedance of one LED 140, "N" is the number of LEDs 140 in the series LED 140 current path prior to the switching in of another LED segment 175, and ΔN is the number of additional LEDs 140 which are being switched in to the series LED 140 current path. A similar equation may be derived when voltage is decreasing during time quadrant "Q2" 147. (Of course, the current jump will not cause the current to become negative, as the diode current will just drop to zero in this case.) Equation 1 indicates that the current jump is decreased by making ΔN small compared to the number of conducting LEDs 140 or by having LEDs 140 with comparatively higher dynamic impedance, or both.

In a representative embodiment, during second time quadrant "Q2" 147, as the rectified AC line voltage decreases, the stored interval, voltage or other parameter information is utilized to sequentially switch corresponding LED segments 175 out of the series LED 140 current path in reverse order (e.g., "mirrored"), beginning with all LED segments 175 having been switched into the series LED 140 current path (at the end of "Q1" 146) and switching out a corresponding LED segment 175 until one (LED segment $175_1$) remains in the series LED 140 current path. Continuing to refer to FIG. 2, during time interval $148_n$, which is the interval following the peak or crest of the AC cycle, all LED segments 175 have been switched into the series LED 140 current path (all switches 110 are off and no LED segments 175 are bypassed), current ("$I_S$") flows through all LED segments 175, and decreases from its predetermined or selected peak current level $I_p$. Using the stored interval, voltage or other parameter information, such as a corresponding time duration or a voltage level, when the corresponding amount of time has elapsed or the rectified AC input voltage has decreased to the stored voltage level, or other stored parameter level has been reached, the controller 120 switches out a next LED segment $175_n$ by turning on switch $110_{n-1}$, and keeping the remaining switches 110 off, thereby commencing time interval $148_{n-1}$. During the time interval $148_{n-1}$, all LED segments 175 other than LED segment $175_n$ are still switched into the series LED 140 current path, current $I_S$ flows through these LED segments 175, and again decreases from its predetermined or selected peak current level $I_p$. Using the stored interval information, also such as a corresponding time duration or a voltage level, when the corresponding amount of time has elapsed, voltage level has been reached, or other stored parameter level has been reached, the controller 120 switches out a next LED segment $175_{n-1}$ by turning on switch $110_{n-2}$, turning off switch $110_{n-1}$, and keeping the remaining switches 110 off, thereby commencing time interval $148_{n-2}$. As the rectified AC voltage level decreases, this process continues until one LED segment $175_1$ remains in the series LED 140 current path, time interval $148_1$, and the switching process may commence again, successively switching additional LED segments 175 into the series LED 140 current path during a next first time quadrant "Q1" 146.

As mentioned above, a wide variety of parameters may be utilized to provide the interval information utilized for switching control in the second time quadrant "Q2" 147, such as time duration (which may be in units of time, or units of device clock cycle counts, etc.), voltage levels, current levels, and so on. In addition, the interval information used in time quadrant "Q2" 147 may be the information determined in the most recent preceding first time quadrant "Q1" 146 or, in accordance with other representative embodiments, may be adjusted or modified, as discussed in greater detail below with reference to FIG. 23, such as to provide increased power factor correction, changing thresholds as the temperature of the LEDs 140 may increase during use, digital filtering to reduce noise, asymmetry in the provided AC line voltage, unexpected voltage increases or decreases, other voltage variations in the usual course, and so on. In addition, various calculations may also be performed, such as time calculations and estimations, such as whether sufficient time remains in a given interval for the LED 140 current level to reach $I_p$, for power factor correction purposes, for example. Various other processes may also occur, such as current limiting in the event $I_p$ may be or is becoming exceeded, or other current management, such as for drawing sufficient current for interfacing to various devices such as dimmer switches.

Additional switching schemes may also be employed in representative embodiments, in addition to the sequential switching illustrated in FIG. 2. For example, based upon real time information, such as a measured increase in rectified AC voltage levels, additional LED segments 175 may be switched in, such as jumping from two LED segments 175 to five LED segments 175, for example and without limitation, with similar non-sequential switching available to voltage drops, etc., such that any type of switching, sequential, non-sequential, and so on, and for any type of lighting effect, such as full brightness, dimmed brightness, special effects, and color temperature, is within the scope of the disclosure.

Another switching variation is illustrated in FIG. 3, such as for a dimming application. As illustrated, sequential switching of additional LED segments 175 into the series LED 140 current path during a next first time quadrant "Q1" 146 is not performed, with various LED segment 175 combinations skipped. For such an application, the rectified AC input voltage may be phase modulated, e.g., no voltage provided during a first portion or part (e.g., 30-70 degrees) of each half of the AC cycle, with a more substantial jump in voltage then occurring at that phase (143 in FIG. 3). Instead, during time interval $145_{n-1}$, all LED segments 175 other than LED segment $175_n$ have been switched into the series LED 140 current path, with the current $I_S$ increasing to $I_p$ comparatively more slowly, thereby changing the average LED 140 current and reducing output brightness levels. While not separately illustrated, similar skipping of LED segments 175 may be performed in "Q2" 147, also resulting in decreased output brightness levels. Innumerable different switching combinations may be implemented to achieve such brightness dimming, in addition to that illustrated, and all such variations are within the scope of the disclosure as claimed, including modifying the average current value during each interval, or pulse width modulation during each interval, in addition to the illustrated switching methodology.

Innumerable different switching interval schemes and corresponding switching methods may be implemented within the scope of the disclosure. For example, a given switching interval may be predetermined or otherwise determined in advance for each LED segment 175 individually, and may be equal or unequal to other switching intervals; switching intervals may be selected or programmed to be equal for each LED segment 175; switching intervals may be determined dynamically for each LED segment 175, such as for a desirable or selected lighting effect; switching intervals may be determined dynamically for each LED segment 175 based upon feedback of a measured parameter, such as a voltage or current level; switching intervals may be determined dynamically or predetermined to provide an equal current for each LED segment 175; switching intervals may be determined dynamically or predetermined to provide an unequal current for each LED segment 175, such as for a desirable or selected lighting effect; etc.

It should also be noted that the various representative apparatus embodiments are illustrated as including a rectifier 105, which is an option but is not required. The representative embodiments may be implemented using a non-rectified AC voltage or current. In addition, representative embodiments may also be constructed using one or more LED segments 175 connected in an opposite polarity (or opposite direction), or with one set of LED segments 175 connected in a first polarity (direction) and another set of LED segments 175 connected in a second polarity (an opposing or antiparallel direction), such that each may receive current during different halves of a non-rectified AC cycle, for example and without limitation. Continuing with the example, a first set of LED segments 175 may be switched (e.g., sequentially or in another order) to form a first LED 140 current path during a first half of a non-rectified AC cycle, and a second set of LED segments 175 arranged in an opposing direction or polarity may be switched (e.g., sequentially or in another order) to form a second LED 140 current path during a second half of a non-rectified AC cycle.

Further continuing with the example, for a non-rectified AC input voltage, for a first half of the AC cycle, now divided into "Q1" 46 and "Q2" 47, during "Q1" 46 as a first part or portion of the AC voltage interval, various embodiments may provide for switching a first plurality of segments of light emitting diodes to form a first series light emitting diode current path, and during "Q2" 47, as a second part or portion of the AC voltage interval, switching the first plurality of segments of light emitting diodes out of the first series light emitting diode current path. Then, for the second half of the AC cycle, which may now be correspondingly divided into a "Q3" part or portion and a "Q4" part or portion (respectively identical to "Q1" 46 and "Q2" 47 but having the opposite polarity), during a third portion "Q3" of the AC voltage interval, various embodiments may provide for switching a second plurality of segments of light emitting diodes to form a second series light emitting diode current path having a polarity opposite the series light emitting diode current path formed in the first portion of the AC voltage interval, and during a fourth portion "Q4" of the AC voltage interval, switching the second plurality of segments of light emitting diodes out of the second series light emitting diode current path. All such variations are considered equivalent and within the scope of the disclosure.

As mentioned above, representative embodiments may also provide substantial or significant power factor correction. Referring again to FIG. 2, representative embodiments may provide that the LED 140 current reaches a peak value 141 at substantially about the same time as the input voltage level $V_{IN}$ 149. In various embodiments, before switching in a next segment, such as LED segment 175$_n$, which may cause a decrease in current, a determination may be made whether sufficient time remains in quadrant "Q1" 46 to reach $I_p$ if the next LED segment 175 were switched into the series LED 140 current path. If sufficient time remains in "Q1" 46, the next LED segment 175 is switched into the series LED 140 current path, and if not, no additional LED segment 175 is switched in. In the latter case, the LED 140 current may exceed the peak value $I_p$ (not separately illustrated in FIG. 2), provided the actual peak LED 140 current is maintained below a corresponding threshold or other specification level, such as to avoid potential harm to the LEDs 140 or other circuit components. Various current limiting circuits, to avoid such excess current levels, are discussed in greater detail below.

Figure 4:
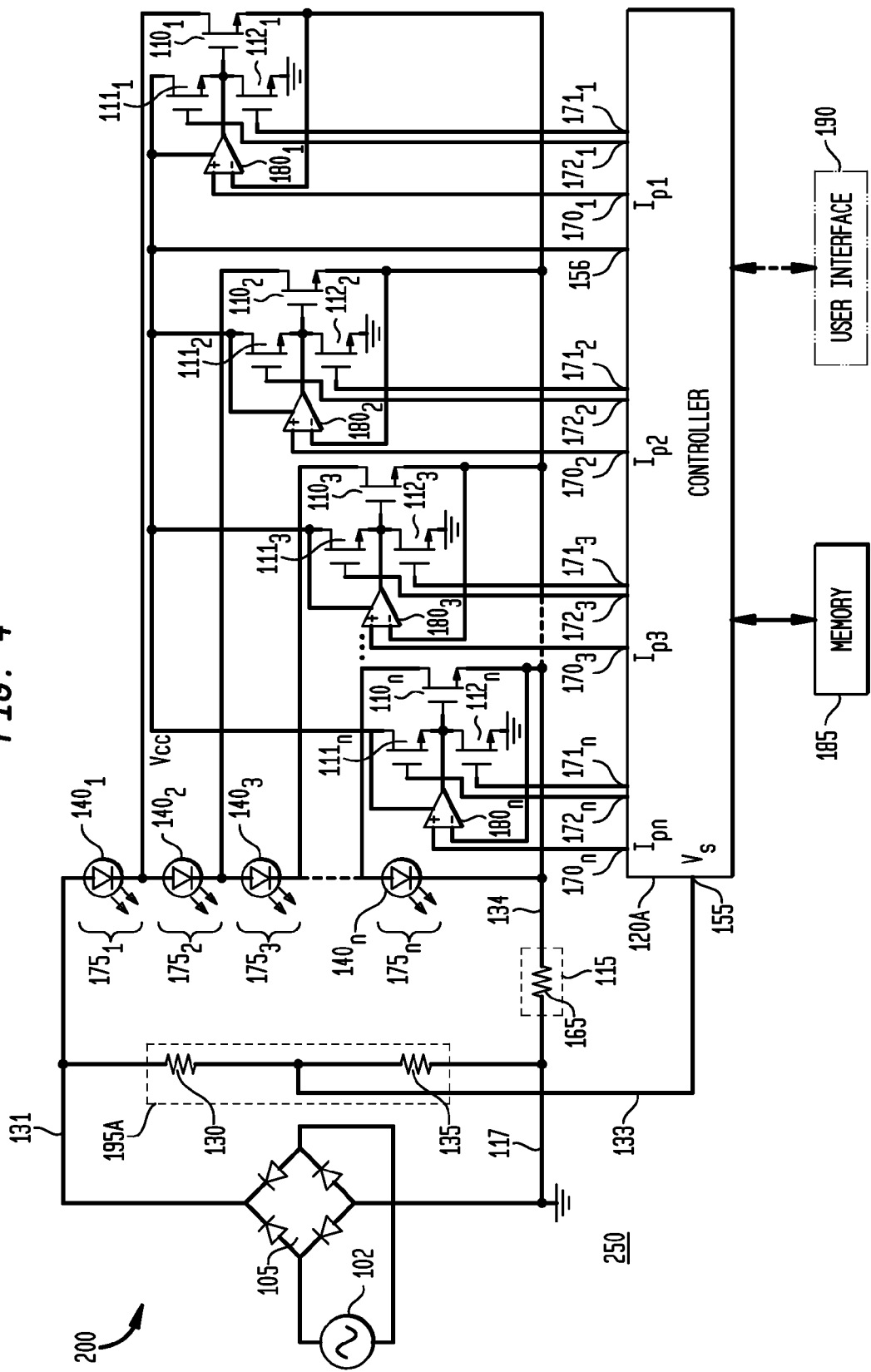
FIG. 4 is a block and circuit diagram illustrating a second representative system and a second representative apparatus in accordance with the teachings of the present disclosure.

FIG. 4 is a block and circuit diagram illustrating a second representative system 250, a second representative apparatus 200, and a first representative voltage sensor 195A, in accordance with the teachings of the present disclosure. Second representative system 250 comprises the second representative apparatus 200 (also referred to equivalently as an off line AC LED driver) coupled to an alternating current ("AC") line 102. The second representative apparatus 200 also comprises a plurality of LEDs 140, a plurality of switches 110 (illustrated as MOSFETs, as an example), a controller 120A, a current sensor 115, a rectifier 105, current regulators 180 (illustrated as being implemented by operational amplifiers, as a representative embodiment), complementary switches 111 and 112, and as an option, the first representative voltage sensor 195A (illustrated as a voltage divider, using resistors 130 and 135) for providing a sensed input voltage level to the controller 120A. Also optional, a memory 185 and/or a user interface 190 also may be included as discussed above. For ease of illustration, a DC power source circuit 125 is not illustrated separately in FIG. 4, but may be included in any circuit location as discussed above and as discussed in greater detail below.

The second representative system 250 and second representative apparatus 200 operate similarly to the first system 50 and first apparatus 100 discussed above as far as the switching of LED segments 175 in or out of the series LED 140 current path, but utilizes a different feedback mechanism and a different switching implementation, allowing separate control over peak current for each set of LED segments 175 (e.g., a first peak current for LED segment 175$_1$; a second peak current for LED segments 175$_1$ and 175$_2$; a third peak current for LED segments 175$_1$, 175$_2$, and 175$_3$; through an $n^{th}$ peak current level for all LED segments 175$_1$ through 175$_n$. More particularly, feedback of the measured or otherwise determined current level $I_S$ from current sensor 115 is provided to a corresponding inverting terminal of current regulators 180, illustrated as current regulators 180$_1$, 180$_2$, 180$_3$, through 180$_n$, implemented as operational amplifiers which provide current regulation. A desired or selected peak current level for each corresponding set of LED segments 175, illustrated as $I_{P1}$, $I_{P2}$, $I_{P3}$, through $I_{Pn}$, is provided by the controller 120A (via outputs 170$_1$, 170$_2$, 170$_3$, through 170$_n$) to the corresponding non-inverting terminal of current regulators 180. An output of each current regulator 180$_1$, 180$_2$, 180$_3$, through 180$_n$ is coupled to a gate of a corresponding switch 110$_1$, 110$_2$, 110$_3$, through 110$_n$, and in addition, complementary switches 111 (111$_1$, 111$_2$, 111$_3$, through 111$_n$) and 112 (112$_1$, 112$_2$, 112$_3$, through 112$_n$) each have gates coupled to and controlled by the controller 120A (via outputs 172$_1$, 172$_2$, 172$_3$, through 172$_n$ for switches 111 and via outputs 171$_1$, 171$_2$, 171$_3$, through 171$_n$ for switches 112), thereby providing tri-state control and more fine-grained current regulation. A first, linear control mode is provided when none of the complementary switches 111 and 112 are on and a switch 110 is controlled by a corresponding current regulator 180, which compares the current $I_S$ fed back from the current sensor 115 to the set peak current level provided by the controller 120, thereby gating the current through the switch 110 and corresponding set of LED segments 175. A second, saturated control mode is provided when a complementary switch 111 is on and the corresponding switch 112 is off. A third, disabled control mode is provided when a complementary switch 112 is on and the corresponding switch 111 is off, such that current does not flow through the corresponding switch 110. The control provided by second representative system 250 and second representative apparatus 200 allows flexibility in driving corresponding sets of LED segments 175, with individualized settings for currents and conduction time, including without limitation, skipping a set of LED segments 175 entirely.

Figure 5:
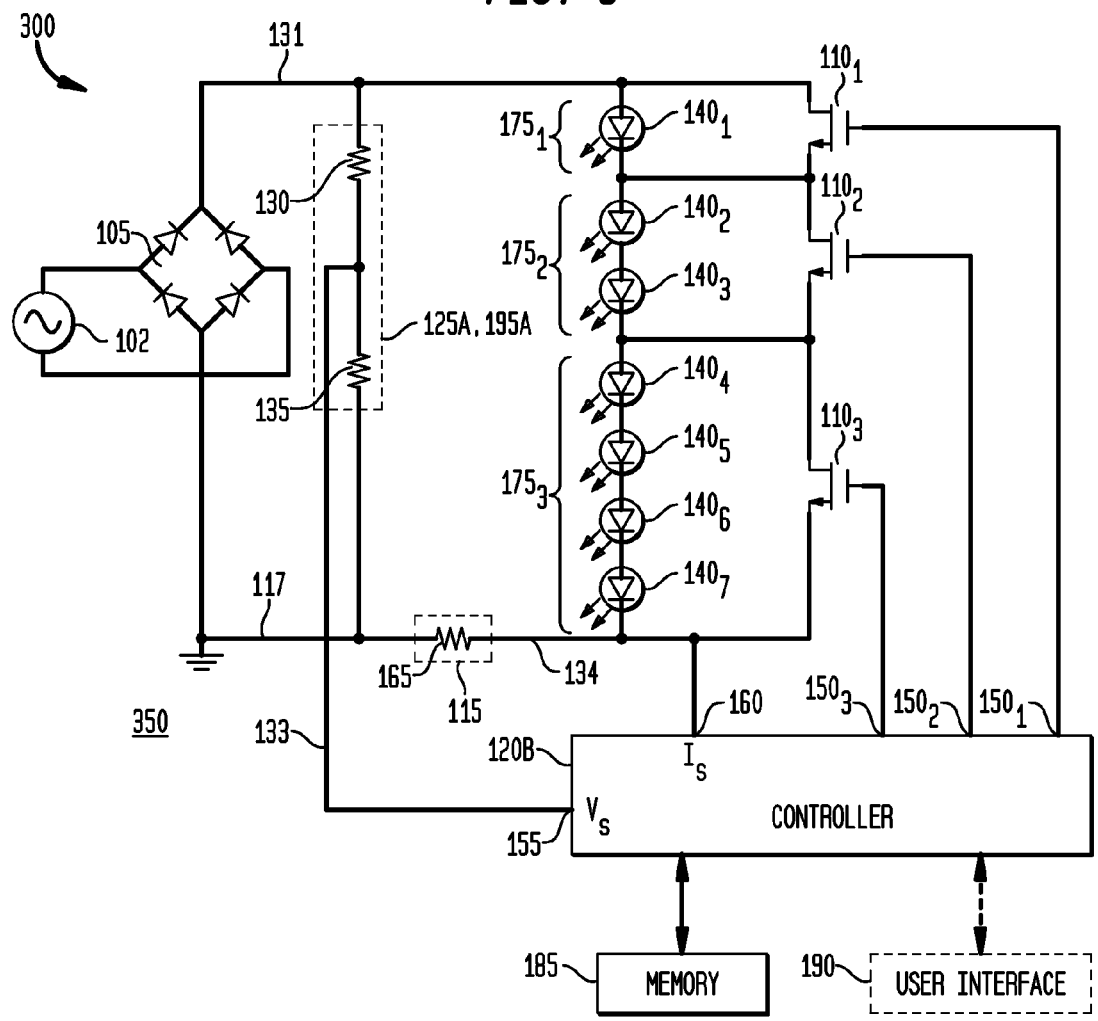
FIG. 5 is a block and circuit diagram illustrating a third representative system and a third representative apparatus in accordance with the teachings of the present disclosure.

FIG. 5 is a block and circuit diagram illustrating a third representative system 350 and a third representative apparatus 300 in accordance with the teachings of the present disclosure. Third representative system 350 also comprises the third representative apparatus 300 (also referred to equivalently as an off-line AC LED driver) coupled to an alternating current ("AC") line 102. The third representative apparatus 300 comprises a plurality of LEDs 140, a plurality of switches 110 (illustrated as MOSFETs, as an example), a controller 120B, a current sensor 115, a rectifier 105, and as an option, a voltage sensor 195 (illustrated as voltage sensor 195A, a voltage divider, using resistors 130 and 135) for providing a sensed input voltage level to the controller 120B. Also optional, a memory 185 and/or a user interface 190 may be included as discussed above. For ease of illustration, a DC power source circuit 125 is not illustrated separately in FIG. 5, but may be included in any circuit location as discussed above and as discussed in greater detail below.

Although illustrated with just three switches 110 and three LED segments 175, this apparatus 300 and system 350 configuration may be easily extended to additional LED segments 175 or reduced to a fewer number of LED segments 175. In addition, while illustrated with one, two, and four LEDs 140 in LED segments $175_1$, $175_2$, and $175_3$, respectively, the number of LEDs 140 in any given LED segment 175 may be higher, lower, equal, or unequal, and all such variations are within the scope of the disclosure. In this representative apparatus 300 and system 350, each switch 110 is coupled to each corresponding terminal of a corresponding LED segment 175, i.e., the drain of switch $110_1$ is coupled to a first terminal of LED segment $175_1$ (at the anode of LED $140_1$) and the source of switch $110_2$ is coupled to a second terminal of LED segment $175_2$ (at the cathode of LED $140_2$); the drain of switch $110_2$ is coupled to a first terminal of LED segment $175_2$ (at the anode of LED $140_2$) and the source of switch $110_2$ is coupled to a second terminal of LED segment $175_2$ (at the cathode of LED $140_3$); and the drain of switch $110_3$ is coupled to a first terminal of LED segment $175_3$ (at the anode of LED $140_4$) and the source of switch $110_3$ is coupled to a second terminal of LED segment $175_3$ (at the cathode of LED $140_7$). In this circuit configuration, the switches 110 allow for both bypassing a selected LED segment 175 and for blocking current flow, resulting in seven circuit states using just three switches 110, rather than seven switches. In addition, switching intervals may be selected in advance or determined dynamically to provide any selected usage or workload, such as a substantially balanced or equal workload for each LED segment 175, with each LED segment 175 coupled into the series LED 140 current path for the same duration during an AC half-cycle and with each LED segment 175 carrying substantially or approximately the same current.

Table 1 summarizes the different circuit states for the representative apparatus 300 and system 350. In Table 1, as a more general case in which "N" is equal to some integer number of LEDs 140, LED segment $175_1$ has "1N" number of LEDs 140, LED segment $175_2$ has "2N" number of LEDs 140, and LED segment $175_3$ has "3N" number of LEDs 140, with the last column providing the more specific case illustrated in FIG. 5 (N=1) in which LED segment $175_1$ has one LED 140, LED segment $175_2$ has two LEDs 140, and LED segment $175_3$ has four LEDs 140.

TABLE 1

| State | Switches On | Switches Off | LED segment 175 on | Total number of LEDs 140 on when N1 = N, N2 = 2N, N3 = 4N | Total number of LEDs 140 on for FIG. 5 |
|---|---|---|---|---|---|
| 1 | $110_2, 110_3$ | $110_1$ | $175_1$ | N | 1 |
| 2 | $110_1, 110_3$ | $110_2$ | $175_2$ | 2N | 2 |
| 3 | $110_3$ | $110_1, 110_2$ | $175_1 + 175_2$ | 3N | 3 |
| 4 | $110_1, 110_2$ | $110_3$ | $175_3$ | 4N | 4 |
| 5 | $110_2$ | $110_1, 110_3$ | $175_1 + 175_3$ | 5N | 5 |
| 6 | $110_1$ | $110_2, 110_3$ | $175_2 + 175_3$ | 6N | 6 |
| 7 | None | $110_1, 110_2, 110_3$ | $175_1 + 175_2 + 175_3$ | 7N | 7 |

In state one, current flows through LED segment $175_1$ (as switch $110_1$ is off and current is blocked in that bypass path) and through switches $110_2$, $110_3$. In state two, current flows through switch $110_1$, LED segment $175_2$, and switch $110_3$. In state three, current flows through LED segment $175_1$, LED segment $175_2$, and switch $110_3$, and so on, as provided in Table 1. It should be noted that as described above with respect to FIGS. 1 and 2, switching intervals and switching states may be provided for representative apparatus 300 and system 350 such that, as the rectified AC voltage increases, more LEDs 140 are coupled into the series LED 140 current path, and as the rectified AC voltage decreases, corresponding numbers of LEDs 140 are bypassed (switched out of the series LED 140 current path), with changes in current also capable of being modeled using Equation 1. It should also be noted that by varying the number of LED segments 175 and the number of LEDs 140 within each such LED segment 175 for representative apparatus 300 and system 350, virtually any combination and number of LEDs 140 may be switched on and off for any corresponding lighting effect, circuit parameter (e.g., voltage or current level), and so on. It should also be noted that for this representative configuration, all of the switches 110 should not be on and conducting at the same time.

Figure 6:
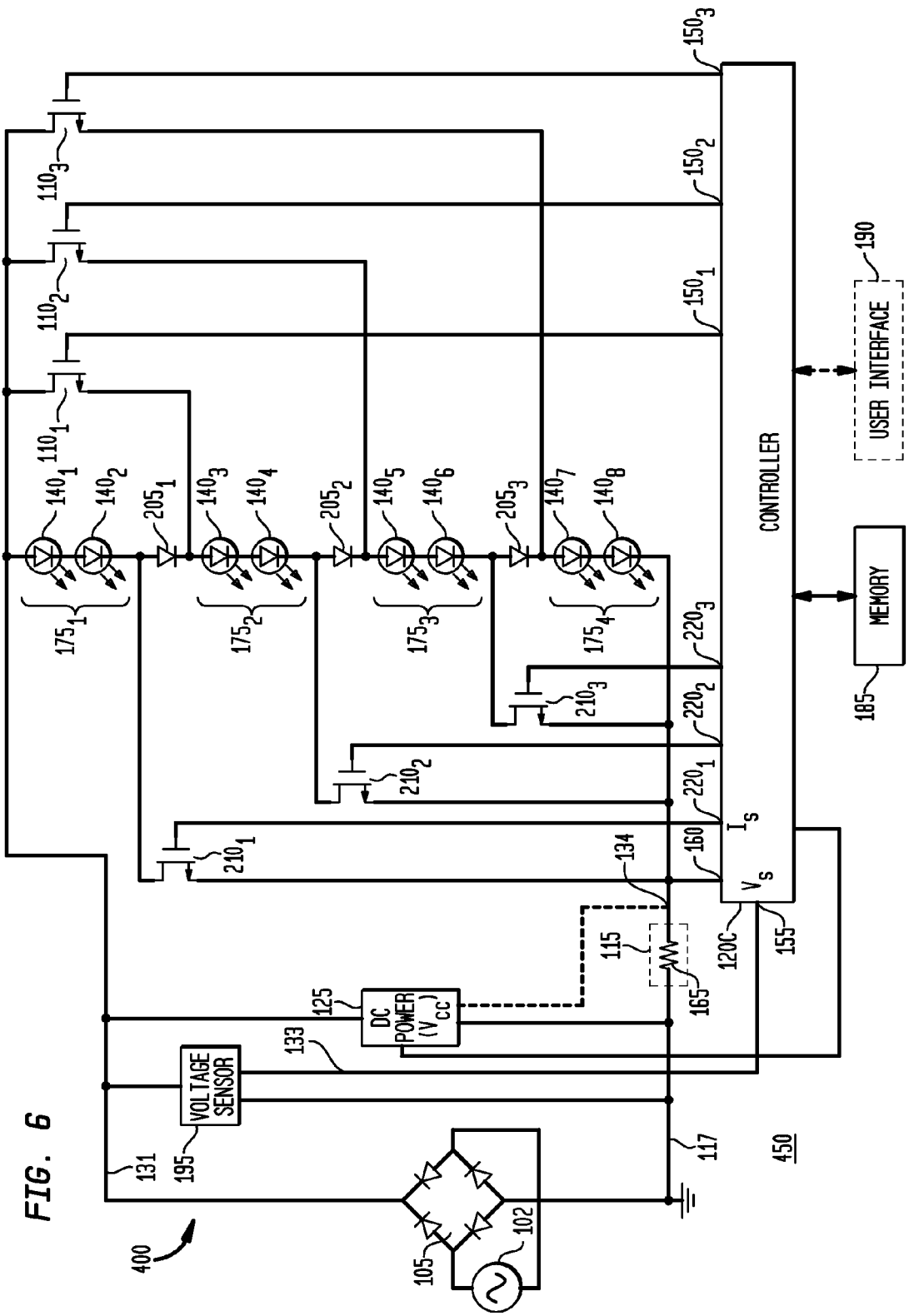
FIG. 6 is a block and circuit diagram illustrating a fourth representative system and a fourth representative apparatus in accordance with the teachings of the present disclosure.

FIG. 6 is a block and circuit diagram illustrating a fourth representative system 450 and a fourth representative apparatus 400 in accordance with the teachings of the present disclosure. Fourth representative system 450 also comprises the fourth representative apparatus 400 (also referred to equivalently as an off line AC LED driver) coupled to an alternating current ("AC") line 102. The fourth representative apparatus 400 also comprises a plurality of LEDs 140, a plurality of (first or "high side") switches 110 (illustrated as MOSFETs, as an example), a controller 120C, a current sensor 115, a rectifier 105, a plurality of (second or "low side") switches 210, a plurality of isolation (or blocking) diodes 205, and as an option, a voltage sensor 195 for providing a sensed input voltage level to the controller 120B. Also optional, a memory 185 and/or a user interface 190 may be included as discussed above.

Fourth representative system 450 and fourth representative apparatus 400 provide for both series and parallel configurations of LED segments 175, in innumerable combinations.

While illustrated in FIG. 6 with four LED segments 175 and two LEDs 140 in each LED segment 175 for ease of illustration and explanation, the configuration may be easily extended to additional LED segments 175 or reduced to a fewer number of LED segments 175 and that the number of LEDs 140 in any given LED segment 175 may be higher, lower, equal, or unequal, and all such variations are within the scope of the disclosure. For some combinations, however, it may be desirable to have an even number of LED segments 175.

The (first) switches 110, illustrated as switches $110_1$, $110_2$, and $110_3$, are correspondingly coupled to a first LED 140 of a corresponding LED segment 175 and to an isolation diode 205, as illustrated. The (second) switches 210, illustrated as switches $210_1$, $210_2$, and $210_3$, are correspondingly coupled to a last LED 140 of a corresponding LED segment 175 and to the current sensor 115 (or, for example, to a ground potential 117, or to another sensor, or to another node). A gate of each switch 210 is coupled to a corresponding output 220 of (and is under the control of) the controller 120C, illustrated as outputs $220_1$, $220_2$, and $220_3$. In this fourth representative system 450 and fourth representative apparatus 400, each switch 110 and 210 performs a current bypass function, such that when a switch 110 and/or 210 is on and conducting, current flows through the corresponding switch and bypasses remaining (or corresponding) one or more LED segments 175.

In the fourth representative system 450 and fourth representative apparatus 400, any of the LED segments 175 may be controlled individually or in conjunction with other LED segments 175. For example and without limitation, when switch $210_1$ is on and the remaining switches 110 and 210 are off, current is provided to LED segment $175_1$; when switches $110_1$ and $210_2$ are on and the remaining switches 110 and 210 are off, current is provided to LED segment $175_2$; when switches $110_2$ and $210_3$ are on and the remaining switches 110 and 210 are off, current is provided to LED segment $175_3$; and when switch $110_3$ is on and the remaining switches 110 and 210 are off, current is provided to LED segment $175_4$.

Also for example and without limitation, any of the LED segments 175 may be configured in any series combination to form a series LED 140 current path, such as: when switch $210_2$ is on and the remaining switches 110 and 210 are off, current is provided to LED segment $175_1$ and LED segment $175_2$ in series; when switch $110_2$ is on and the remaining switches 110 and 210 are off, current is provided to LED segment $175_3$ and LED segment $175_4$ in series; when switches $110_1$ and $210_3$ are on and the remaining switches 110 and 210 are off, current is provided to LED segment $175_2$ and LED segment $175_3$ in series; and so on.

In addition, a wide variety of parallel and series combinations of LED segments 175 are also available. For example and also without limitation, when all switches 110 and 210 are on, all LED segments 175 are configured in parallel, thereby providing a plurality of parallel LED 140 current paths; when switches $110_2$ and $210_2$ are on and the remaining switches 110 and 210 are off, LED segment $175_1$ and LED segment $175_2$ are in series with each other forming a first series LED 140 current path, LED segment $175_3$ and LED segment $175_4$ are in series with each other forming a second series LED 140 current path, and these two series combinations are further in parallel with each other (series combination of LED segment $175_1$ and LED segment $175_2$ is in parallel with series combination LED segment $175_3$ and LED segment $175_4$), forming a parallel LED 140 current path comprising a parallel combination of two series LED 140 current paths; and when all switches 110 and 210 are off, all LED segments 175 are configured to form one series LED 140 current path, as one string of LEDs 140 connected to the rectified AC voltage.

It should also be noted that by varying the number of LED segments 175 and the number of LEDs 140 within each such LED segment 175 for representative apparatus 400 and system 450, virtually any combination and number of LEDs 140 may be switched on and off for any corresponding lighting effect, circuit parameter (e.g., voltage or current level), and so on, as discussed above, such as for substantially tracking the rectified AC voltage level by increasing the number of LEDs 140 coupled in series, parallel, or both, in any combination.

Figure 7:
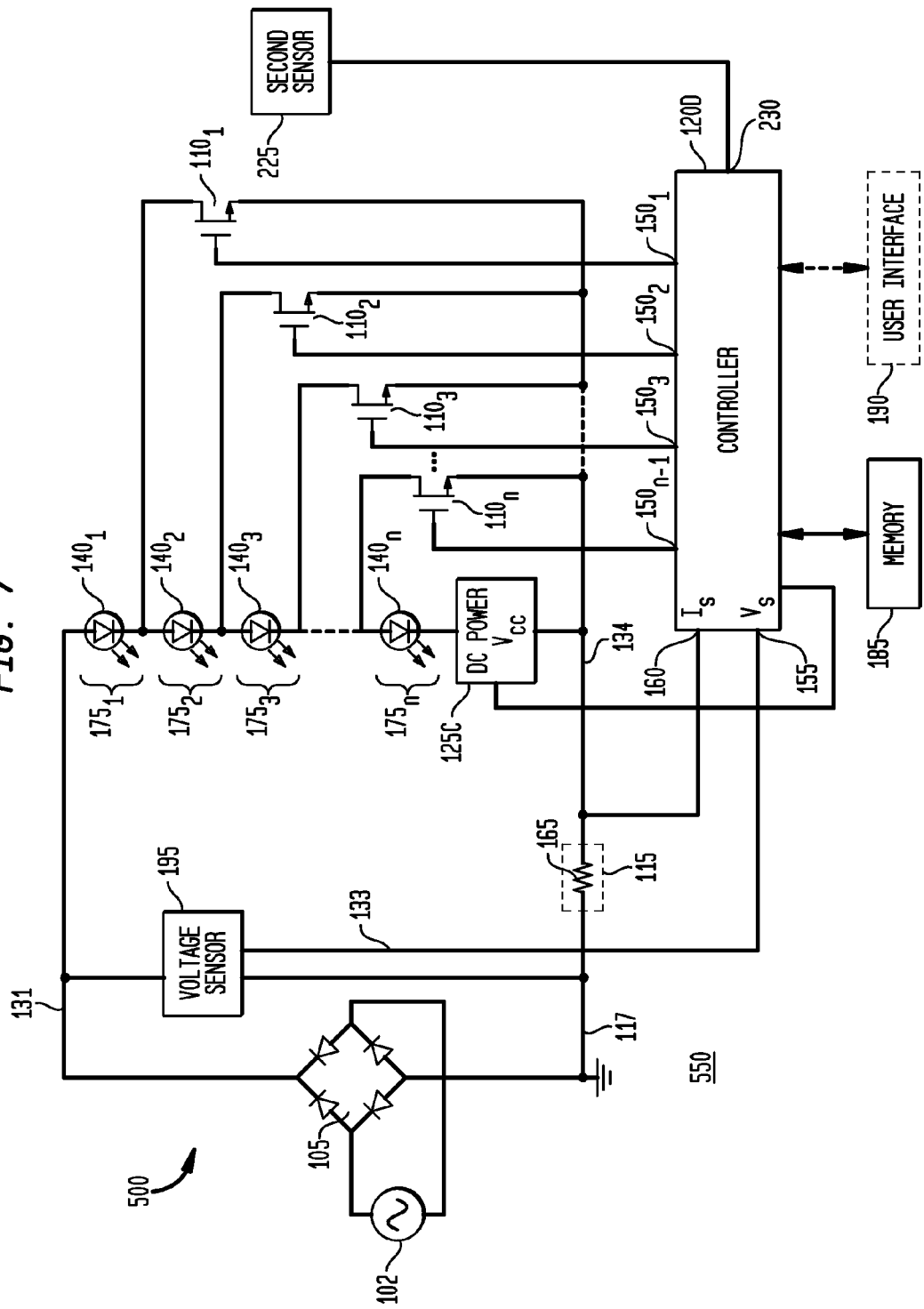
FIG. 7 is a block and circuit diagram illustrating a fifth representative system and a fifth representative apparatus in accordance with the teachings of the present disclosure.

FIG. 7 is a block and circuit diagram illustrating a fifth representative system 550 and a fifth representative apparatus 500 in accordance with the teachings of the present disclosure. Fifth representative system 550 and fifth representative apparatus 500 are structurally similar to and operate substantially similarly to the first representative system 50 and the first representative apparatus 100, and differ insofar as fifth representative system 550 and fifth representative apparatus 500 further comprise a (second) sensor 225 (in addition to current sensor 115), which provides selected feedback to controller 120D through a controller input 230, and also comprises a DC power source circuit 125C, to illustrate another representative circuit location for such a power source. FIG. 7 also illustrates, generally, an input voltage sensor 195. An input voltage sensor 195 may also be implemented as a voltage divider, using resistors 130 and 135. For this representative embodiment, a DC power source circuit 125C is implemented in series with the last LED segment $175_n$, and a representative third DC power source circuit 125C is discussed below with reference to FIG. 20.

For example and without limitation, second sensor 225 may be an optical sensor or a thermal sensor. Continuing with the example, in a representative embodiment in which second sensor 225 is an optical sensor providing feedback to the controller 120D concerning light emitted from the LEDs 140, the plurality of LED segments 175 may be comprised of different types of LEDs 140 having different light emission spectra, such as light emission having wavelengths in the red, green, blue, amber, etc., visible ranges. For example, LED segment $175_1$ may be comprised of red LEDs 140, LED segment $175_2$ may be comprised of green LEDs 140, LED segment $175_3$ may be comprised of blue LEDs 140, another LED segment $175_{n-1}$ may be comprised of amber or white LEDs 140, and so on. Also for example, LED segment $175_2$ may be comprised of amber or red LEDs 140 while the other LED segments 175 are comprised of white LEDs, and so on. As mentioned above, in such representative embodiments, using feedback from the optical second sensor 225, a plurality of time periods $t_1$ through $t_n$ may be determined by the controller 120D for switching current (through switches 110) which correspond to a desired or selected architectural lighting effect such as ambient or output color control (i.e., control over color temperature), such that current is provided through corresponding LED segments 175 to provide corresponding light emissions at corresponding wavelengths, such as red, green, blue, amber, white, and corresponding combinations of such wavelengths (e.g., yellow as a combination of red and green). Innumerable switching patterns and types of LEDs 140 may be utilized to achieve any selected lighting effect, any and all of which are within the scope of the disclosure as claimed.

Figure 8:
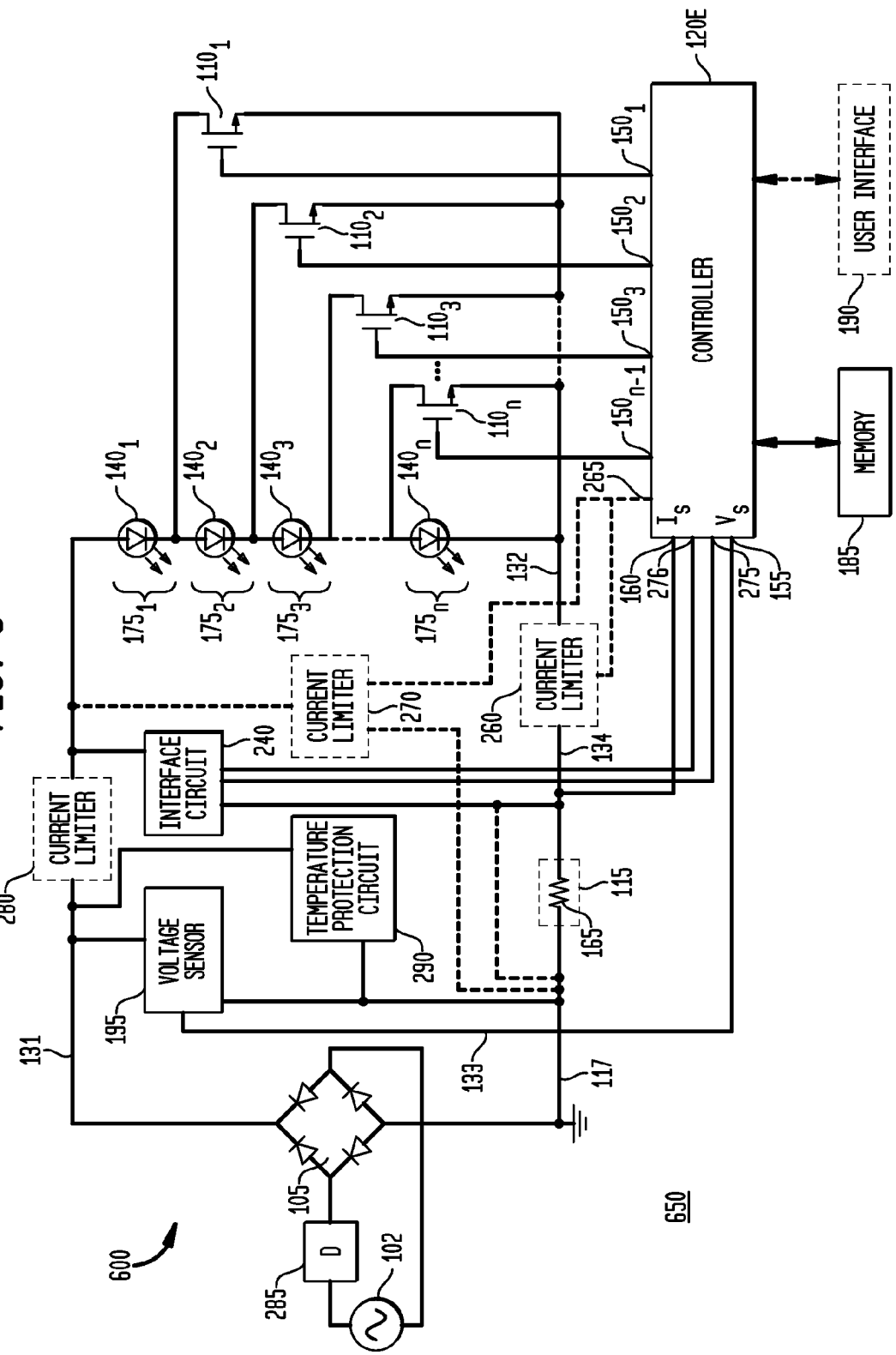
FIG. 8 is a block and circuit diagram illustrating a sixth representative system and a sixth representative apparatus in accordance with the teachings of the present disclosure.

FIG. 8 is a block and circuit diagram illustrating a sixth representative system 650 and a sixth representative apparatus 600 in accordance with the teachings of the present disclosure. Sixth representative system 650 comprises the sixth representative apparatus 600 (also referred to equivalently as an off line AC LED driver) coupled to an AC line 102. The sixth representative apparatus 600 also comprises a plurality of LEDs 140, a plurality of switches 110 (illustrated as MOSFETs, as an example), a controller 120E, a current sensor 115, a rectifier 105, and as an option, a voltage sensor 195 for providing a sensed input voltage level to the controller 120. Also optional, a memory 185 and/or a user interface 190 may be included as discussed above.

As optional components, the sixth representative apparatus 600 further comprises a current limiter circuit 260, 270, or 280, and may also comprise an interface circuit 240, a voltage sensor 195, and a temperature protection circuit 290. The current limiter circuit 260, 270, or 280 is utilized to prevent a potentially large increase in LED 140 current, such as if the rectified AC voltage becomes unusually high while a plurality of LEDs 140 are switched into the series LED 140 current path. The current limiter circuit 260, 270, or 280 may be active, under the control of controller 120E and possibly having a bias or operational voltage, or may be passive and independent of the controller 120E and having any bias or operational voltage. While three locations and several different embodiments of current limiting circuits 260, 270, or 280 are illustrated, it should be understood that only one of the current limiter circuits 260, 270, or 280 is selected for any given device implementation. The current limiter circuit 260 is located on the "low side" of the sixth representative apparatus 600, between the current sensor 115 (node 134) and the sources of switches 110 (also a cathode of the last LED $140_n$) (node 132); equivalently, such a current limiter circuit 260 may also be located between the current sensor 115 and ground potential 117 (or the return path of the rectifier 105). As an alternative, the current limiter circuit 280 is located on the "high side" of the sixth representative apparatus 600, between node 131 and the anode of the first LED $140_1$ of the series LED 140 current path. As another alternative, the current limiter circuit 270 may be utilized between the "high side" and the "low side" of the sixth representative apparatus 600, coupled between the top rail (node 131) and the ground potential 117 (or the low or high (node 134) side of current sensor 115, or another circuit node, including node 131). The current limiter circuits 260, 270, and 280 may be implemented in a wide variety of configurations and may be provided in a wide variety of locations within the sixth representative apparatus 600 (or any of the other apparatuses 100, 200, 300, 400, 500, 700, 800, 900, 1000, 1100, 1200, 1300), with several representative current limiter circuits 260, 270, and 280 illustrated and discussed with reference to FIGS. 9-12.

The interface circuit 240 is utilized to provide backwards (or retro-) compatibility with switches, such as a dimmer switch 285 which may provide a phase modulated dimming control and may include a minimum holding or latching current for proper operation. Under various circumstances and at different times during the AC cycle, one or more of the LEDs 140 may or may not be drawing such a minimum holding or latching current, which may result in improper operation of such a dimmer switch 285. Because a device manufacturer generally will not know in advance whether a lighting device such as sixth representative apparatus 600 will be utilized with a dimmer switch 285, an interface circuit 240 may be included in the lighting device. Representative interface circuits 240 will generally monitor the LED 140 current and, if less than a predetermined threshold (e.g., 50 mA), will draw more current through the sixth representative apparatus 600 (or any of the other apparatuses 100, 200, 300, 400, 500, 700, 800, 900, 1000, 1100, 1200, 1300). Representative interface circuits 240 may be implemented in a wide variety of configurations and may be provided in a wide variety of locations within the sixth representative apparatus 600 (or any of the other apparatuses 100, 200, 300, 400, 500, 700, 800, 900, 1000, 1100, 1200, 1300), with several representative interface circuits 240 illustrated and discussed with reference to FIGS. 13-17.

The voltage sensor 195 is utilized to sense an input voltage level of the rectified AC voltage from the rectifier 105. The representative input voltage sensor 195 may also be implemented as a voltage divider, using resistors 130 and 135, as discussed above. The voltage sensor 195 may be implemented in a wide variety of configurations and may be provided in a wide variety of locations within the sixth representative apparatus 600 (or any of the other apparatuses 100, 200, 300, 400, 500, 700, 800, 900, 1000, 1100, 1200, 1300), in addition to the previously illustrated voltage divider, with all such configurations and locations considered equivalent and within the scope of the disclosure as claimed.

The temperature protection circuit 290 is utilized to detect an increase in temperature over a predetermined threshold, and if such a temperature increase has occurred, to decrease the LED 140 current and thereby serves to provide some degree of protection of the representative apparatus 600 from potential temperature-related damage. Representative temperature protection circuits 290 may be implemented in a wide variety of configurations and may be provided in a wide variety of locations within the sixth representative apparatus 600 (or any of the other apparatuses 100, 200, 300, 400, 500, 700, 800, 900, 1000, 1100, 1200, 1300), with a representative temperature protection circuit 290A illustrated and discussed with reference to FIG. 11.

Figure 9:
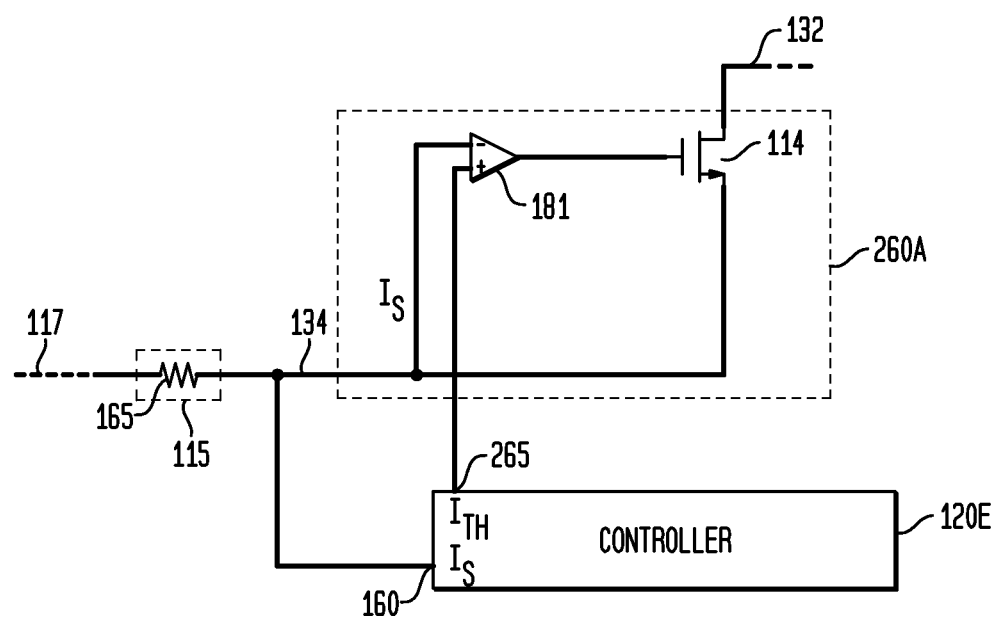
FIG. 9 is a block and circuit diagram illustrating a first representative current limiter in accordance with the teachings of the present disclosure.

FIG. 9 is a block and circuit diagram illustrating a first representative current limiter 260A in accordance with the teachings of the present disclosure. Representative current limiter 260A is implemented on the "low side" of the sixth representative apparatus 600 (or any of the other apparatuses 100, 200, 300, 400, 500, 700, 800, 900, 1000, 1100, 1200, 1300), between nodes 134 and 132, and is an "active" current limiting circuit. A predetermined or dynamically determined first threshold current level ("$I_{TH1}$") (e.g., a high or maximum current level for a selected specification) is provided by controller 120E (output 265) to a non-inverting terminal of error amplifier 181, which compares the threshold current $I_{TH1}$ (as a corresponding voltage) to the current $I_S$ (also as a corresponding voltage) through the LEDs 140 (from current sensor 115). When current $I_S$ through the LEDs 140 is less than the threshold current $I_{TH1}$, the output of the error amplifier 181 increases and is high enough to maintain the switch 114 (also referred to as a pass element) in an on state and allowing current $I_S$ to flow. When current $I_S$ through the LEDs 140 has increased to be greater than the threshold current $I_{TH1}$, the output of the error amplifier 181 decreases in a linear mode, controlling (or gating) the switch 114 in a linear mode and providing for a reduced level of current $I_S$ to flow.

Figure 10:
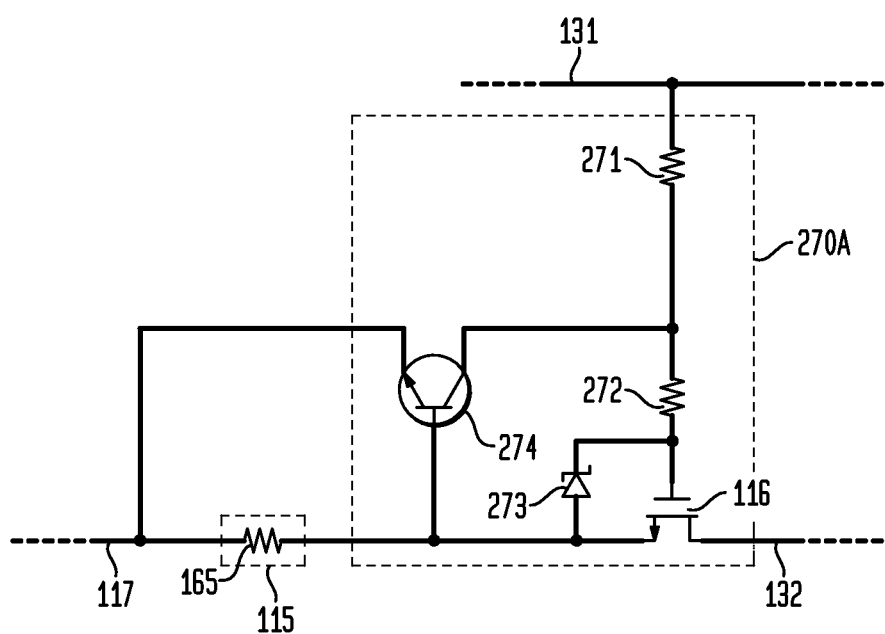
FIG. 10 is a circuit diagram illustrating a second representative current limiter in accordance with the teachings of the present disclosure.

FIG. 10 is a block and circuit diagram illustrating a second representative current limiter 270A in accordance with the teachings of the present disclosure. The representative current limiter 270A is implemented between the "high side" (node 131) and the "low side" of sixth representative apparatus 600 (or any of the other apparatuses 100, 200, 300, 400, 500, 700, 800, 900, 1000, 1100, 1200, 1300), at node 117 (the low side of current sensor 115) and at node 132 (the cathode of the last series-connected LED $140_n$), and is a "passive" current limiting circuit. First resistor 271 and second resistor 272 are coupled in series to form a bias network coupled between node 131 (e.g., the positive terminal of rectifier 105) and the gate of switch 116 (also referred to as a pass element), and during typical operation biases the switch 116 in a conduction mode. An NPN transistor 274 is coupled at its collector to second resistor 272 and coupled across its base-emitter junction to current sensor 115. In the event a voltage drop across the current sensor 115 (e.g., resistor 165) reaches a breakdown voltage of the base-emitter junction of transistor 274, the transistor 274 starts conducting, controlling (or gating) the switch 116 in a linear mode and providing for a reduced level of current $I_S$ to flow. It should be noted that this second representative current limiter 270A may not include any operational (bias) voltage for operation. Zener diode 273 serves to limit the gate-to-source voltage of transistor (FET) 116.

Figure 11:
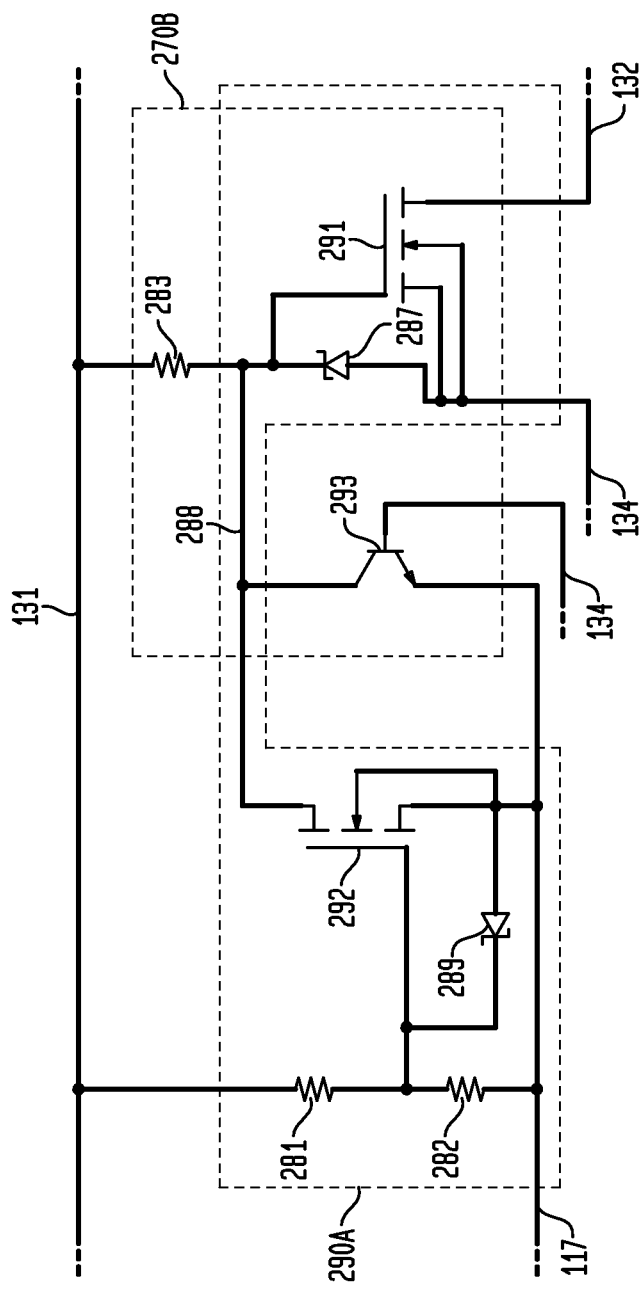
FIG. 11 is a circuit diagram illustrating a third representative current limiter and a temperature protection circuit in accordance with the teachings of the present disclosure.

FIG. 11 is a block and circuit diagram illustrating a third representative current limiter circuit 270B and a temperature protection circuit 290A in accordance with the teachings of the present disclosure. The representative current limiter 270B also is implemented between the "high side" (node 131) and the "low side" of sixth representative apparatus 600 (or any of the other apparatuses 100, 200, 300, 400, 500, 700, 800, 900, 1000, 1100, 1200, 1300), at node 117 (the low side of current sensor 115), at node 134 (the high side of current sensor 115), and at node 132 (the cathode of the last series-connected LED $140_n$), and is a "passive" current limiting circuit. The third representative current limiter 270B comprises resistor 283, zener diode 287, and two switches or transistors, illustrated as transistor (FET) 291 and NPN bipolar junction transistor (BJT) 293. In operation, transistor (FET) 291 is usually on and conducting LED 140 current (between nodes 132 and 134), with a bias provided by resistor 283 and zener diode 287. A voltage across current sensor 115 (between nodes 134 and 117) biases the base emitter junction of transistor 293, and in the event that LED 140 current exceeds the predetermined limit, this voltage will be high enough to turn on transistor 293, which will pull node 288 (and the gate of transistor (FET) 291) toward a ground potential, and decrease the conduction through transistor (FET) 291, thereby limiting the LED 140 current. Zener diode 287 serves to limit the gate-to-source voltage of transistor (FET) 291.

The representative temperature protection circuit 290A comprises first resistor 281 and second, temperature-dependent resistor 282 configured as a voltage divider, zener diodes 289 and 287, and two switches or transistors, illustrated as FETs 292 and 291. As operating temperature increases, the resistance of resistor 282 increases, increasing the voltage applied to the gate of transistor (FET) 292, which also will pull node 288 (and the gate of transistor (FET) 291) toward a ground potential, and decrease the conduction through transistor (FET) 291, thereby limiting the LED 140 current. Zener diode 289 also serves to limit the gate-to-source voltage of transistor (FET) 292.

Figure 12:
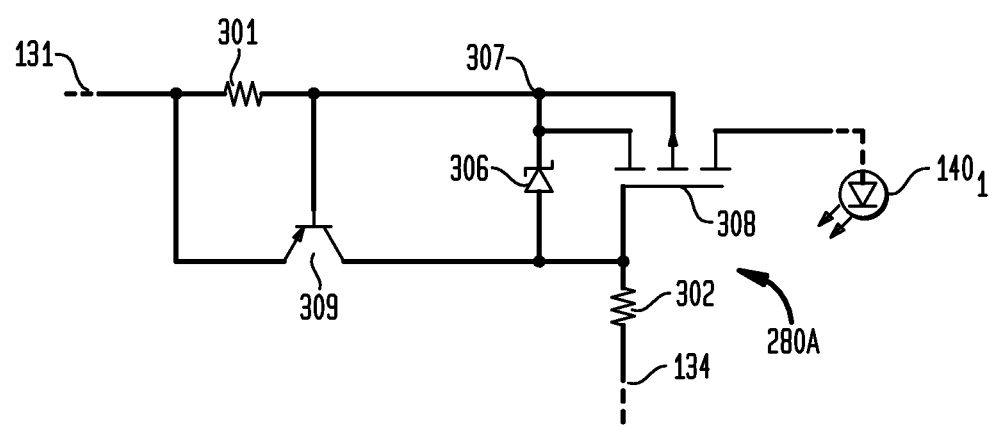
FIG. 12 is a circuit diagram illustrating a fourth representative current limiter in accordance with the teachings of the present disclosure.

FIG. 12 is a block and circuit diagram illustrating a fourth representative current limiter 280A in accordance with the teachings of the present disclosure. The current limiter circuit 280A is located on the "high side" of the sixth representative apparatus 600 (or any of the other apparatuses 100, 200, 300, 400, 500, 700, 800, 900, 1000, 1100, 1200, 1300), between node 131 and the anode of the first LED 140, of the series LED 140 current path, and is further coupled to node 134 (the high side of current sensor 115). The fourth representative current limiter 280A comprises a second current sensor, implemented as a resistor 301; zener diode 306; and two switches or transistors, illustrated as transistor (P-type FET) 308 and transistor (PNP BJT) 309 (and optional second resistor 302, coupled to node 134 (the high side of current sensor 115)). A voltage across second current sensor 301 biases the emitter-base junction of transistor 309, and in the event that LED 140 current exceeds a predetermined limit, this voltage will be high enough to turn on transistor 309, which will pull node 307 (and the gate of transistor (FET) 308) toward a higher voltage, and decrease the conduction through transistor (FET) 308, thereby limiting the LED 140 current. Zener diode 306 serves to limit the gate-to-source voltage of transistor (FET) 308.

As mentioned above, an interface circuit 240 is utilized to provide backwards (or retro-) compatibility with switches, such as a dimmer switch 285, which may provide a phase modulated dimming control and may include a minimum holding or latching current for proper operation. Representative interface circuits 240 may be implemented in a wide variety of configurations and may be provided in a wide variety of locations within the representative apparatuses 100, 200, 300, 400, 500, 600, 700, 800, 900, 1000, 1100, 1200, 1300, including those illustrated and discussed below.

Figure 13:
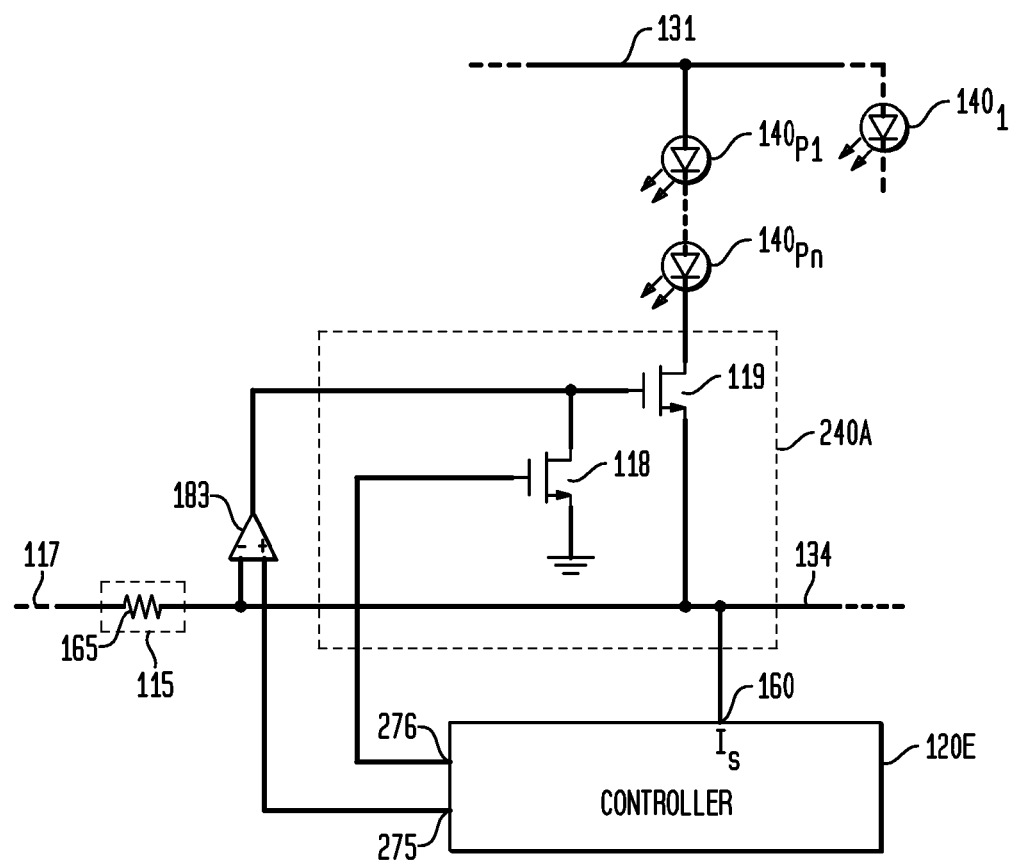
FIG. 13 is a block and circuit diagram illustrating a first representative interface circuit in accordance with the teachings of the present disclosure.

FIG. 13 is a block and circuit diagram illustrating a first representative interface circuit 240A in accordance with the teachings of the present disclosure. Representative interface circuit 240A is implemented between the "high side" (node 131) and the "low side" of sixth representative apparatus 600 (or any of the other apparatuses 100, 200, 300, 400, 500, 700, 800, 900, 1000, 1100, 1200, 1300), at node 134 (the high side of current sensor 115) or at another low side node 132. The first representative interface circuit 240A comprises first and second switches 118 and 119, and error amplifier (or comparator) 183. A pass element illustrated as the switch (FET) 119 is coupled to an additional one or more LEDs 140 (which are in parallel to the series LED 140 current path), illustrated as LEDs $140_{P1}$ through $140_{Pn}$, to provide useful light output and avoid ineffective power losses in the switch 119 when it is conducting. A predetermined or dynamically determined second threshold current level ("$I_{TH2}$") (e.g., a minimum holding or latching current level for a dimmer switch 285) is provided by controller 120E (output 275) to a non-inverting terminal of error amplifier (or comparator) 183, which compares the threshold current $I_{TH2}$ (as a corresponding voltage) to the current level $I_S$ (also as a corresponding voltage) through the LEDs 140 (from current sensor 115). The controller 120E also receives information of the current level $I_S$ (e.g., as a voltage level) from current sensor 115. When current $I_S$ through the LEDs 140 is greater than the threshold current $I_{TH2}$, such as a minimum holding or latching current, the controller 120E turns on switch 118 (connected to the gate of switch 119), effectively turning the switch 119 off and disabling the current sinking capability of the first representative interface circuit 240A, so that the first representative interface circuit 240A does not draw any additional current. When current $I_S$ through the LEDs 140 is less than the threshold current $I_{TH2}$, such as being less than a minimum holding or latching current, the controller 120E turns off switch 118, and switch 119 is operated in a linear mode by the output of the error amplifier (or comparator) 183, which allows additional current $I_S$ to flow through LEDs $140_{P1}$ through $140_{Pn}$ and switch 119.

Figure 14:
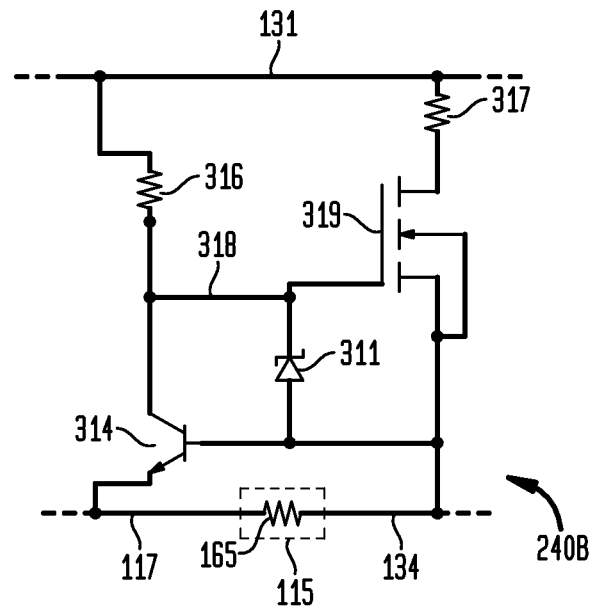
FIG. 14 is a block and circuit diagram illustrating a second representative interface circuit in accordance with the teachings of the present disclosure.

FIG. 14 is a circuit diagram illustrating a second representative interface circuit 240B in accordance with the teachings of the present disclosure. Representative interface circuit 240B is implemented between the "high side" (node 131) and the "low side" of sixth representative apparatus 600 (or any of the other apparatuses 100, 200, 300, 400, 500, 700, 800, 900, 1000, 1100, 1200, 1300), such as coupled across current sensor 115 (implemented as a resistor 165) at nodes 134 and 117. The second representative interface circuit 240B comprises first and second resistors 316, 317; zener diode 311 (to clamp the gate voltage of transistor 319); and two switches or transistors, illustrated as N-type FET 319 and transistor (NPN BJT) 314. When current $I_S$ through the LEDs 140 is greater than the threshold current $I_{TH2}$, such as a minimum holding or latching current, a voltage is generated across current sensor 115 (implemented as a resistor 165), which biases the base-emitter junction of transistor 314, turning or maintaining the transistor 314 on and conducting, which pulls node 318 to the voltage of node 117, which in this case is a ground potential, effectively turning or maintaining transistor 319 off and not conducting, disabling the current sinking capability of the second representative interface circuit 240B, so that it does not draw any additional current. When current $I_S$ through the LEDs 140 is less than the threshold current $I_{TH2}$, such as being less than a minimum holding or latching current, the voltage generated across current sensor 115 (implemented as a resistor 165) is insufficient to bias the base-emitter junction of transistor 314 and cannot turn or maintain the transistor 314 in an on and conducting state. A voltage generated across first resistor 316 pulls node 318 up to a high voltage, turning on transistor 319, which allows additional current $I_S$ to flow through second resistor 317 and transistor 319.

Figure 15:
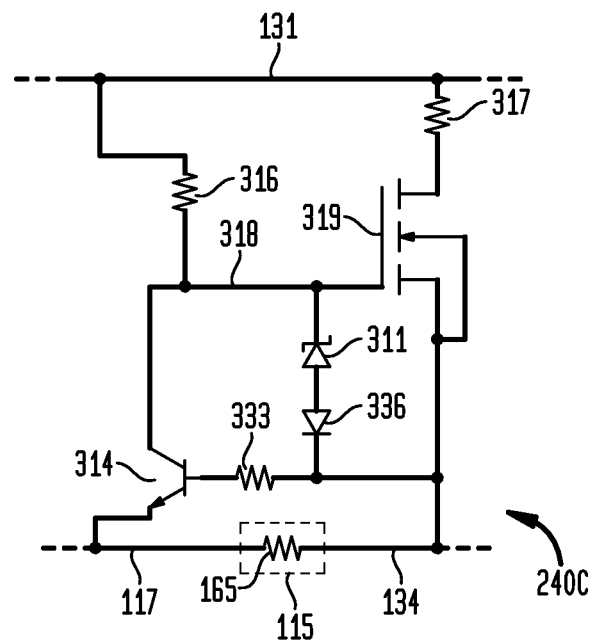
FIG. 15 is a block and circuit diagram illustrating a third representative interface circuit in accordance with the teachings of the present disclosure.

FIG. 15 is a circuit diagram illustrating a third representative interface circuit 240C in accordance with the teachings of the present disclosure. Representative interface circuit 240C may be configured and located as described above for second representative interface circuit 240B, and comprises an additional resistor 333 and blocking diode 336, to prevent a potential discharge path through diode 311 and avoid allowing current paths which do not go through current sensor 115 (implemented as a resistor 165).

Figure 16:
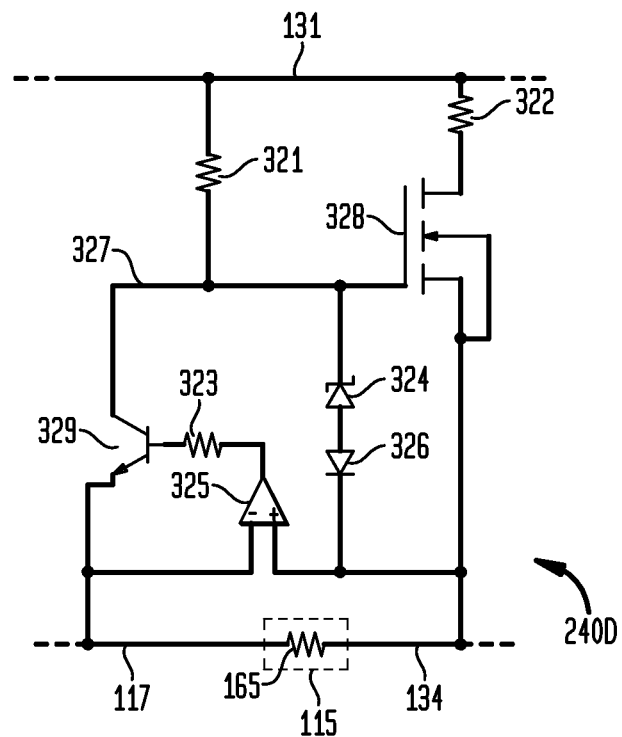
FIG. 16 is a block and circuit diagram illustrating a fourth representative interface circuit in accordance with the teachings of the present disclosure.

FIG. 16 is a block and circuit diagram illustrating a fourth representative interface circuit 240D in accordance with the teachings of the present disclosure. Representative interface circuit 240D is also implemented between the "high side" (node 131) and the "low side" of sixth representative apparatus 600 (or any of the other apparatuses 100, 200, 300, 400, 500, 700, 800, 900, 1000, 1100, 1200, 1300), such as coupled across current sensor 115 (implemented as a resistor 165) at nodes 134 and 117. The fourth representative interface circuit 240D comprises first, second, and third resistors 321, 322, and 323; zener diode 324 (to clamp the gate voltage of transistor 328); blocking diode 326; operational amplifier ("op amp") 325 and two switches or transistors, illustrated as N-type FET 328 and NPN BJT 329. Op amp 325 amplifies a voltage difference generated across current sensor 115 (implemented as the resistor 165), and allows use of the current sensor 115 which has a comparatively low impedance or resistance. When current $I_S$ through the LEDs 140 is greater than the threshold current $I_{TH2}$, such as a minimum holding or latching current, this amplified voltage (which biases the base-emitter junction of transistor 329), turns or maintains the transistor 329 on and conducting, which pulls node 327 to the voltage of node 117, which in this case is a ground potential, effectively turning or maintaining transistor 328 off and not conducting, disabling the current sinking capability of the second representative interface circuit 240C, so that it does not draw any additional current. When current $I_S$ through the LEDs 140 is less than the threshold current $I_{TH2}$, such as being less than a minimum holding or latching current, the amplified voltage is insufficient to bias the base-emitter junction of transistor 329 and cannot turn or maintain the transistor 329 in an on and conducting state. A voltage generated across resistor 321 pulls node 327 up to a high voltage, turning on transistor 328, which allows additional current $I_S$ to flow through resistor 322 and transistor 328.

Figure 17:
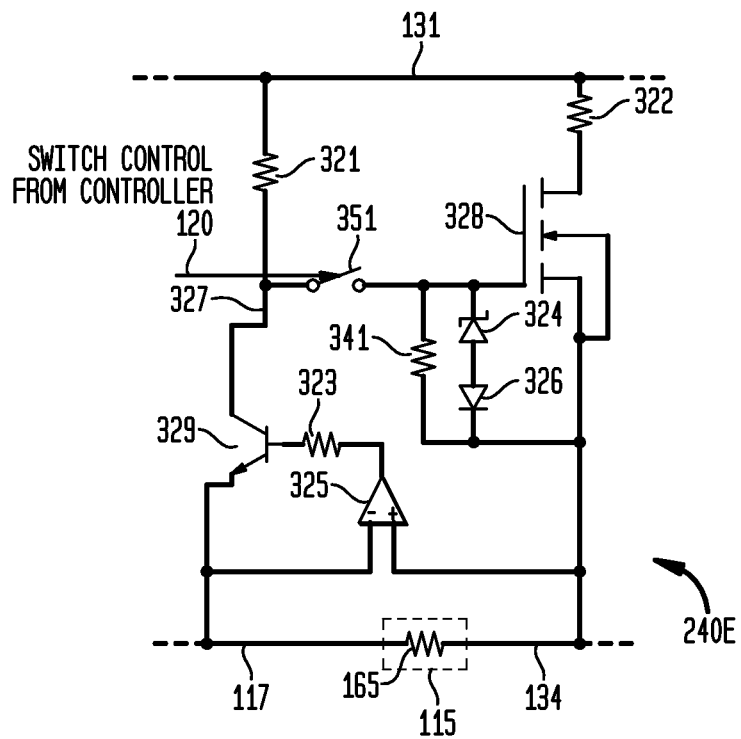
FIG. 17 is a block and circuit diagram illustrating a fifth representative interface circuit in accordance with the teachings of the present disclosure.

FIG. 17 is a block and circuit diagram illustrating a fifth representative interface circuit 240E in accordance with the teachings of the present disclosure. Representative interface circuit 240E may be configured and located as described above for fourth representative interface circuit 240D, and comprises an additional resistor 341 and a switch 351 (controlled by controller 120). For this fifth representative interface circuit 240E, the various LED segments 175 are also utilized to draw sufficient current, such that the current $I_S$ through the LEDs 140 is greater than or equal to the threshold current $I_{TH2}$. In operation, the LED 140 peak current ($I_p$) is greater than the threshold current $I_{TH2}$ by a significant or reasonable margin, such as 2-3 times the threshold current $I_{TH2}$. As LED segments 175 are switched into the series LED 140 current path, however, initially the LED 140 current may be less than the threshold current $I_{TH2}$. Accordingly, when LED segment 175$_1$ (without any of the remaining LED segments 175) is initially conducting and has a current less than the threshold current $I_{TH2}$, the controller 120 closes switch 351, and allows transistor 328 to source additional current through resistor 322, until the LED 140 current is greater than threshold current $I_{TH2}$ and transistor 329 pulls node 327 back to a low potential. Thereafter, the controller maintains the switch 351 in an open position, and LED segment 175$_1$ provides for sufficient current to be maintained through the LED segments 175.

Accordingly, to avoid the level of the LED 140 current falling below the threshold current $I_{TH2}$ as a next LED segment 175 is switched into the series LED 140 current path, when such a next LED segment 175 is being switched into the series LED 140 current path, such as LED segment 175$_2$, the controller 120 allows two switches 110 to be on and conducting, in this case both switch 110$_1$ and 110$_2$, allowing sufficient LED 140 current to continue to flow through LED segment 175$_1$ while current increases in LED segment 175$_2$. When sufficient current is also flowing through LED segment 175$_2$, switch 110 is turned off with switch 110$_2$ remaining on, and the process continues for each remaining LED segment 175. For example, when such a next LED segment 175 is being switched into the series LED 140 current path, such as LED segment 175$_3$, the controller 120 also allows two switches 110 to be on and conducting, in this case both switches 110$_2$ and 110$_3$, allowing sufficient LED 140 current to continue to flow through LED segment 175$_2$ while current increases in LED segment 175$_3$.

Not separately illustrated, another type of interface circuit 240 which may be utilized may be implemented as a constant current source, which draws a current which is greater than or equal to the threshold current $I_{TH2}$, such as a minimum holding or latching current, regardless of the current $I_S$ through the LEDs 140.

Figure 18:
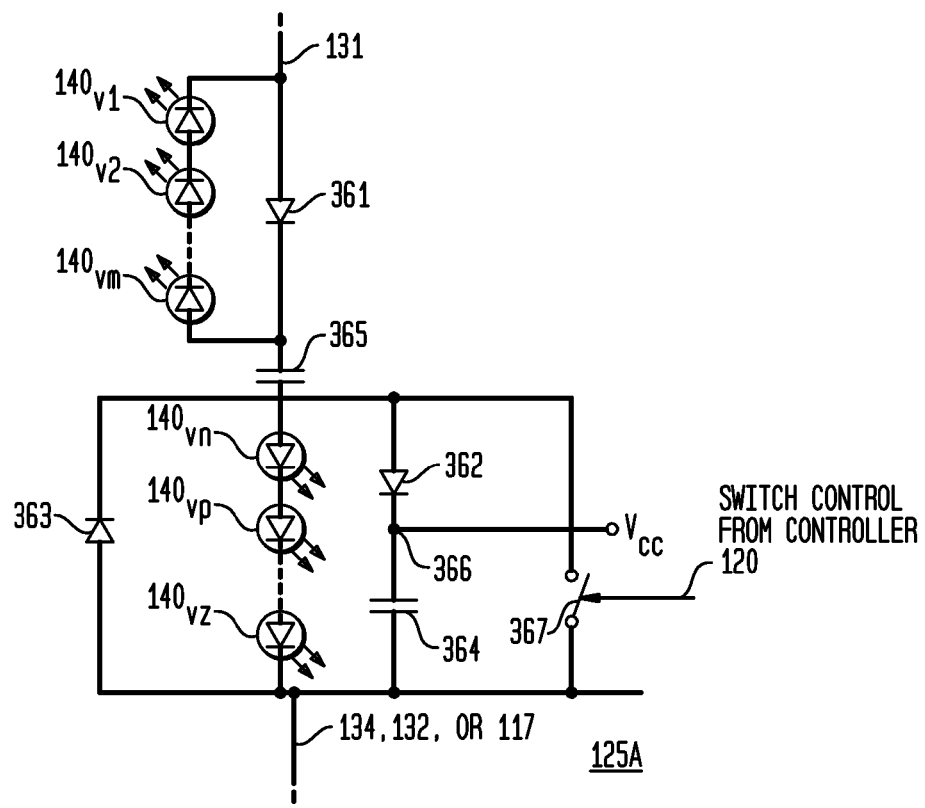
FIG. 18 is a circuit diagram illustrating a first representative DC power source circuit in accordance with the teachings of the present disclosure.

FIG. 18 is a circuit diagram illustrating a first representative DC power source circuit 125A in accordance with the teachings of the present disclosure. As mentioned above, representative DC power source circuits 125 may be utilized to provide DC power, such as Vcc, for use by other components within representative apparatuses 100, 200, 300, 400, 500, 600, 700, 800, 900, 1000, 1100, 1200, 1300. Representative DC power source circuits 125 may be implemented in a wide variety of configurations, and may be provided in a wide variety of locations within the sixth representative apparatus 600 (or any of the other apparatuses 100, 200, 300, 400, 500, 700, 800, 900, 1000, 1100, 1200, 1300), in addition to the various configurations illustrated and discussed herein, any and all of which are considered equivalent and within the scope of the disclosure as claimed.

Representative DC power source circuit 125A is implemented between the "high side" (node 131) and the "low side" of sixth representative apparatus 600 (or any of the other apparatuses 100, 200, 300, 400, 500, 700, 800, 900, 1000, 1100, 1200, 1300), such as at node 134 (the high side of current sensor 115) or at another low side node 132 or 117. Representative DC power source circuit 125A comprises a plurality of LEDs 140, illustrated as LEDs $140_{v1}$, $140_{v2}$, through $140_{vz}$, a plurality of diodes 361, 362, and 363, one or more capacitors 364 and 365, and an optional switch 367 (controlled by controller 120). When the rectified AC voltage (from rectifier 105) is increasing, current is provided through diode 361, which charges capacitor 365, through LEDs $140_{vm}$ through $140_{vz}$ and through diode 362, which charges capacitor 364. The output voltage Vcc is provided at node 366 (i.e., at capacitor 364). LEDs $140_{vm}$ through $140_{vz}$ are selected to provide a substantially stable or predetermined voltage drop, such as 18V, and to provide another source of light emission. When the rectified AC voltage (from rectifier 105) is decreasing, capacitor 365 may have a comparatively higher voltage and may discharge through LEDs $140_{v1}$ through $140_{vm}$, also providing another source of light emission and utilizing energy for light emission which might otherwise be dissipated, serving to increase light output efficiency. In the event the output voltage Vcc becomes higher than a predetermined voltage level or threshold, overvoltage protection may be provided by the controller 120, which may close switch 367 to reduce the voltage level.

Figure 19:
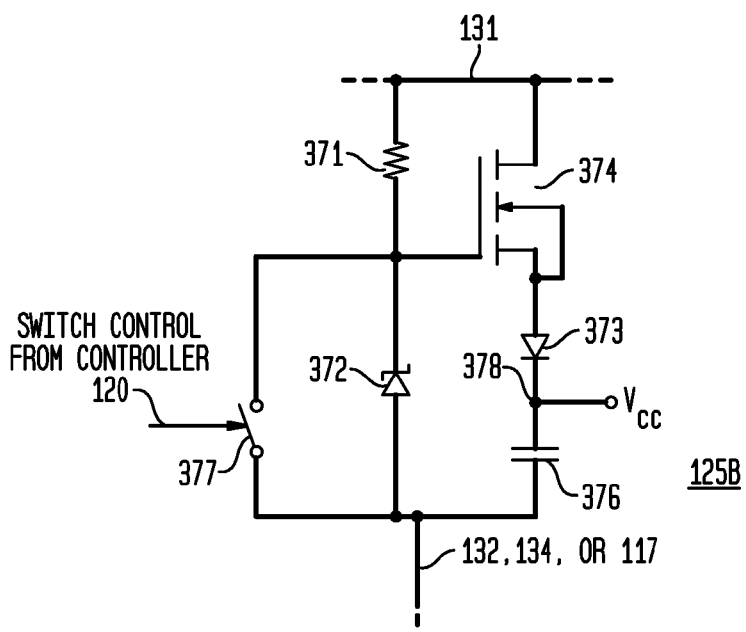
FIG. 19 is a circuit diagram illustrating a second representative DC power source circuit in accordance with the teachings of the present disclosure.

FIG. 19 is a circuit diagram illustrating a second representative DC power source circuit 125B in accordance with the teachings of the present disclosure. Representative DC power source circuit 125B is also implemented between the "high side" (node 131) and the "low side" of sixth representative apparatus 600 (or any of the other apparatuses 100, 200, 300, 400, 500, 700, 800, 900, 1000, 1100, 1200, 1300), such as at node 134 (the high side of current sensor 115) or at another low side node 132 or 117. Representative DC power source circuit 125B comprises a switch or transistor (illustrated as an N-type MOSFET) 374, resistor 371, diode 373, zener diode 372, capacitor 376, and an optional switch 377 (controlled by controller 120). Switch or transistor (MOSFET) 374 is biased to be conductive by a voltage generated across resistor 371 (and clamped by zener diode 372), such that current is provided through diode 373, which charges capacitor 376. The output voltage Vcc is provided at node 378 (i.e., at capacitor 376). In the event the output voltage Vcc becomes higher than a predetermined voltage level or threshold, overvoltage protection also may be provided by the controller 120, which may close switch 377 to reduce the voltage level.

Figure 20:
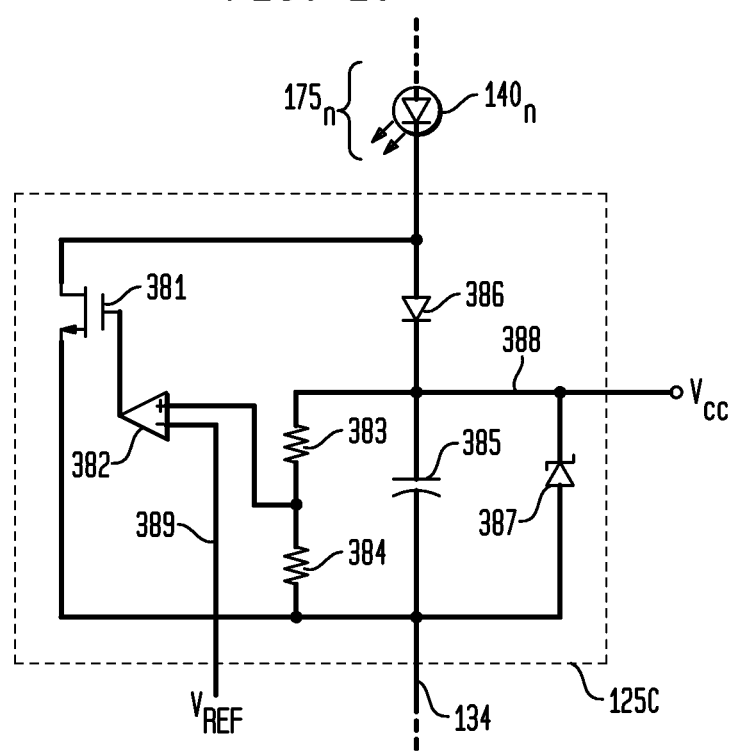
FIG. 20 is a circuit diagram illustrating a third representative DC power source circuit in accordance with the teachings of the present disclosure.

FIG. 20 is a circuit diagram illustrating a third representative DC power source circuit 125C in accordance with the teachings of the present disclosure. Representative DC power source circuit 125C is implemented in series with the last LED segment 175, as discussed above with reference to FIG. 5. Representative DC power source circuit 125C comprises a switch or transistor (illustrated as an N-type MOSFET) 381, comparator (or error amplifier) 382, isolation diode 386, capacitor 385, resistors 383 and 384 (configured as a voltage divider), and zener diode 387, and uses a reference voltage $V_{REF}$ provided by controller 120. During operation, current flows through isolation diode 386 and charges capacitor 385, with the output voltage Vcc provided at node 388 (capacitor 385), with zener diode 387 serving to damp transients and avoid overflow of capacitor 385 at start up, and should generally have a current rating to match the maximum LED 140 current. The resistors 383 and 384, configured as a voltage divider, are utilized to sense the output voltage Vcc for use by the comparator 382. When the output voltage Vcc is less than a predetermined level (corresponding to the reference voltage $V_{REF}$ provided by controller 120), the comparator 382 turns transistor (or switch) 381 off, such that most of the LED 140 current charges capacitor 385. When the output voltage Vcc reaches the predetermined level (corresponding to the reference voltage $V_{REF}$), the comparator 382 will turn on transistor (or switch) 381, allowing the LED 140 current to bypass capacitor 385. As the capacitor 385 provides the energy for the bias source (output voltage Vcc), it is configured to discharge at a rate substantially less than the charging rate. In addition, as at various times the transistor (or switch) 381 is switched off to start a new cycle, comparator 382 is also configured with some hysteresis, to avoid high frequency switching, and the AC ripple across the capacitor 385 is diminished by the value of the capacitance and the hysteresis of the comparator 382.

Figure 21:
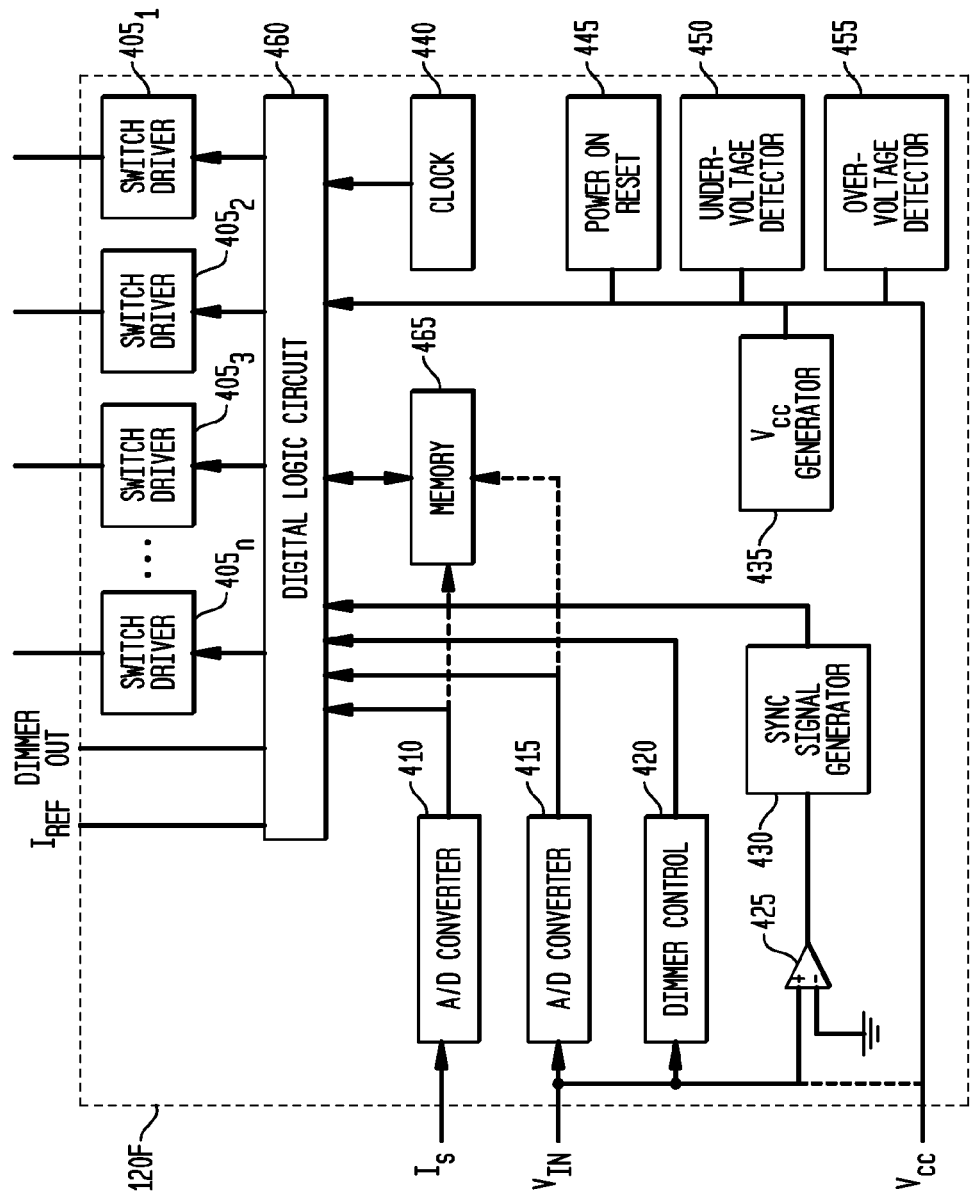
FIG. 21 is a block diagram illustrating a representative controller in accordance with the teachings of the present disclosure.

FIG. 21 is a block diagram illustrating a representative controller 120F in accordance with the teachings of the present disclosure. Representative controller 120F comprises a digital logic circuit 460, a plurality of switch driver circuits 405, analog-to-digital ("A/D") converters 410 and 415, and optionally may also include a memory circuit 465 (e.g., in addition to or in lieu of a memory 185), a dimmer control circuit 420, a comparator 425, sync (synchronous) signal generator 430, a Vcc generator 435 (when another DC power circuit is not provided elsewhere), a power on reset circuit 445, an under-voltage detector 450, an over-voltage detector 455, and a clock 440 (which may also be provided off-chip or in other circuitry). Not separately illustrated, additional components (e.g., a charge pump) may be utilized to power the switch driver circuits 405, which may be implemented as buffer circuits, for example. The various optional components may be implemented, such as power on reset circuit 445, Vcc generator 435, under-voltage detector 450, and over-voltage detector 455, such as in addition to or in lieu of the other DC power generation, protection and limiting circuitry discussed above.

A/D converter 410 is coupled to a current sensor 115 to receive a parameter measurement (e.g., a voltage level) corresponding to the LED 140 current, and converts it into a digital value, for use by the digital logic circuit 460 in determining, among other things, whether the LED 140 current has reached a predetermined peak value $I_p$. A/D converter 415 is coupled to an input voltage sensor 195 to receive a parameter measurement (e.g., a voltage level) corresponding to the rectified AC input voltage $V_{IN}$, and converts it into a digital value, also for use by the digital logic circuit 460 in determining, among other things, when to switch LED segments 175 in or out of the series LED 140 current path, as discussed above. The memory 465 (or memory 185) is utilized to store interval, voltage, or other parameter information used for determining the switching of the LED segments 175 during "Q2" 47. Using the digital input values for LED 140 current, the rectified AC input voltage $V_{IN}$, and/or time interval information (via clock 440), digital logic circuit 460 provides control for the plurality of switch driver circuits 405 (illustrated as switch driver circuits $405_1, 405_2, 405_3$, through $405_n$, corresponding to each switch 110, 210, or any of the various other switches under the control of a controller 120F), to control the switching of the various LED segments 175 in or out of the series LED 140 current path (or in or out of the various parallel paths) as discussed above, such as to substantially track $V_{IN}$ or to provide a desired lighting effect (e.g., dimming or color temperature control), and as discussed below with reference to FIG. 23.

For example, as mentioned above for a first methodology, the controller 120F (using comparator 425, sync signal generator 430, and digital logic circuit 460) may determine the commencement of quadrant "Q1" 46 and provide a corresponding sync signal (or sync pulse), when the rectified AC input voltage $V_{IN}$ is about or substantially close to zero (what might otherwise be a zero crossing from negative to positive or vice-versa for a non-rectified AC input voltage) (illustrated as 144 in FIGS. 2 and 3, which may be referred to herein equivalently as a substantially zero voltage or a zero crossing), and may store a corresponding clock cycle count or time value in memory 465 (or memory 185). During quadrant "Q1" 46, the controller 120F (using digital logic circuit 460) may store in memory 465 (or memory 185) a digital value for the rectified AC input voltage $V_{IN}$ occurring when the LED 140 current has reached a predetermined peak value $I_P$ for one or more LED segments 175 in the series LED 140 current path, and provide corresponding signals to the plurality of switch driver circuits 405 to control the switching in of a next LED segment 175, and repeating these measurements and information storage for the successive switching in of each LED segment 175. Accordingly, a voltage level is stored that corresponds to the highest voltage level for the current (or first) set of LED segments 175 prior to switching in the next LED segment 175 which is also substantially equal to the lowest voltage level for the set of LED segments 175 that includes the switched in next LED segment 175 (to form a second set of LED segments 175). During quadrant "Q2" 47, as the rectified AC input voltage $V_{IN}$ is decreasing, the LED 140 current is decreasing from the predetermined peak value $I_P$ for a given set of LED segments 175, followed by the LED 140 current rising back up to the predetermined peak value $I_P$ as each LED segment 175 is successively switched out of the series LED 140 current path. Accordingly, during quadrant "Q2" 47, the controller 120F (using digital logic circuit 460) may retrieve from memory 465 (or memory 185) a digital value for the rectified AC input voltage $V_{IN}$ which occurred when the LED 140 current previously reached a predetermined peak value $I_P$ for the first set of LED segments 175, which corresponds to the lowest voltage level for the second set of LED segments 175, and provide corresponding signals to the plurality of switch driver circuits 405 to control the switching out of an LED segment 175 from the second set of LED segments 175, such that the first set of LED segments 175 is now connected and the LED 140 current returns to the predetermined peak value $I_P$ at that voltage level, and repeating these measurements and information retrieval for the successive switching out of each LED segment 175.

Also for example, as mentioned above for a second, time-based methodology, the controller 120F (using comparator 425, sync signal generator 430, and digital logic circuit 460) also may determine the commencement of quadrant "Q1" 46 and provide a corresponding sync signal, when the rectified AC input voltage $V_{IN}$ is about or substantially close to zero, and may store a corresponding clock cycle count or time value in memory 465 (or memory 185). During quadrant "Q1" 46, the controller 120F (using digital logic circuit 460) may store in memory 465 (or memory 185) a digital value for the time (e.g., clock cycle count) at which or when the LED 140 current has reached a predetermined peak value $I_P$ for one or more LED segments 175 in the series LED 140 current path, and provide corresponding signals to the plurality of switch driver circuits 405 to control the switching in of a next LED segment 175, and repeating these measurements, time counts, and information storage for the successive switching in of each LED segment 175. The controller 120F (using digital logic circuit 460) may further calculate and store corresponding interval information, such as the duration of time following switching (number of clock cycles or time interval) it has taken for a given set of LED segments 175 to reach $I_P$, such as by subtracting a clock count at the switching from the clock count when $I_P$ has been reached. Accordingly, time and interval information is stored that corresponds to the switching time for a given (first) set of LED segments 175 and the time at which the given (first) set of LED segments 175 has reached $I_P$, the latter of which corresponds to the switching time for the next (second) set of LED segments. During quadrant "Q2" 47, as the rectified AC input voltage $V_{IN}$ is decreasing, the LED 140 current is decreasing from the predetermined peak value $I_P$ for a given set of LED segments 175, followed by the LED 140 current rising back up to the predetermined peak value $I_P$ as each LED segment 175 is successively switched out of the series LED 140 current path. Accordingly, during quadrant "Q2" 47, the controller 120F (using digital logic circuit 460) may retrieve from memory 465 (or memory 185) corresponding interval information, calculate a time or clock cycle count at which a next LED segment 175 should be switched out of the series LED 140 current path, and provide corresponding signals to the plurality of switch driver circuits 405 to control the switching out of an LED segment 175 from the second set of LED segments 175, such that the first set of LED segments 175 is now connected and the LED 140 current returns to the predetermined peak value $I_P$, and repeating these measurements, calculations, and information retrieval for the successive switching out of each LED segment 175.

For both the representative voltage-based and time-based methodologies, the controller 120F (using digital logic circuit 460) may implement power factor correction. As mentioned above, with reference to FIGS. 2 and 3, when the rectified AC input voltage $V_{IN}$ reaches a peak value 149 at the end of "Q1" 46, it may be desirable for the LED 140 current to also reach a predetermined peak value $I_P$ substantially concurrently, for power efficiency. Accordingly, the controller 120F (using digital logic circuit 460) may determine, before switching in a next segment, such as LED segment $175_n$, which may cause a decrease in current, whether sufficient time remains in "Q1" 46 for a next set of LED segments 175 to reach $I_P$ if that segment (e.g., LED segment $175_n$) were switched in when the current set of LED segments 175 reach $I_P$. If sufficient time remains in "Q1" 46 as calculated by the controller 120F (using digital logic circuit 460), the controller 120F will generate the corresponding signals to the plurality of switch driver circuits 405 such that the next LED segment 175 is switched into the series LED 140 current path, and if not, no additional LED segment 175 is switched in. In the latter case, the LED 140 current may exceed the peak value $I_P$ (not separately illustrated in FIG. 2), provided the actual peak LED 140 current is maintained below a corresponding threshold or other specification level, such as to avoid potential harm to the LEDs 140 or other circuit components, which also may be limited by the various current limiting circuits, to avoid such excess current levels, as discussed above.

The controller 120F may also be implemented to be adaptive, with the time, interval, voltage, and other parameters utilized in "Q2" 47 generally based on the most recent set of measurements and determinations made in the previous "Q1" 46. Accordingly, as an LED segment 175 is switched out of the series LED 140 current path, in the event the LED 140 current increases too much, such as exceeding the predetermined peak value $I_P$ or exceeding it by a predetermined margin, that LED segment 175 is switched back into the series LED 140 current path, to return the LED 140 current back to a level below $I_P$ or below $I_P$ plus the predetermined margin.

Substantially concurrently, the controller 120F (using digital logic circuit 460) will adjust the time, interval, voltage, or other parameter information, such as to increase (increment) the time interval or decrease (decrement) the voltage level at which that LED segment 175 will be switched out of the series LED 140 current path for use in the next "Q2" 47.

In a representative embodiment, then, the controller 120F may sense the rectified AC voltage $V_{IN}$ and create synchronization pulses corresponding to the rectified AC voltage $V_{IN}$ being substantially zero (or a zero crossing). The controller 120F (using digital logic circuit 460) may measure or calculate the time between two synchronization pulses (the rectified period, approximately or generally related to the inverse of twice the utility line frequency), and then divide the rectified period by two, to determine the duration of each quadrant "Q1" 46 and "Q2" 47, and the approximate point at which "Q1" 46 will end. For an embodiment which does not necessarily switch LED segments 175 when $I_P$ is reached, the quadrants may be divided into approximately or substantially equal intervals corresponding to the number "n" of LED segments 175, such that each switching interval is substantially the same. During "Q1" 46, the controller 120F will then generate the corresponding signals to the plurality of switch driver circuits 405 such that successive LED segments 175 are switched into the series LED 140 current path for the corresponding interval, and for "Q2" 47, the controller 120F will then generate the corresponding signals to the plurality of switch driver circuits 405 such that successive LED segments 175 are switched out of the series LED 140 current path for the corresponding interval, in the reverse (or minor) order, as discussed above, with a new "Q1" 46 commencing at the next synchronization pulse.

In addition to creating or assigning substantially equal intervals corresponding to the number "n" of LED segments 175, there are a wide variety of other ways to assign such intervals, any and all of which are within the scope of the disclosure as claimed, for example and without limitation, unequal interval periods for various LED segments 175 to achieve any desired lighting effect; dynamic assignment using current or voltage feedback, as described above; providing for substantially equal current for each LED segment 175, such that each segment is generally utilized about equally; or providing for unequal current for each LED segment 175 to achieve any desired lighting effect or to optimize AC line performance or efficiency.

Other dimming methodologies are also within the scope of the disclosure as claimed. As may be apparent from FIG. 3, using the rectified AC voltage $V_{IN}$ being substantially zero (or a zero crossing) to determine the durations of the quadrants "Q1" 46 and "Q2" 47 will be different in a phase modulated dimming situation, which chops or eliminates a first portion of the rectified AC voltage $V_{IN}$. Accordingly, the time between successive synchronization pulses (zero crossings) may be compared with values stored in memory 465 (or memory 185), such as 10 ms for a 50 Hz AC line or 8.36 ms for a 60 Hz AC line. When the time between successive synchronization pulses (zero crossings) is about or substantially the same as the relevant or selected values stored in memory 465 (or memory 185) (within a predetermined variance), a typical, non-dimming application is indicated, and operations may proceed as previously discussed. When the time between successive synchronization pulses (zero crossings) is less than the relevant or selected values stored in memory 465 (or memory 185) (plus or minus a predetermined variance or threshold), a dimming application is indicated. Based on this comparison or difference between the time between successive synchronization pulses (zero crossings) and the relevant or selected values stored in memory 465 (or memory 185), a corresponding switching sequence of the LED segments 175 may be determined or retrieved from memory 465 (or memory 185). For example, the comparison may indicate a 45 phase modulation, which then may indicate how many intervals should be skipped, as illustrated in and as discussed above with reference to FIG. 3. As another alternative, a complete set of LED segments 175 may be switched into the series LED 140 current path, with any dimming provided directly by the selected phase modulation.

It should also be noted that various types of LEDs 140, such as high brightness LEDs, may be described rather insightfully for such dimming applications. More particularly, an LED may be selected to have the characteristic that its voltage changes more than 2:1 (if possible) as its LED current varies from zero to its allowable maximum current, allowing dimming of a lighting device by phase modulation of the AC line. Assuming that "N" LEDs are conducting, the rectified AC voltage $V_{IN}$ is rising, and that the next LED segment 175 is switched into the series LED 140 current path when the current reaches $I_p$, then the voltage immediately before the switching is (Equation 2):

$$V_{LED} = V_{IN} = N(V_{FD} + I_P * R_d)$$

where we use the fact that the LED is modeled as a voltage ($V_{FD}$) plus resistor model. After the switching of $\Delta N$ more LEDs to turn on, the voltage becomes (Equation 3):

$$V_{IN} = (N + \Delta N)(V_{FD} + I_{after} R_d)$$

Setting the two line voltages $V_{IN}$ (of Equations 2 and 3) equal to each other leads to (Equation 4):

$$I_{after} = \frac{(NI_P R_d - \Delta N V_{FD})}{N + \Delta N}\left(\frac{1}{R_d}\right)$$

Therefore, in order for the current after the LEDs 140 of the next LED segment 175 are turned on to be positive, then $NI_p R_d > \Delta N V_{FD}$, and further, if we desire for the current to remain above the latching current ($I_{LATCH}$) of a residential dimmer, then (Equation 5):

$$\frac{(NI_P R_d - \Delta N V_{FD})}{N + \Delta N}\left(\frac{1}{R_d}\right) > I_{LATCH} \approx 50 \text{ mA}$$

From Equation 5 we can derive a value of $I_p$, referred to as "$I_{max}$" which provides a desired $I_{LATCH}$ current when the next LED segment 175 is switched (Equation 6):

$$I_{max} = \frac{I_{LATCH} R_d (N + \Delta N) + \Delta N V_{FD}}{N R_d}$$

From Equation (1) we will then find the value of the $I_p = I_{max}$ current at the segments switching (Equation 7):

$$I_{max} = \frac{\frac{V_{IN}}{N} - V_{FD}}{R_d}$$

From setting Equations 6 and 7 equal to each other, we can then determine the value of a threshold input voltage "$V_{INT}$" producing an $I_{LATCH}$ current in the LED segments 175 (Equation 8):

$$V_{INT} = N(F_{FD} + I_{max} R_d)$$

The Equations 2 through 8 present a theoretical background for a process of controlling a driver interface with a dimmer without additional bleeding resistors, which may be implemented within the various representative apparatuses (100, 200, 300, 400, 500, 600) under the control of a controller 120 (and its variations 120A-120F). To implement this control methodology, various one or more parameters or characteristics of the apparatuses (100, 200, 300, 400, 500, 600) are stored in the memory 185, such as by the device manufacturer, distributor, or end-user, including without limitation, as examples, the number of LEDs 140 comprising the various LED segments 175 in the segment, the forward voltage drop (either for each LED 140 or the total drop per selected LED segment 175), the dynamic resistance $R_d$, and one or more operational parameters or characteristics of the apparatuses (100, 200, 300, 400, 500, 600), including without limitation, also as examples, operational parameters such as a dimmer switch 285 latch current $I_{LATCH}$, a peak current of the segment $I_p$, and a maximum current of the LED segment 175 which provides (following switching of a next LED segment 175) a minimum current equal to $I_{LATCH}$. In addition, values of an input voltage $V_{INT}$ for each LED segment 175 and combinations of LED segments 175 (as they are switched into the LED 140 current path) may be calculated using Equation 8 and stored in memory 185, or may be determined dynamically during operation by the controller 120 and also stored in memory (as part of the first representative method discussed below). These various parameters and/or characteristics, such as the peak and maximum currents, may be the same for every LED segment 175 or specific for each LED segment 175.

Figure 22:
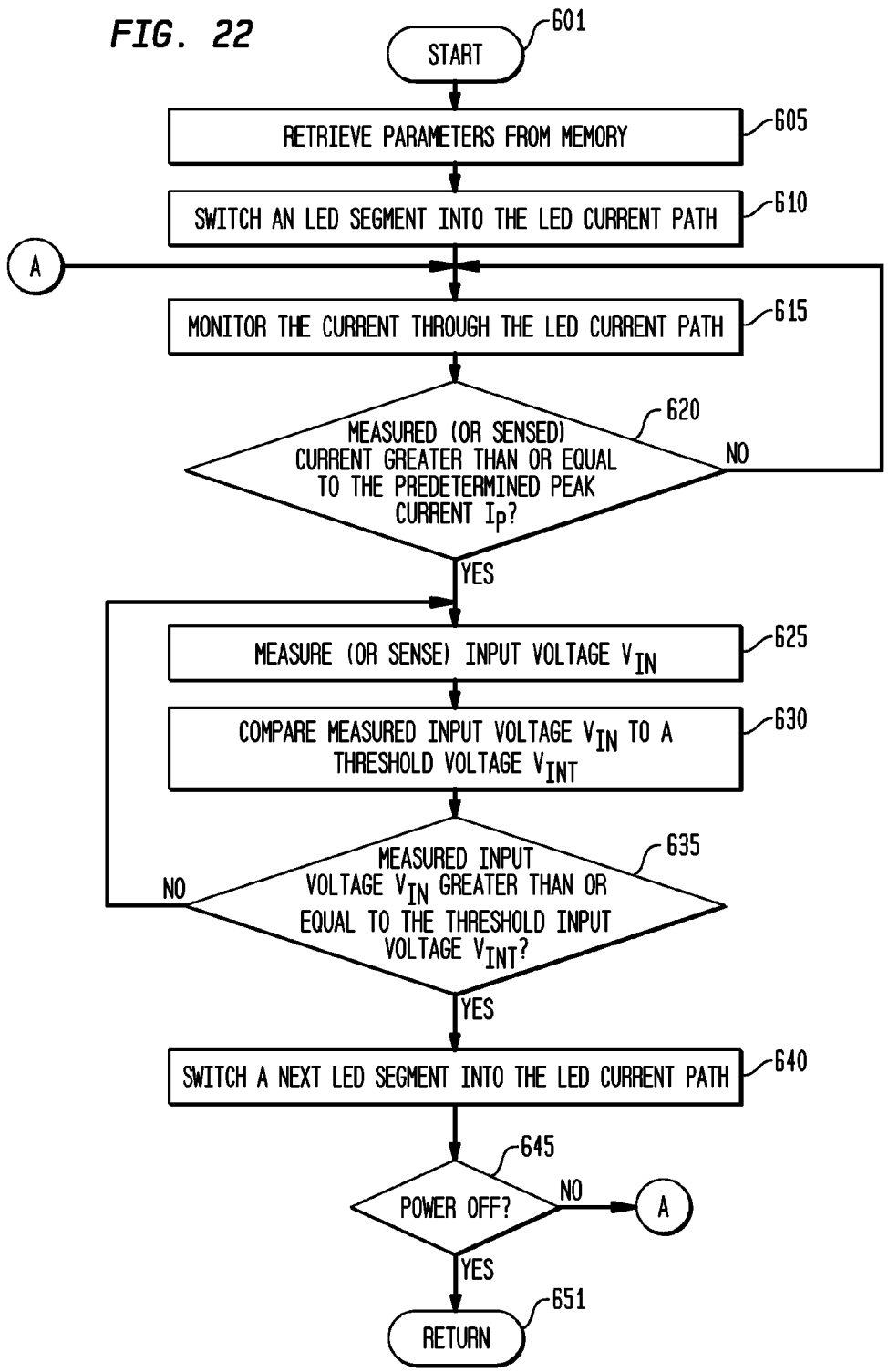
FIG. 22 is a flow diagram illustrating a first representative method in accordance with the teachings of the present disclosure.

FIG. 22 is a flow diagram illustrating a first representative method in accordance with the teachings of the present disclosure, which implements this control methodology for maintaining a minimum current sufficient for proper operation of a dimmer switch 285 (to which one or more apparatuses (100, 200, 300, 400, 500, 600) may be coupled). The method begins, start step 601, with one or more of these various parameters being retrieved or otherwise obtained from memory 185, step 605, typically by a controller 120, such as a value for an input voltage $V_{INT}$ for the current, active LED segment 175. The controller 120 then switches the LED segment 175 into the LED 140 current path (except in the case of a first LED segment 175₁, which, depending on the circuit configuration, may be in the LED 140 current path), step 610, and monitors the current through the LED 140 current path, step 615. When the current through the LED 140 current path reaches the peak current $I_P$ (determined using a current sensor 115), step 620, the input voltage $V_{IN}$ is measured or sensed (also determined using a voltage sensor 195), step 625, and the measured input voltage $V_{IN}$ is compared to the threshold input voltage $V_{INT}$ (one of the parameters previously stored in and retrieved from memory 185), step 630. Based on this comparison, when the measured input voltage $V_{IN}$ is greater than or equal to the threshold input voltage $V_{INT}$, step 635, the controller 120 switches a next LED segment 175 into the LED 140 current path, step 640. When the measured input voltage $V_{IN}$ is not greater than or equal to the threshold input voltage $V_{INT}$ in step 635, the controller 120 does not switch a next LED segment 175 into the LED 140 current path (i.e., continues to operate the apparatus using the LED segments 175 which are currently in the LED 140 current path), and continues to monitor the input voltage $V_{IN}$, returning to step 625, to switch a next LED segment 175, step 640, into the LED 140 current path when measured input voltage $V_{IN}$ becomes equal to or greater than the threshold input voltage $V_{INT}$, step 635. Following step 640, and when the power has not been turned off, step 645, the method iterates for another LED segment 175, returning to step 615, and otherwise the method may end, return step 651.

Figure 23A:
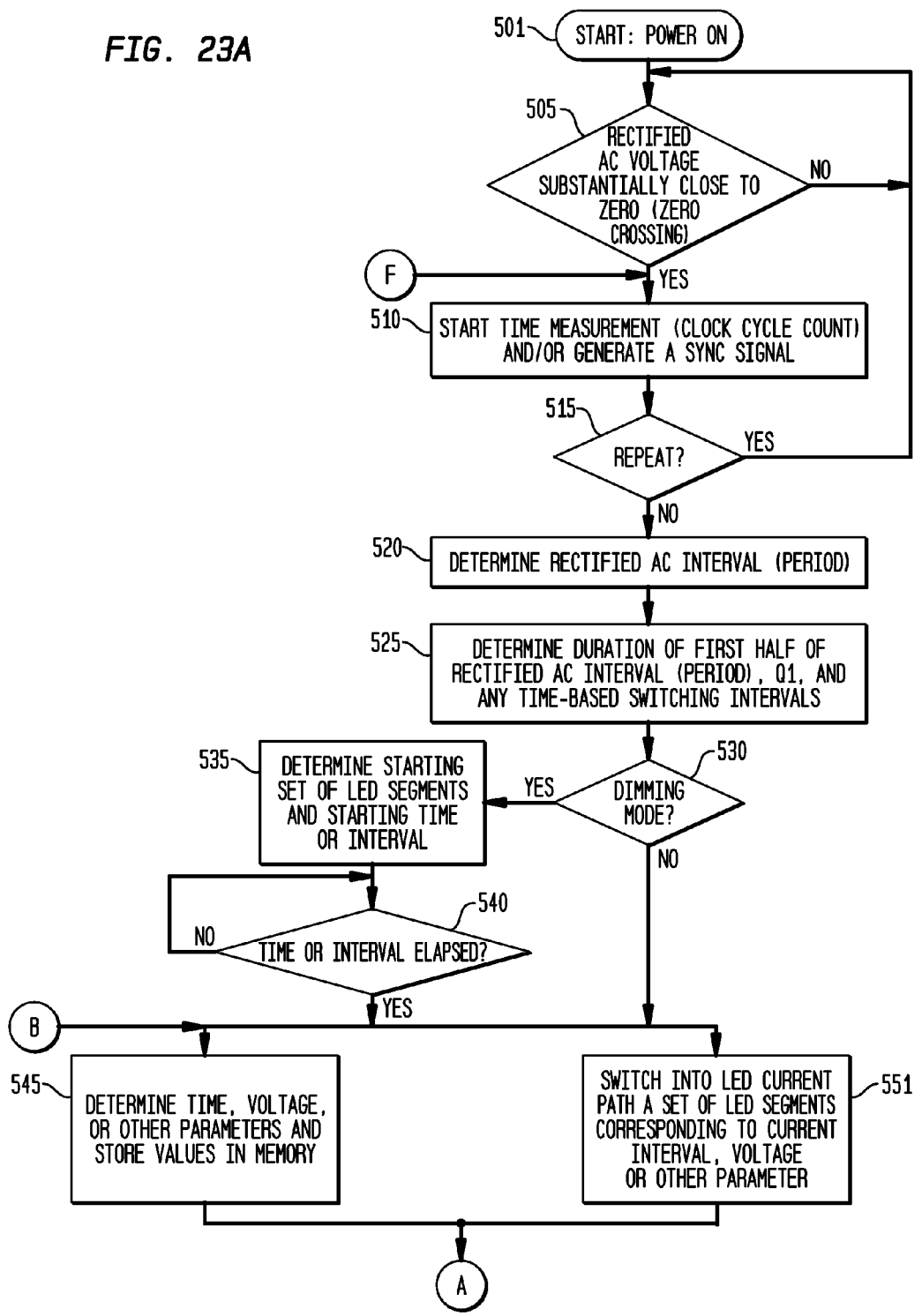
FIGS. 23A, 23B, and 23C are flow diagrams illustrating a second representative method in accordance with the teachings of the present disclosure.
Figure 23B:
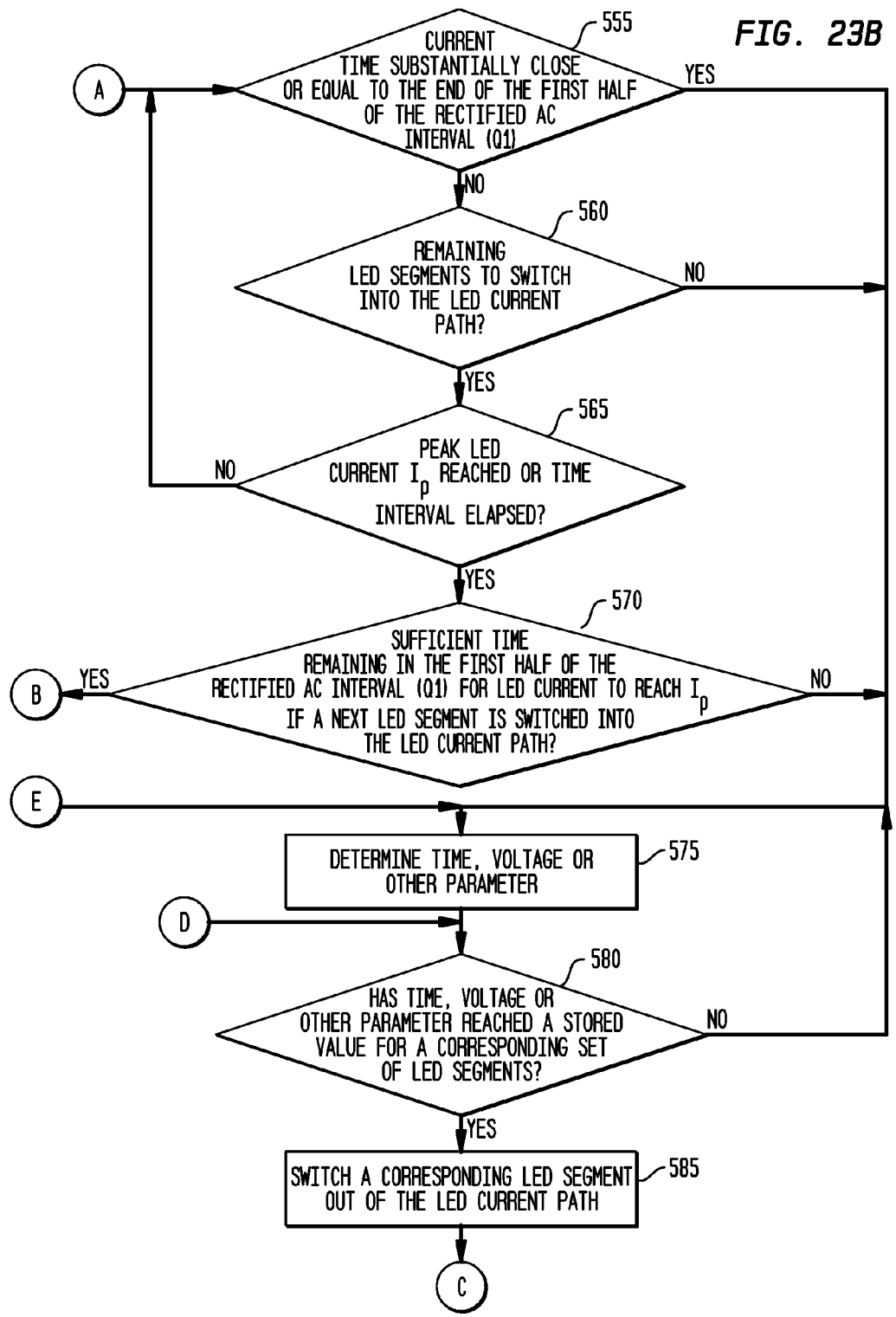
Figure 23C:
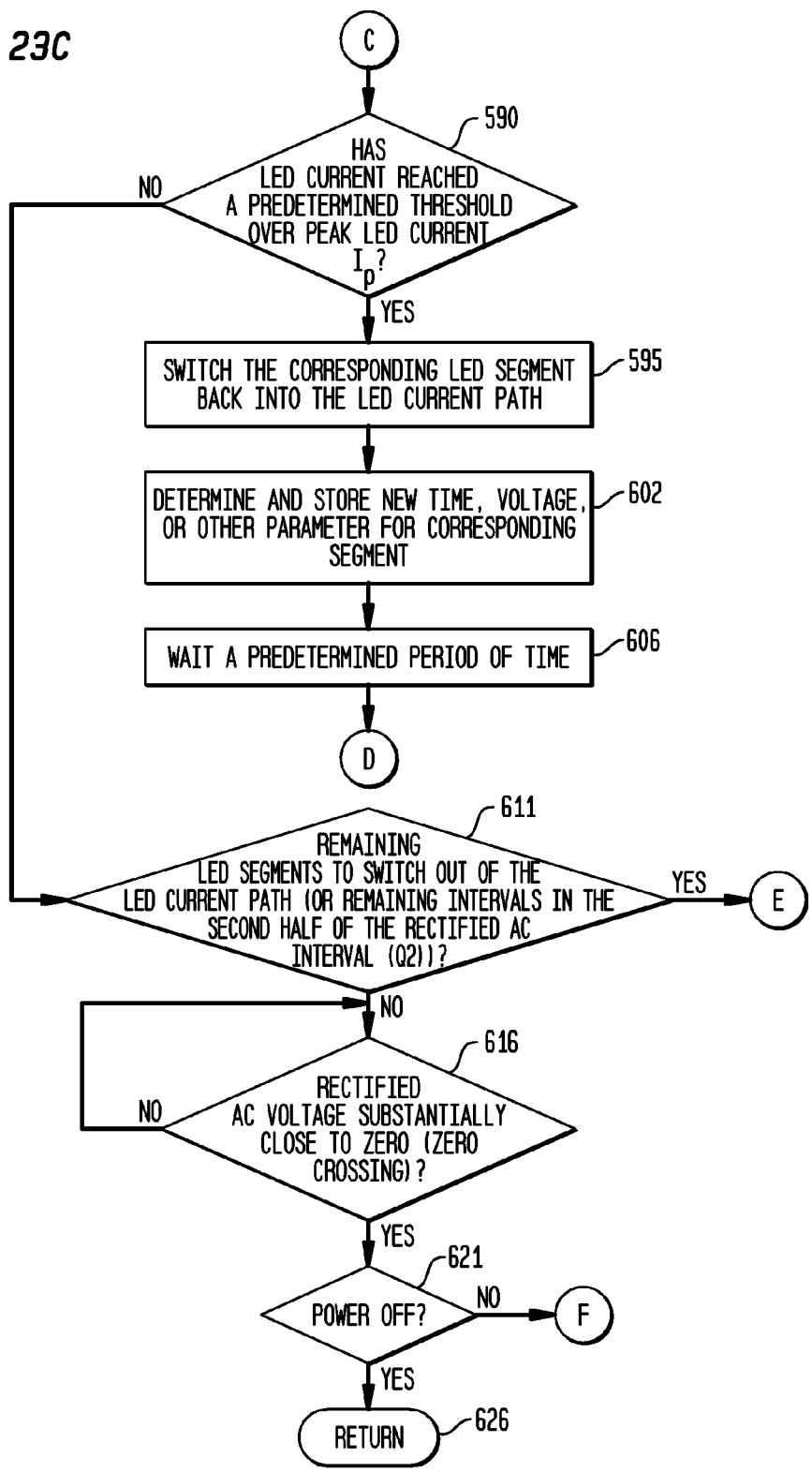

FIG. 23 is a flow diagram illustrating a second representative method in accordance with the teachings of the present disclosure, and provides a useful summary for the methodology which tracks the rectified AC voltage $V_{IN}$ or implements a desired lighting effect, such as dimming. The determination, calculation, and control steps of the methodology may be implemented, for example, as a state machine in the controller 120. Many of the steps also may occur concurrently and/or in any number of different orders, with a wide variety of different ways to commence the switching methodology, in addition to the sequence illustrated in FIG. 23, any and all of which are considered equivalent and within the scope of the disclosure.

More particularly, for ease of explanation, the methodology illustrated in FIG. 23 begins with one or more zero crossings, i.e., one or more successive determinations that the rectified AC voltage $V_{IN}$ is substantially equal to zero. During this determination period, all, none, or one or more of the LED segments 175 may be switched in. There are innumerable other ways to commence, several of which are also discussed below.

The method begins with start step 501, such as by powering on, and determines whether the rectified AC voltage $V_{IN}$ is substantially equal to zero (e.g., a zero crossing), step 505. If so, the method starts a time measurement (e.g., counting clock cycles) and/or provides a synchronization signal or pulse, step 510. When the rectified AC voltage $V_{IN}$ was not substantially equal to zero in step 505, the method waits for the next zero crossing. In a representative embodiment, steps 505 and 510 are repeated for a second (or more) zero crossing, when the rectified AC voltage $V_{IN}$ is substantially equal to zero, for ease of measurement determinations, step 515. The method then determines the rectified AC interval (period), step 520, and determines the duration of the first half of the rectified AC interval (period), i.e., the first quadrant "Q1" 46, and any switching intervals, such as when "Q1" 46 is divided into a number of equal time intervals corresponding to the number of LED segments 175, as discussed above, step 525. The method may also then determine whether brightness dimming is occurring, such as when indicated by the zero crossing information as discussed above, step 530. If dimming is to occur, the method may determine the starting set of LED segments 175, step 535, such as the number of sets of segments which may be skipped as discussed with reference to FIG. 3, and an interval (corresponding to the phase modulation) following the zero crossing for switching in the selected number of LED segments 175, step 540. Following step 540, or when dimming is not occurring, or if dimming is occurring but will track the rectified AC voltage $V_{IN}$, the method proceeds to steps 545 and 551, which are generally performed substantially concurrently.

In step 545, the method determines a time (e.g., a clock cycle count), a voltage, or other measured parameter, and stores the corresponding values, e.g., in memory 465 (or memory 185). As mentioned above, these values may be utilized in "Q2" 47. In step 551, the method switches into the series LED 140 current path the number of LED segments 175 corresponding to the desired sequence or time interval, voltage level, other measured parameter, or desired lighting effect. The method then determines whether the time or time interval indicates that "Q1" 46 is ending (i.e., the time is sufficiently close or equal to the halftime of the rectified AC interval (period), such as being within a predetermined amount of time from the end of "Q1" 46), step 555, and whether there are remaining LED segments 175 which may be switched into the series LED 140 current path, step 560. When "Q1" 46 is not yet ending and when there are remaining LED segments 175, the method determines whether the LED 140 current has reached a predetermined peak value $I_P$ (or, using time-based control, whether the current interval has elapsed), step 565. When the LED 140 current has not reached the predetermined peak value $I_P$ (or when the current interval has not elapsed) in step 565, the method returns to step 555. When the LED 140 current has reached the predetermined peak value $I_P$ (or when the current interval has elapsed) in step 565, the method determines whether there is sufficient time remaining in "Q1" 46 to reach $I_P$ if a next LED segment 175 is switched into the series LED 140 current path, step 570. When there is sufficient time remaining in "Q1" 46 to reach $I_P$, step 570, the method returns to steps 545 and 551 and iterates, determining a time (e.g., a clock cycle count), a voltage, or other measured parameter, and storing the corresponding values, at step 545, and switching in the next LED segment 175, step 551.

When the time or time interval indicates that "Q1" 46 is ending (i.e., the time is sufficiently close or equal to the halftime of the rectified AC interval (period), step 555, or when there are no more remaining LED segments 175 to switch in, step 560, or when there is not sufficient time remaining in "Q1" 46 to switch in a next LED segment 175 and have the LED 140 current reach $I_P$, step 570, the method commences "Q2" 47, the second half of the rectified AC interval (period). Following steps 555, 560, or 570, the method determines the voltage level, time interval, or other measured parameter, step 575. The method then determines whether the currently determined voltage level, time interval, or other measured parameter has reached a corresponding stored value for a corresponding set of LED segments 175, step 580, such as whether the rectified AC voltage $V_{IN}$ has decreased to the voltage level stored in memory which corresponded to switching in a last LED segment $175_n$, for example, and if so, the method switches the corresponding LED segment 175 out of the series LED 140 current path, step 585.

The method then determines whether the LED 140 current has increased to a predetermined threshold greater than $I_P$ (i.e., $I_P$ plus a predetermined margin), step 590. If so, the method switches back into the series LED 140 current path the corresponding LED segment 175 which had been switched out most recently, step 595, and determines and stores new parameters for that LED segment 175 or time interval, step 602, such as a new value for the voltage level, time interval, or other measured parameter, as discussed above (e.g., a decremented value for the voltage level, or an incremented time value). The method may then wait a predetermined period of time, step 606, before switching out the LED segment 175 again (returning to step 585), or instead of step 606, may return to step 580, to determine whether the currently determined voltage level, time interval, or other measured parameter has reached a corresponding new stored value for the corresponding set of LED segments 175, and the method iterates. When the LED 140 current has not increased to a predetermined threshold greater than $I_P$, in step 590, the method determines whether there are remaining LED segments 175 or remaining time intervals in "Q2" 47, step 611, and if so, the method returns to step 575 and iterates, continuing to switch out a next LED segment 175. When there are no remaining LED segments 175 to be switched out of the series LED 140 current path or there are no more remaining time intervals in "Q2" 47, the method determines whether there is a zero crossing, i.e., whether the rectified AC voltage $V_{IN}$ is substantially equal to zero, step 616. When the zero crossing has occurred, and when the power has not been turned off, step 621, the method iterates, starting a next "Q1" 46, returning to step 510 (or, alternatively, step 520 or steps 545 and 551), and otherwise the method may end, return step 626.

As mentioned above, the methodology is not limited to commencing when a zero crossing has occurred. For example, the method may determine the level of the rectified AC voltage $V_{IN}$ and/or the time duration from the substantially zero rectified AC voltage $V_{IN}$, time interval, other measured parameter, and switches in the number of LED segments 175 corresponding to that parameter. In addition, based upon successive voltage or time measurements, the method may determine whether it is in a "Q1" 46 (increasing voltage) or "Q2" 47 (decreasing voltage) portion of the rectified AC interval (period), and continue to respectively switch in or switch out corresponding LED segments 175. Alternatively, the method may start with substantially all LED segments 175 switched or coupled into the series LED 140 current path (e.g., via power on reset), and wait for a synchronization pulse indicating that the rectified AC voltage $V_{IN}$ is substantially equal to zero and "Q1" 46 is commencing, and then perform the various calculations and commence switching of the number of LED segments 175 corresponding to that voltage level, time interval, other measured parameter, or desired lighting effect, proceeding with step 520 of the methodology of FIG. 23.

Not separately illustrated in FIG. 23, for dimming applications, steps 545 and 551 may involve additional features. There are dimming circumstances in which there is no "Q1" 46 time interval, such that the phase modulated dimming cuts or clips ninety degrees or more of the AC interval. Under such circumstances, the "Q2" 47 voltages or time intervals cannot be derived from corresponding information obtained in "Q1" 46. In various representative embodiments, the controller 120 obtains default values from memory 185, 465, such as time intervals corresponding to the number of LED segments 175, uses these default values initially in "Q2" 47, and modifies or "trains" these values during "Q2" 47 by monitoring the AC input voltage and the LED 140 current through the series LED 140 current path. For example, starting with default values stored in memory, the controller 120 increments these values until $I_P$ is reached during "Q2" 47, and then stores the corresponding new voltage value, for each switching out of an LED segment 175.

Figure 24:
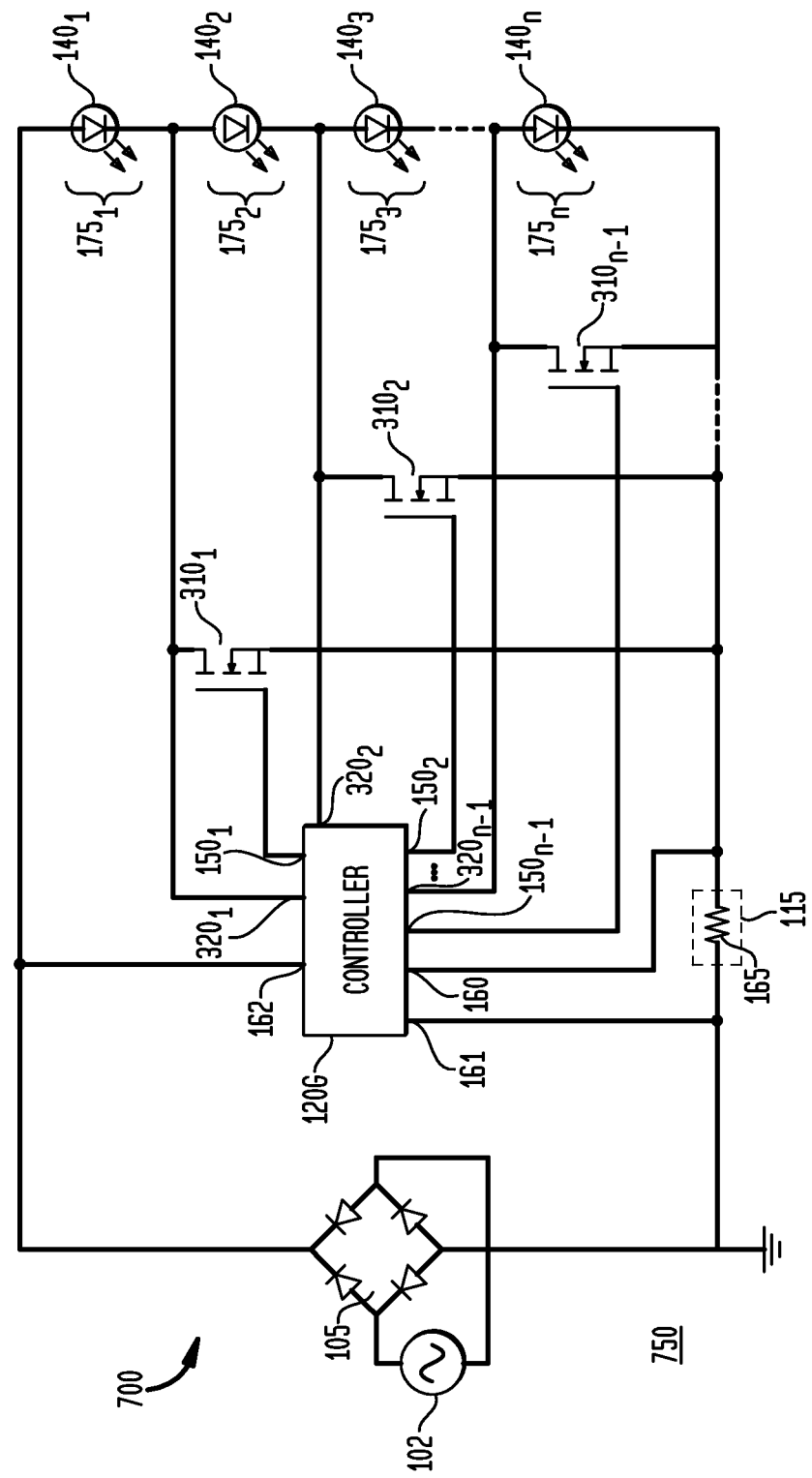
FIG. 24 is a block and circuit diagram illustrating a seventh representative system and a seventh representative apparatus in accordance with the teachings of the present disclosure.

FIG. 24 is a block and circuit diagram illustrating a seventh representative system 750 and a seventh representative apparatus 700 in accordance with the teachings of the present disclosure. Seventh representative system 750 comprises the seventh representative apparatus 700 (also referred to equivalently as an off line AC LED driver) coupled to an AC line 102. The seventh representative apparatus 700 also comprises a plurality of LEDs 140, a plurality of switches 310 (illustrated as n-channel enhancement FETs, as an example), a controller 120G, a (first) current sensor 115, and a rectifier 105. Also optionally and not separately illustrated in FIG. 24, a memory 185 and/or a user interface 190 also may be included as discussed above. The seventh representative apparatus 700 does not require additional voltage sensors (such as sensor 195) or power supplies ($V_{CC}$ 125), although these components may be utilized as may be desired.

The seventh representative apparatus 700 (and the other apparatuses 800, 900, 1000, 1100, 1200, 1300 discussed below) are utilized primarily to provide current regulation of the series LED 140 current path, and to utilize current parameters to switch each LED segment 175 in or out of the series LED 140 current path. The seventh representative apparatus 700 (and the other apparatus 800, 900, 1000, 1100, 1200, 1300 discussed below) differs from the first apparatus 100 primarily with respect to the location of the controller 120G and the type of feedback provided to the controller 120G, and several of the apparatuses (1100, 1200, and 1300) utilize a different switching circuit arrangement. More particularly, the controller 120G has a different circuit location, receiving input of the input voltage $V_{IN}$ (input 162), receiving input (feedback) of each of the node voltages between LED segments 175 (inputs 320), in addition to receiving input from current sensor 115 (inputs 160, 161). In this representative embodiment, the controller 120G may be powered by or through any of these node voltages, for example. Using such voltage and current information, the controller 120G produces the gate (or base) voltage for the FET switches 310, which can be controlled in either linear or switch mode (or both) to produce any current waveform to maximize the power factor, light production brightness, efficiency, and interfacing to triac-based dimmer switches. For example, controller 120G may produce a gate voltage for the FET switches 310 to maintain substantially constant current levels for the various combinations of LED segments 175 during both "Q1" 46 and "Q2" 47. Continuing with the example, the controller 120G may produce a gate voltage for FET switch $310_1$ to provide a current of 50 mA in a series LED 140 current path consisting of LED segment $175_1$, followed by producing a gate voltage for FET switch $310_2$ to provide a current of 75 mA in a series LED 140 current path consisting of LED segment $175_1$ and LED segment $175_2$, followed by producing zero or no gate voltages for FET switches 310 to provide a current of 100 mA in a series LED 140 current path consisting of all of the LED segments 174. Parameters or comparison levels for such desired current levels may be stored in a memory 185, for example (not separately illustrated), or provided through analog circuitry, also, for example. In this circuit topology, the controller 120G thereby controls the current level in the series LED 140 current path, and provides corresponding linear or switching control of the FET switches 310 to maintain any desired level of current during "Q1" 46 and "Q2" 47, such as directly tracking the input voltage/current levels, or step-wise tracking of the input voltage/current levels, or maintaining constant current levels, for example and without limitation. In addition, the various node voltages may also be utilized to provide such linear and/or switching control of the FET switches 310, in addition to feedback from current sensor 115. While illustrated using n-channel FETs, it should be noted that any other type or kind of switch, transistor (e.g., PFET, BJT (npn or pnp)), or combinations of switches or transistors (e.g., Darlington devices) may be utilized equivalently (including with respect to the other apparatuses 800, 900, 1000, 1100, 1200, 1300).

Figure 25:
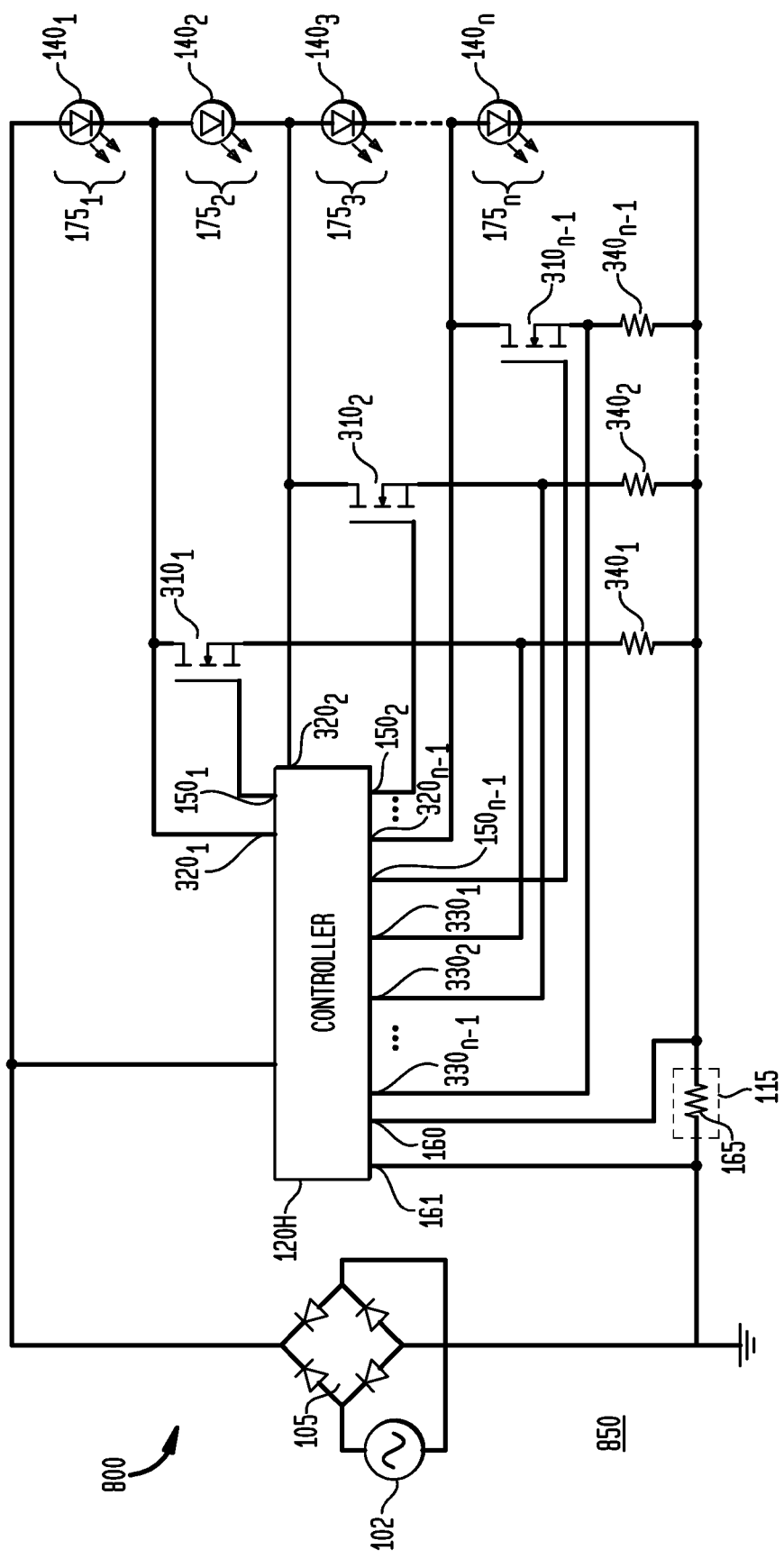
FIG. 25 is a block and circuit diagram illustrating an eighth representative system and an eighth representative apparatus in accordance with the teachings of the present disclosure.

FIG. 25 is a block and circuit diagram illustrating an eighth representative system 850 and an eighth representative apparatus 800 in accordance with the teachings of the present disclosure. The eighth representative apparatus 800 differs from the seventh representative apparatus 700 insofar as resistors 340 are connected in series with the FET switches 310, and corresponding voltage or current levels are provided as feedback to the controller 120H (inputs 330), thereby providing additional information to the controller 120H, such as the current level through each LED segment 175 and switch 310 as an LED segment 175 may be switched in or out of the series LED 140 current path. By measuring the current levels in each branch (LED segment 175), comparatively smaller resistances 340 may be utilized advantageously (such as in comparison to resistor 165), which may serve to decrease power dissipation. Depending on the selected embodiment, such a resistor 165 (as a current sensor 115) may therefore be omitted (not separately illustrated).

Figure 26:
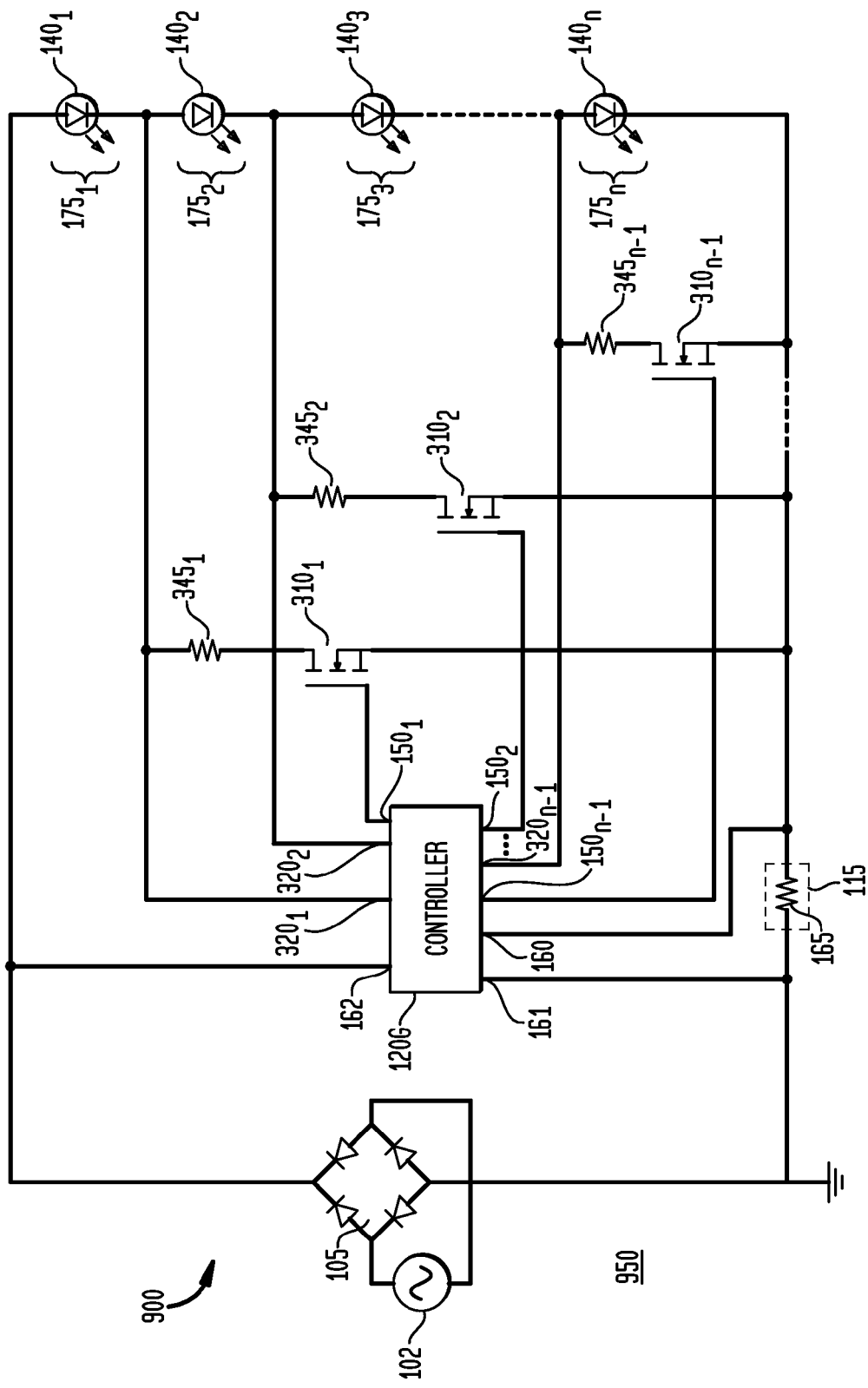
FIG. 26 is a block and circuit diagram illustrating a ninth representative system and a ninth representative apparatus in accordance with the teachings of the present disclosure.

FIG. 26 is a block and circuit diagram illustrating a ninth representative system 950 and a ninth representative apparatus 900 in accordance with the teachings of the present disclosure. The ninth representative apparatus 900 differs from the eighth representative apparatus 800 insofar as resistors 345 are connected on the "high side" in series with the FET switches 310, rather than on the low voltage side. In this representative embodiment, series resistors 345 (which have a resistance comparatively larger than low side resistors 340) are utilized to increase the impedance in their branch when the corresponding FET switch 310 is turned on, which may be utilized to improve electromagnetic interference ("EMI") performance and eliminate the potential need for an additional EMI filter (not separately illustrated).

Figure 27:
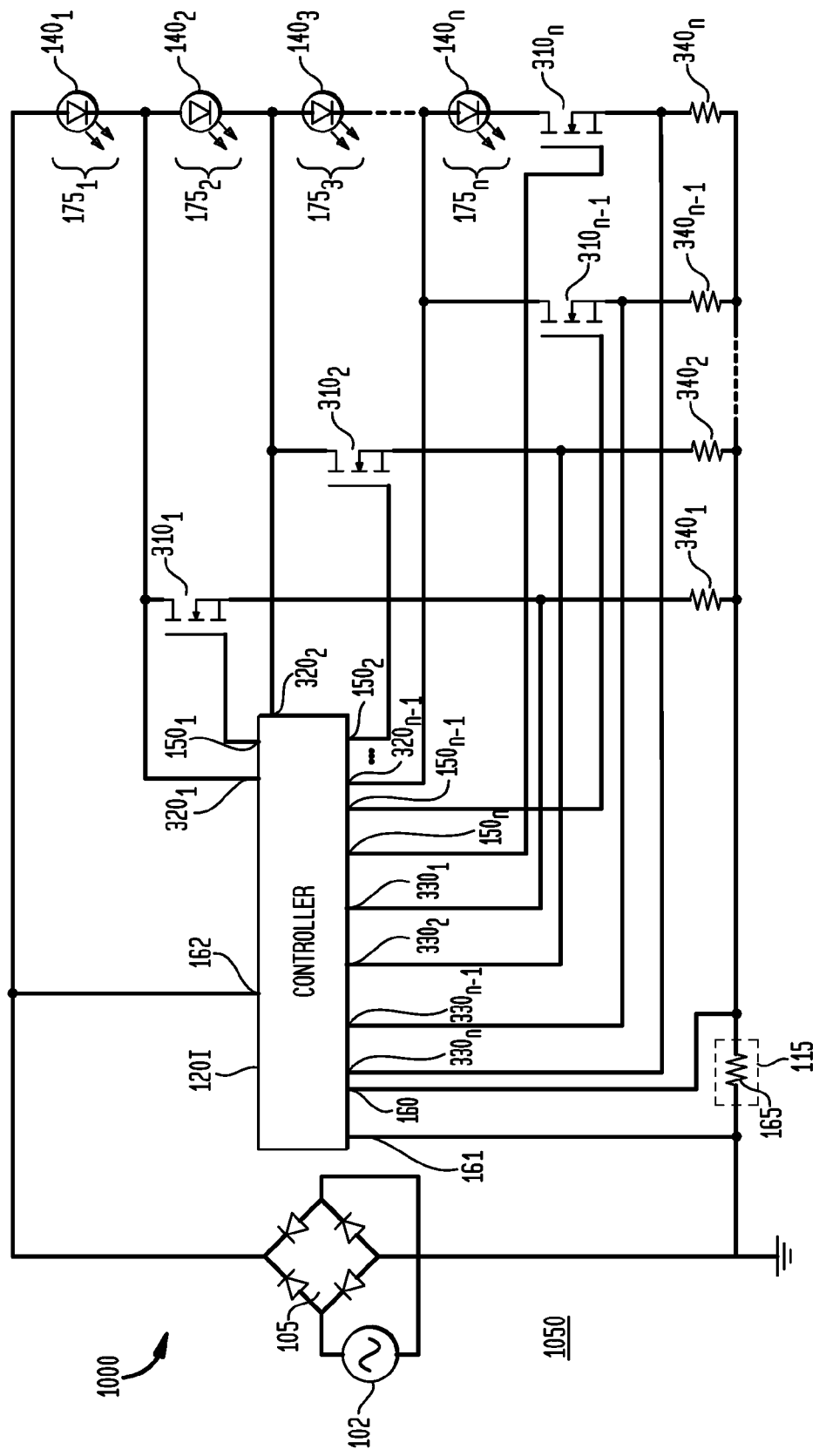
FIG. 27 is a block and circuit diagram illustrating a tenth representative system and a tenth representative apparatus in accordance with the teachings of the present disclosure.

FIG. 27 is a block and circuit diagram illustrating a tenth representative system 1050 and a tenth representative apparatus 1000 in accordance with the teachings of the present disclosure. The tenth representative apparatus 1000 differs from the eighth representative apparatus 800 insofar as additional current control is provided in the series LED 140 current path when all LED segments 175 are utilized (none are bypassed), utilizing switch $310_n$ (also illustrated as an n-channel FET) and series resistor $340_n$, both coupled in series with the LED segments 175 in the series LED 140 current path. The switch $310_n$ and series resistor $340_n$ may be utilized to provide current limiting, with the controller 120I providing a corresponding gate voltage (generally in linear mode, although a switch mode may also be utilized) to the switch $310_n$ to maintain the desired current level in the series LED 140 current path, in addition to the current limiting provided by series resistor $340_n$. This is particularly useful in the event the input voltage $V_{IN}$ becomes too high; with the input of $V_{IN}$ (input 162) and the feedback of the node voltage (from series resistor $340_n$ at input $330_n$), by adjusting the gate voltage of the switch $310_n$, the controller 120I is able to prevent excess current flowing through the LED segments 175 in the series LED 140 current path. In addition, with this circuit topology, other resistors (such as resistors 165 or 340) may then be redundant or reduced in value, yet the controller 120I still has sufficient information to provide the desired performance, and depending on the selected embodiment, such a resistor 165 (as a current sensor 115) may therefore be omitted (not separately illustrated). It should also be noted that the switch $310_n$ and series resistor $340_n$ may also be located elsewhere in the tenth representative apparatus 1000, such as in between other LED segments 175, or at the top or beginning of the series LED 140 current path, or on the positive or negative voltage rails, and not just at the bottom or termination of the series LED 140 current path.

Figure 28:
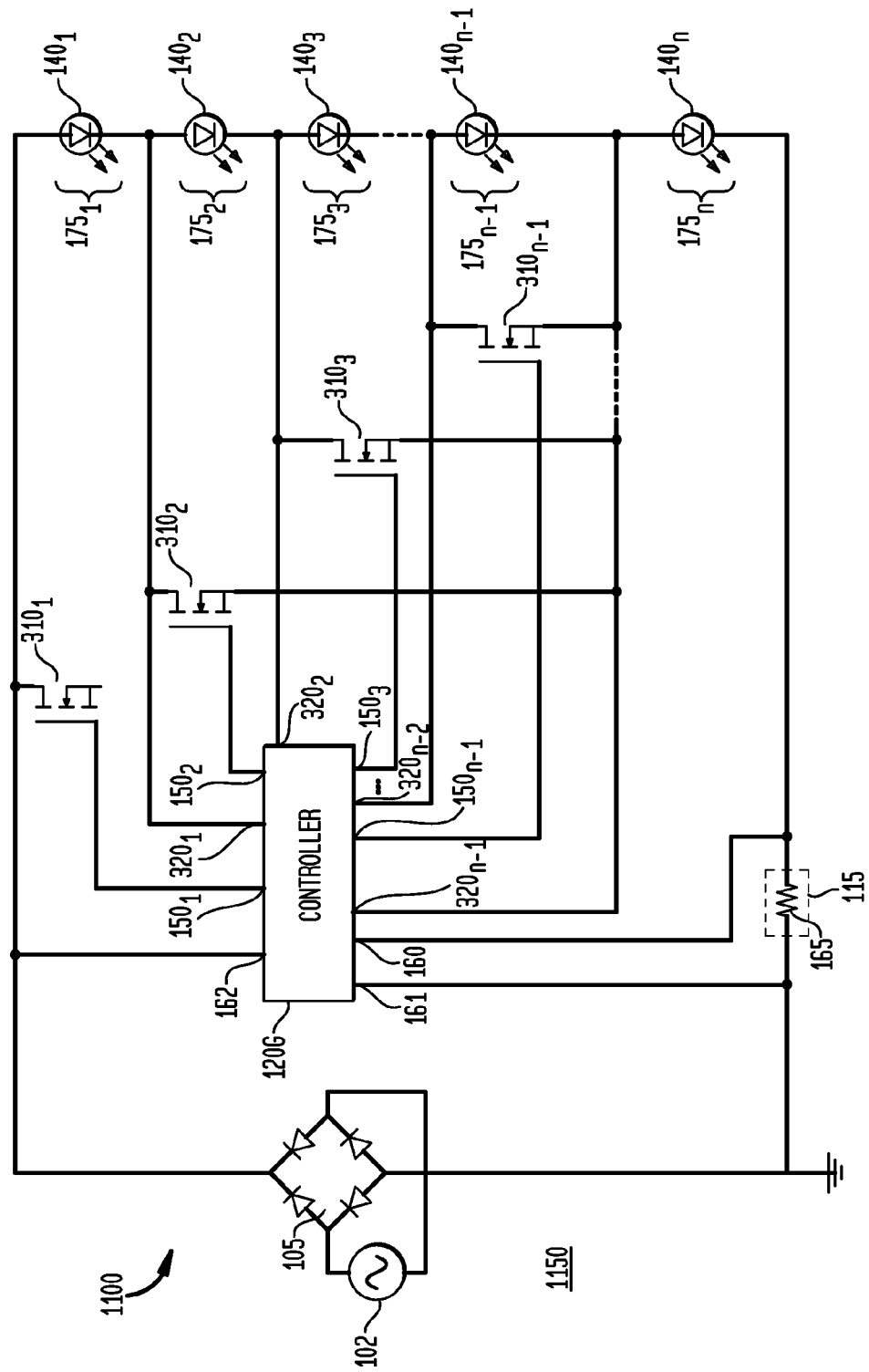
FIG. 28 is a block and circuit diagram illustrating an eleventh representative system and an eleventh representative apparatus in accordance with the teachings of the present disclosure.

FIG. 28 is a block and circuit diagram illustrating an eleventh representative system 1150 and an eleventh representative apparatus 1100 in accordance with the teachings of the present disclosure. The eleventh representative apparatus 1100 differs from the seventh representative apparatus 700 insofar as FET switches 310 are connected (at the corresponding anodes of the first LED 140 of an LED segment 175) such that the series LED 140 current path always includes the last LED segment $175_n$. Instead of being the last LED segment 175 to be turned on, the last LED segment $175_n$ is the first LED segment 175 to be turned on and conducting in the series LED 140 current path. The circuit topology of the eleventh representative apparatus 1100 has additional advantages, namely, power for the controller 120G may be provided from the node voltage obtained at the last LED segment $175_n$, and various voltage and current levels may also be monitored at this node, potentially and optionally eliminating the feedback of voltage levels from other nodes in the series LED 140 current path, further simplifying the controller 120G design.

Figure 29:
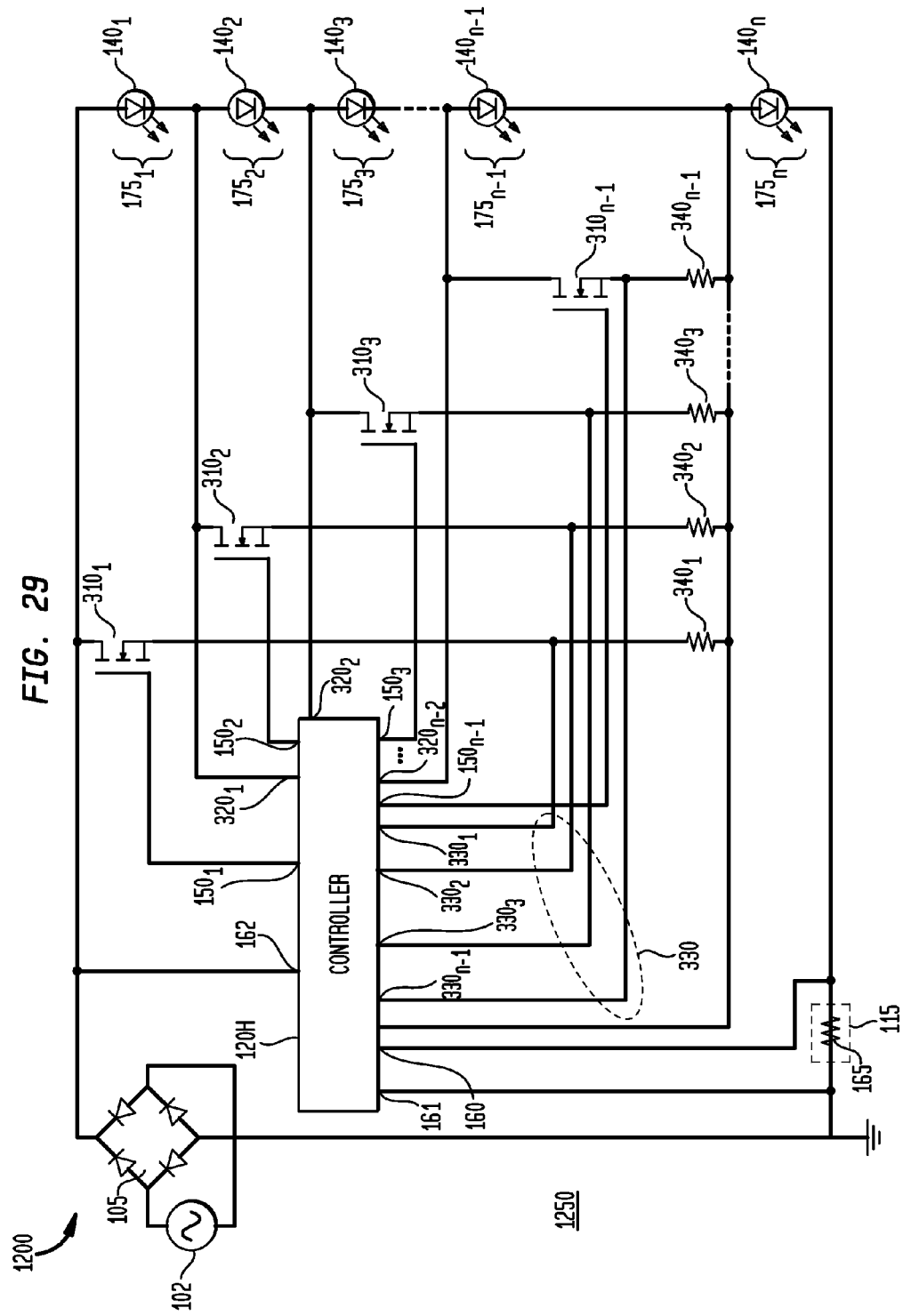
FIG. 29 is a block and circuit diagram illustrating a twelfth representative system and a twelfth representative apparatus in accordance with the teachings of the present disclosure.

FIG. 29 is a block and circuit diagram illustrating a twelfth representative system 1250 and a twelfth representative apparatus 1200 in accordance with the teachings of the present disclosure. As discussed previously with respect to the eighth representative apparatus 800, the twelfth representative apparatus 1200 differs from the eleventh representative apparatus 1100 insofar as resistors 340 are connected in series with the FET switches 310, and corresponding voltage or current levels are provided as feedback to the controller 120H (inputs 330), thereby providing additional information to the controller 120H, such as the current level through each LED segment 175 and switch 310 as an LED segment 175 may be switched in or out of the series LED 140 current path. By measuring the current levels in each branch (LED segment 175), comparatively smaller resistances 340 may be utilized advantageously (such as in comparison to resistor 165), which may serve to decrease power dissipation. In addition, with this circuit topology, other resistors (such as 165) may then be redundant or reduced in value, yet the controller 120H still has sufficient information to provide the desired performance, and depending on the selected embodiment, such a resistor 165 (as a current sensor 115) or other resistors 340 may therefore be omitted (not separately illustrated). Also not separately illustrated, but as discussed previously, resistors 345 may be utilized (instead of resistors 340) on the high side of the switches 310.

Figure 30:
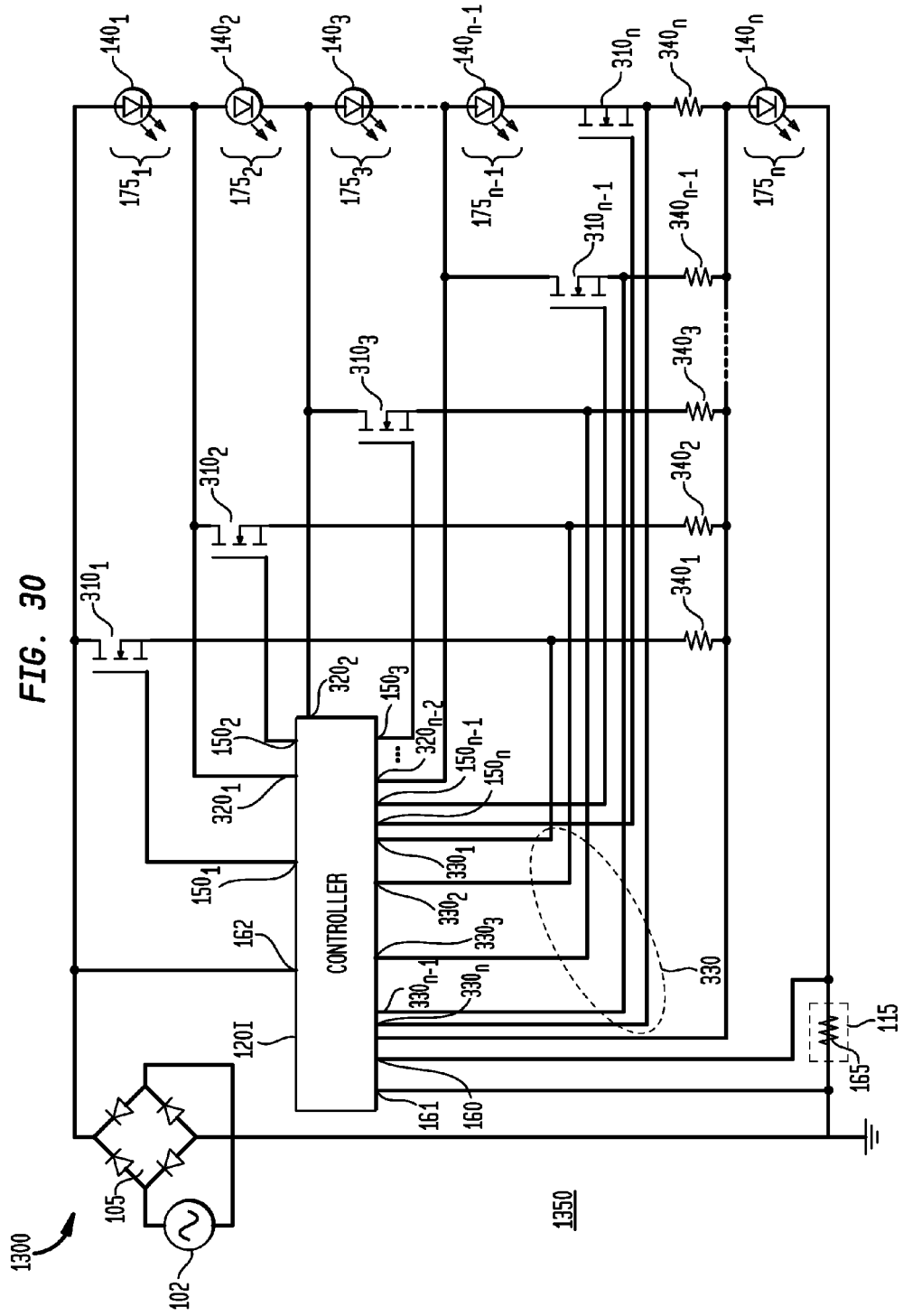
FIG. 30 is a block and circuit diagram illustrating a thirteenth representative system and a thirteenth representative apparatus in accordance with the teachings of the present disclosure.

FIG. 30 is a block and circuit diagram illustrating a thirteenth representative system 1350 and a thirteenth representative apparatus 1300 in accordance with the teachings of the present disclosure. As discussed previously with respect to the tenth representative apparatus 1000, the thirteenth representative apparatus 1300 differs from the twelfth representative apparatus 1200 insofar as additional current control is provided in the series LED 140 current path when all LED segments 175 are utilized (none are bypassed), utilizing switch 310$_n$ (also illustrated as an n-channel FET) and series resistor 340$_n$, both coupled in series with the LED segments 175 in the series LED 140 current path. The switch 310$_n$ and series resistor 340$_n$ may be utilized to provide current limiting, with the controller 120I providing a corresponding gate voltage (generally in linear mode, although a switch mode may also be utilized) to the switch 310$_n$ to maintain the desired current level in the series LED 140 current path, in addition to the current limiting provided by series resistor 340$_n$. This is also particularly useful in the event the input voltage $V_{IN}$ becomes too high; with the input of $V_{IN}$ (input 162) and the feedback of the node voltage (from series resistor 340$_n$ at input 330$_n$), by adjusting the gate voltage of the switch 310$_n$, the controller 120I is able to prevent excess current flowing through the LED segments 175 in the series LED 140 current path. In addition, with this circuit topology, other resistors (such as 165 or other resistors 340) may then be redundant or reduced in value, yet the controller 120I still has sufficient information to provide the desired performance, and depending on the selected embodiment, such a resistor 165 (as a current sensor 115) may therefore be omitted (not separately illustrated). It should also be noted that the switch 310$_n$ and series resistor 340$_n$ may also be located elsewhere in the thirteenth representative apparatus 1300, such as in between other LED segments 175, or at the top or beginning of the series LED 140 current path, or on the positive or negative voltage rails, and not just at the bottom or termination of the series LED 140 current path.

It should also be noted that any of the various apparatus described herein may provide for a parallel combination of two or more series LED 140 current paths, with a first series LED 140 current path comprising one or more of LED segment 175$_1$, LED segment 175$_2$, through LED segment 175$_m$, with a second series LED 140 current path comprising one or more of LED segment 175$_{m+1}$, LED segment 175$_{m+2}$, through LED segment 175$_n$, and so on. As previously discussed with reference to FIG. 6, many different parallel combinations of LED segments 175 are available. Any of the LED segment 175 configurations may be easily extended to include additional parallel LED 140 strings and additional LED segments 175, or reduced to a fewer number of LED segments 175, and that the number of LEDs 140 in any given LED segment 175 may be higher, lower, equal, or unequal, and all such variations are within the scope of the claimed disclosure.

Multiple strings of LEDs 140 arranged in parallel may also be used to provide higher power for a system, in addition to potentially increasing the power ratings of the LEDs 140 utilized in a single series LED 140 current path. Another advantage of such parallel combinations of switchable series LED 140 current paths circuit topologies is the capability of skewing the current wave shape of the parallel LED strings by configuring different numbers of LEDs 140 for each LED segment 175 and the various sense resistor values to achieve improved harmonic reduction in the AC line current waveform. In addition, any selected series LED 140 current path also may be turned off and shut down in the event of power de-rating, such as to reduce power when a maximum operating temperature is reached.

In any of these various apparatus and system embodiments, it should be noted that light color compensation can be achieved by using various color LEDs 140, in addition to or in lieu of white LEDs 140. For example, one or more LEDs 140 within an LED segment 175 may be green, red, or amber, with color mixing and color control provided by the controller 120, which may be local or which may be remote or centrally located, through connecting the selected LED segment 175 into the series LED 140 current path or bypassing the selected LED segment 175.

It should also be noted that the various apparatuses and systems described above are operable under a wide variety of conditions. For example, the various apparatuses and systems described above are also able to operate using three phase conditions, i.e., using a 360 Hz or 300 Hz rectifier output and not merely a 120 Hz or 100 Hz rectifier output from 60 Hz or 50 Hz lines, respectively. Similarly, the various apparatuses and systems described above also work in other systems, such as aircraft using 400 Hz input voltage sources. In addition, comparatively long decay type phosphors, on the order of substantially about a 2-3 msec decay time constant, may also be utilized in conjunction with the LEDs 140, such that the light emission from the energized phosphors average the LED 140 light output in multiple AC cycles, thereby serving to reduce the magnitude of any perceived ripple in the light output.

In addition to the current control described above, the various apparatuses 700, 800, 900, 1000, 1100, 1200, and 1300 may also operate as described above with respect to apparatuses 100, 200, 300, 400, 500, and 600. For example, switching of LED segments 175 into or out of the series LED 140 current path may be based upon voltage levels, such as the various node voltages at controller inputs 320. Also for example, such as for power factor correction, switching of LED segments 175 into or out of the series LED 140 current path also may be based upon whether sufficient time remains in a time interval to reach a peak current level, as described above. In short, any of the various control methodologies described above for apparatuses 100, 200, 300, 400, 500, and 600 may also be utilized with any of the various apparatuses 700, 800, 900, 1000, 1100, 1200, and 1300.

It should also be noted that any of the various controllers 120 described herein may be implemented using either or both digital logic and/or using automatic, analog control circuitry. In addition, various controllers 120 may not require any type of memory 185 to store parameter values. Rather, the parameters used for comparison, to determine the switching of LED segments 175 in or out of the series LED 140 current path, may be embodied or determined by the values selected for the various components, such as the resistance values of resistors, for example and without limitation. Components such as transistors may also perform a comparison function, turning on when a corresponding voltage has been created at coupled resistors which, in turn, may perform a current sensing function.

Figure 31A:
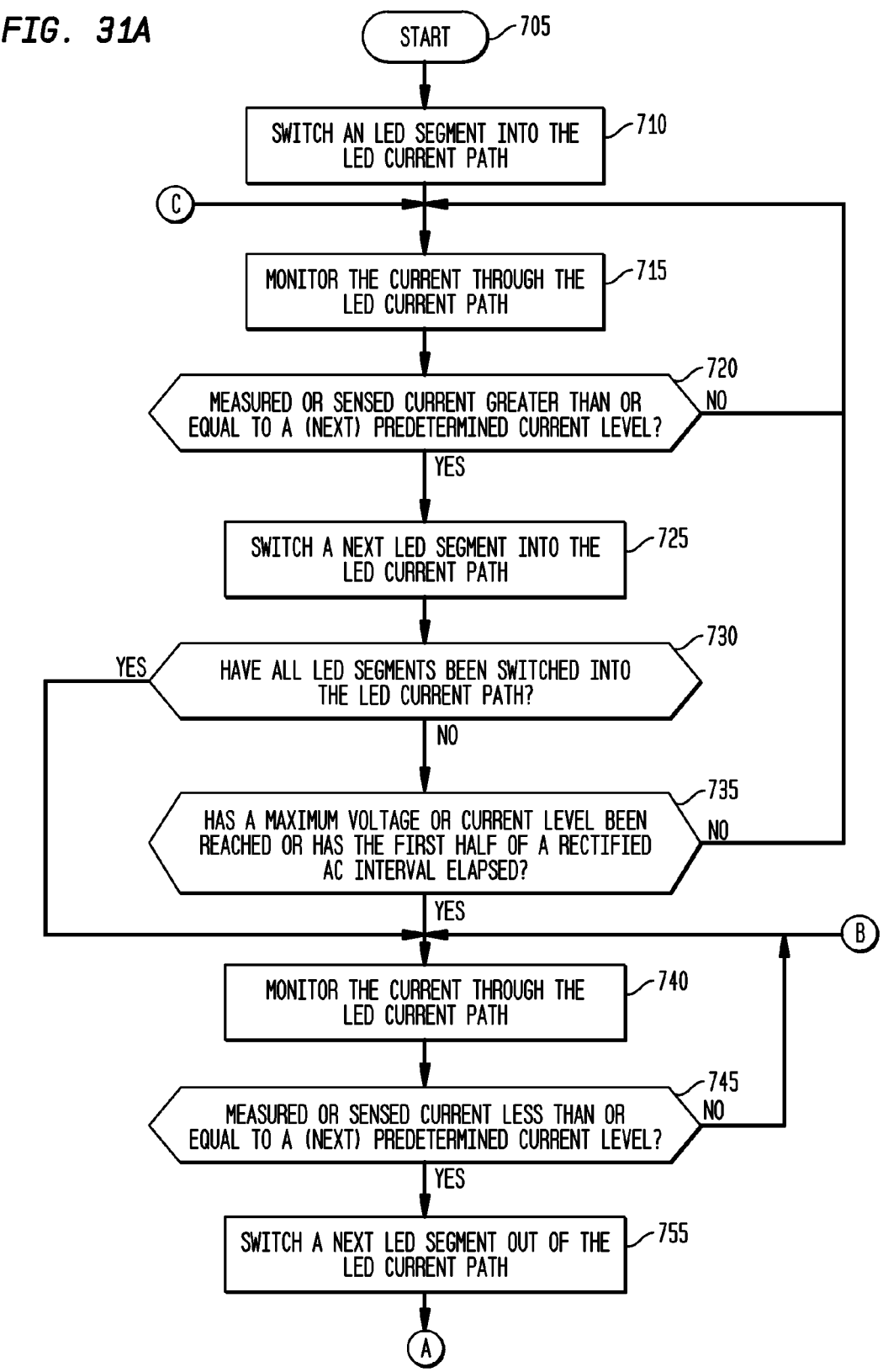
FIGS. 31A and 31B are flow diagrams illustrating a third representative method in accordance with the teachings of the present disclosure.
Figure 31B:
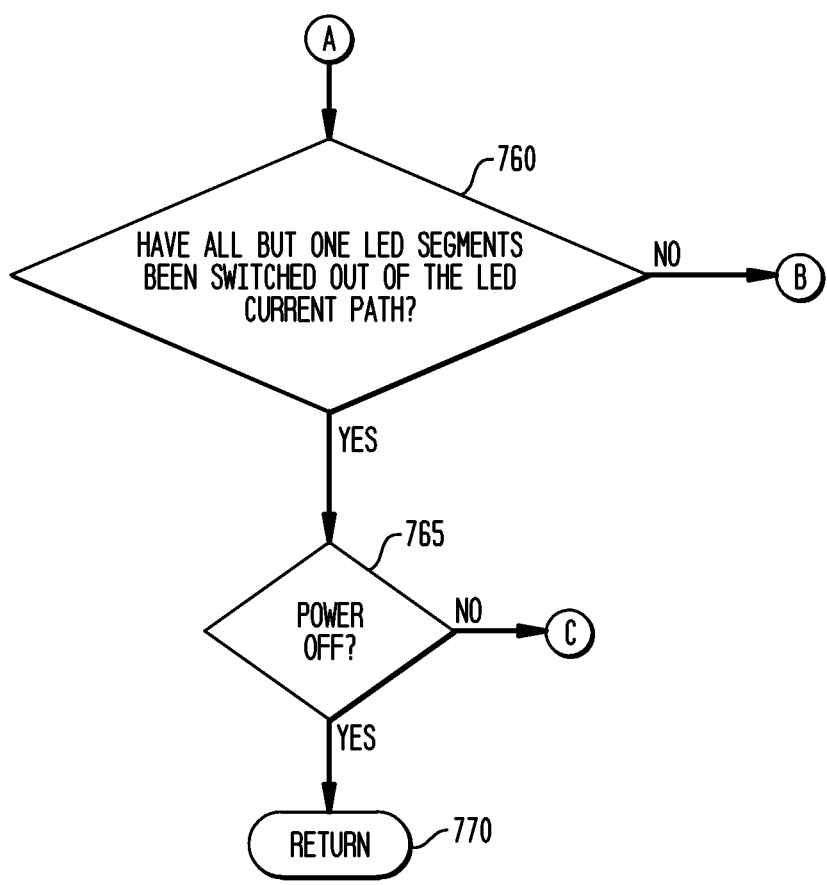

FIG. 31 is a flow diagram illustrating a third representative method in accordance with the teachings of the present disclosure, and provides a useful summary. The method begins, start step 705, with switching an LED segment 175 into the series LED 140 current path, step 710. Step 710 may also be omitted when at least one LED segment 175 is always in the series LED 140 current path. The current through the series LED 140 current path is monitored or sensed, step 715. When the measured or sensed current is not greater than or equal to a predetermined current level, step 720, the method iterates, returning to step 715. When the measured or sensed current is greater than or equal to a predetermined current level, step 720, a next LED segment 175 is switched into the series LED 140 current path, step 725. When all LED segments 175 have been switched into the series LED 140 current path, step 730, or when a maximum voltage or current level has been reached or the first half ("Q1" 46) of a rectified AC interval has elapsed ("Q1" 46 has ended), step 735, the method monitors the current level through the series LED 140 current path, step 740. When the measured or sensed current is not less than or equal to a predetermined current level, step 745, the method iterates, returning to step 740. When the measured or sensed current is less than or equal to a predetermined current level, step 745, a next LED segment 175 is switched out of the series LED 140 current path, step 755. When more than one LED segment 175 is remaining in the series LED 140 current path, the method iterates, returning to step 740. When all but one LED segment 175 have been switched out of the series LED 140 current path, step 760, and when the power is not off, step 765, the method iterates, returning to step 715, and otherwise the method may end, return step 770.

As indicated above, the controller 120 (and 120A-120I) may be any type of controller or processor, and may be embodied as any type of digital logic adapted to perform the functionality discussed herein. As the term controller or processor is used herein, a controller or processor may include use of a single integrated circuit ("IC"), or may include use of a plurality of integrated circuits or other components connected, arranged, or grouped together, such as controllers, microprocessors, digital signal processors ("DSPs"), parallel processors, multiple core processors, custom ICs, application-specific integrated circuits ("ASICs"), field programmable gate arrays ("FPGAs"), adaptive computing ICs, associated memory (such as RAM, DRAM, and ROM), and other ICs and components. As a consequence, as used herein, the term controller or processor should be understood to equivalently mean and include a single IC, or arrangement of custom ICs, ASICs, processors, microprocessors, controllers, FPGAs, adaptive computing ICs, or some other grouping of integrated circuits which perform the functions discussed herein, with any associated memory, such as microprocessor memory or additional RAM, DRAM, SDRAM, SRAM, MRAM, ROM, FLASH, EPROM, or $E^2$PROM. A controller or processor (such as controller 120 (and 120A-120I)), with its associated memory, may be adapted or configured (via programming, FPGA interconnection, or hard-wiring) to perform the methodology of the disclosure, as discussed above and below. For example, the methodology may be programmed and stored, in a controller 120 with its associated memory 465 (and/or memory 185) and other equivalent components, as a set of program instructions or other code (or equivalent configuration or other program) for subsequent execution when the controller or processor is operative (i.e., powered on and functioning). Equivalently, when the controller or processor may be implemented in whole or in part as FPGAs, custom ICs, and/or ASICs, the FPGAs, custom ICs, or ASICs also may be designed, configured, and/or hard-wired to implement the methodology of the disclosure. For example, the controller or processor may be implemented as an arrangement of controllers, microprocessors, DSPs and/or ASICs, which are respectively programmed, designed, adapted, or configured to implement the methodology of the disclosure, in conjunction with a memory 185.

The memory 185, 465, which may include a data repository (or database), may be embodied in any number of forms, including within any computer or other machine-readable data storage medium, memory device, or other storage or communication device for storage or communication of information, including, but not limited to, a memory integrated circuit ("IC"), or memory portion of an integrated circuit (such as the resident memory within a controller or processor IC), whether volatile or non-volatile, whether removable or non-removable, including without limitation, RAM, FLASH, DRAM, SDRAM, SRAM, MRAM, FeRAM, ROM, EPROM, or $E^2$PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus, depending upon the selected embodiment. In addition, such computer-readable media includes any form of communication media which embodies computer-readable instructions, data structures, program modules, or other data in a data signal or modulated signal. The memory 185, 465 may be adapted to store various look-up tables, parameters, coefficients, other information and data, programs, or instructions (of the software of the present disclosure), and other types of tables such as database tables.

As indicated above, the controller or processor may be programmed, using software and data structures of the disclosure, for example, to perform the methodology of the present disclosure. As a consequence, the system and method of the present disclosure may be embodied as software which provides such programming or other instructions, such as a set of instructions and/or metadata embodied within a computer-readable medium, discussed above. In addition, metadata may also be utilized to define the various data structures of a look-up table or a database. Such software may be in the form of source or object code, by way of example and without limitation. Source code, further may be compiled into some form of instructions or object code (including assembly language instructions or configuration information). The software, source code or metadata of the present disclosure may be embodied as any type of code, such as C, C++, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct," "program construct," "software construct," or "software," as used equivalently herein, means and refers to any programming language, of any kind, with any syntax or signatures, which provides or can be interpreted to provide the associated functionality or methodology specified (when instantiated or loaded into a processor or computer and executed, including the controller 120, for example).

The software, metadata, or other source code of the present disclosure and any resulting bit file (object code, database, or look-up table) may be embodied within any tangible storage medium, such as any of the computer or other machine-readable data storage media, as computer-readable instructions, data structures, program modules, or other data, such as discussed above with respect to the memory 185, 465, e.g., a floppy disk, a CD-ROM, a CD-RW, a DVD, a magnetic hard drive, an optical drive, or any other type of data storage apparatus or medium, as mentioned above.

Numerous advantages of the representative embodiments of the present disclosure, for providing power to non-linear loads such as LEDs, are readily apparent. The various representative embodiments supply AC line power to one or more LEDs, including LEDs for high brightness applications, while simultaneously providing an overall reduction in the size and cost of the LED driver and increasing the efficiency and utilization of LEDs. Representative apparatus, method, and system embodiments adapt and function properly over a relatively wide AC input voltage range, while providing the desired output voltage or current, and without generating excessive internal voltages or placing components under high or excessive voltage stress. In addition, various representative apparatus, method, and system embodiments provide significant power factor correction when connected to an AC line for input power. Lastly, various representative apparatus, method, and system embodiments provide the capability for controlling brightness, color temperature, and color of the lighting device.

Although the disclosure has been described with respect to specific embodiments thereof, these embodiments are merely illustrative and not restrictive of the disclosure. In the description herein, numerous specific details are provided, such as examples of electronic components, electronic and structural connections, materials, and structural variations, to provide a thorough understanding of embodiments of the present disclosure. An embodiment of the disclosure can be practiced without one or more of the specific details, or with other apparatus, systems, assemblies, components, materials, parts, etc. In other instances, other structures, materials, or operations are not specifically shown or described in detail to avoid obscuring aspects of embodiments of the present disclosure. In addition, the various figures are not drawn to scale and should not be regarded as limiting.

Reference throughout this specification to "one embodiment," "an embodiment," or a specific "embodiment" means that a particular feature, structure, or characteristic described in connection with the embodiment is included in at least one embodiment of the present disclosure and not necessarily in all embodiments, and further, are not necessarily referring to the same embodiment. Furthermore, the particular features, structures, or characteristics of any specific embodiment of the present disclosure may be combined in any suitable manner and in any suitable combination with one or more other embodiments, including the use of selected features without corresponding use of other features. In addition, many modifications may be made to adapt a particular application, situation, or material to the scope and spirit of the claimed subject matter. It is to be understood that other variations and modifications of the embodiments of the present disclosure described and illustrated herein are possible in light of the teachings herein and are to be considered part of the spirit and scope of the claimed subject matter.

It will also be appreciated that one or more of the elements depicted in the figures can also be implemented in a more separate or integrated manner, or even removed or rendered inoperable in certain cases, as may be useful in accordance with a particular application. Integrally formed combinations of components are also within the scope of the disclosure, particularly for embodiments in which a separation or combination of discrete components is unclear or indiscernible. In addition, use of the term "coupled" herein, including in its various forms, such as "coupling" or "couplable," means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

As used herein for purposes of the present disclosure, the term "LED" and its plural form "LEDs" should be understood to include any electroluminescent diode or other type of carrier injection- or junction-based system which is capable of generating radiation in response to an electrical signal, including without limitation, various semiconductor- or carbon-based structures which emit light in response to a current or voltage, light emitting polymers, organic LEDs, and so on, including within the visible spectrum, or other spectra such as ultraviolet or infrared, of any bandwidth, or of any color or color temperature.

As used herein, the term "AC" denotes any form of time-varying current or voltage, including without limitation, alternating current or corresponding alternating voltage level with any waveform (sinusoidal, sine squared, rectified, rectified sinusoidal, square, rectangular, triangular, sawtooth, irregular, etc.) and with any DC offset and may include any variation such as chopped or forward- or reverse-phase modulated alternating current or voltage, such as from a dimmer switch. As used herein, the term "DC" denotes both fluctuating DC (such as is obtained from rectified AC) and a substantially constant or constant voltage DC (such as is obtained from a battery, voltage regulator, or power filtered with a capacitor).

In the foregoing description of illustrative embodiments and in attached figures where diodes are shown, it is to be understood that synchronous diodes or synchronous rectifiers (for example, relays or MOSFETs or other transistors switched off and on by a control signal) or other types of diodes may be used in place of standard diodes within the scope of the present disclosure. Representative embodiments presented here generally generate a positive output voltage with respect to ground; however, the teachings of the present disclosure apply also to power converters that generate a negative output voltage, where complementary topologies may be constructed by reversing the polarity of semiconductors and other polarized components.

Furthermore, any signal arrows in the drawings/figures should be considered only representative, and not limiting, unless otherwise specifically noted. Combinations of components or steps will also be considered within the scope of the present disclosure, particularly where the ability to separate or combine is unclear or foreseeable. The disjunctive term "or," as used herein and throughout the claims that follow, is generally intended to mean "and/or," having both conjunctive and disjunctive meanings (and is not confined to an "exclusive or" meaning), unless otherwise indicated. As used in the description herein and throughout the claims that follow, "a," "an," and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present disclosure, including what is described in the summary or in the abstract, is not intended to be exhaustive or to limit the disclosure to the precise forms disclosed herein. From the foregoing, it will be observed that numerous variations, modifications, and substitutions are intended, and may be effected without departing from the spirit and scope of the claimed subject matter. It is to be understood that no limitation with respect to the specific methods and apparatus illustrated herein is intended or should be inferred. It is, of course, intended to cover by the appended claims all such modifications as fall within the scope of the claims.

The invention claimed is:

1. A method of providing power to a plurality of light emitting diodes couplable to receive an AC voltage, the plurality of light emitting diodes coupled in series to form a plurality of segments of light emitting diodes each comprising at least one light emitting diode, the plurality of segments of light emitting diodes coupled to a corresponding plurality of switches configured to switch a selected segment of light emitting diodes into or out of a series light emitting diode current path, the method comprising:
monitoring a first parameter;
during a first part of an AC voltage interval, in response to the first parameter having reached a first predetermined current level, switching a corresponding segment of light emitting diodes into the series light emitting diode current path; and
during a second part of the AC voltage interval, in response to the first parameter having decreased to a second predetermined current level, switching the corresponding segment of light emitting diodes out of the series light emitting diode current path.

2. The method of claim 1, wherein the first parameter is a current level of the series light emitting diode current path.

3. The method of claim 2, further comprising:
maintaining the current level of the series light emitting diode current path substantially constant at the first predetermined current level.

4. The method of claim 2, further comprising:
during the first part of the AC voltage interval, in response to the first parameter having reached a third predetermined current level, switching a next corresponding segment of light emitting diodes into the series light emitting diode current path.

5. The method of claim 2, further comprising:
during the second part of the AC voltage interval, in response to the first parameter having decreased to a fourth predetermined current level, switching a next corresponding segment of light emitting diodes out of the series light emitting diode current path.

6. The method of claim 2, further comprising:
during the first part of the AC voltage interval, as a light emitting diode current successively reaches a predetermined peak current level, successively switching the corresponding segment of light emitting diodes into the series light emitting diode current path; and
during the second part of the AC voltage interval, as an AC voltage level decreases to a corresponding voltage level, switching the corresponding segment of light emitting diodes out of the series light emitting diode current path.

7. The method of claim 6, wherein said switching the corresponding segment of light emitting diodes out of the series light emitting diode current path is in a reverse order to the switching of the corresponding segment of light emitting diodes into the series light emitting diode current path.

8. The method of claim 1, further comprising:
determining a first plurality of time intervals corresponding to a number of segments of light emitting diodes for the first part of the AC voltage interval; and
determining a second plurality of time intervals corresponding to the number of segments of light emitting diodes for the second part of the AC voltage interval.

9. The method of claim 8, further comprising:
during the first part of the AC voltage interval, at the expiration of each time interval of the first plurality of time intervals, switching a next segment of light emitting diodes into the series light emitting diode current path; and
during the second part of the AC voltage interval, at the expiration of each time interval of the second plurality of time intervals, in a reverse order, switching the next segment of light emitting diodes out of the series light emitting diode current path.

10. The method of claim 1, wherein the first parameter comprises at least one of a time parameter, a time interval, a time-based parameter, or a clock cycle count.

11. The method of claim 1, further comprising:
rectifying the AC voltage to provide a rectified AC voltage.

12. The method of claim 1, further comprising:
determining whether the AC voltage is phase-modulated.

13. The method of claim 12, further comprising:
in response to the AC voltage being phase-modulated, switching a segment of light emitting diodes into the series light emitting diode current path which corresponds to a phase-modulated AC voltage level.

14. The method of claim 12, further comprising:
in response to the AC voltage being phase-modulated, switching a segment of light emitting diodes into the series light emitting diode current path which corresponds to a phase-modulated AC current level.

15. The method of claim 12, further comprising:
in response to the AC voltage being phase-modulated, switching a segment of light emitting diodes into the series light emitting diode current path which corresponds to a time interval of the phase-modulated AC voltage.

16. The method of claim 12, further comprising:
in response to the AC voltage being phase-modulated, maintaining a parallel light emitting diode current path through a first switch concurrently with switching a next segment of light emitting diodes into the series light emitting diode current path through a second switch.

17. The method of claim 1, further comprising:
determining whether sufficient time remains in the first part of the AC voltage interval for a light emitting diode current to reach a predetermined peak current level if a next segment of light emitting diodes is switched into the series light emitting diode current path.

18. The method of claim 17, further comprising:
in response to sufficient time remaining in the first part of the AC voltage interval for the light emitting diode current to reach the predetermined peak current level, switching the next segment of light emitting diodes into the series light emitting diode current path.

19. The method of claim 17, further comprising:
in response to sufficient time not remaining in the first part of the AC voltage interval for the light emitting diode current to reach the predetermined peak current level, refraining from switching the next segment of light emitting diodes into the series light emitting diode current path.

20. The method of claim 1, further comprising:
switching a first plurality of segments of light emitting diodes to form a first series light emitting diode current path; and
switching a second plurality of segments of light emitting diodes to form a second series light emitting diode current path in parallel with the first series light emitting diode current path.

21. The method of claim 1, wherein selected segments of light emitting diodes of the plurality of segments of light emitting diodes each comprise light emitting diodes having light emission spectra of different colors or wavelengths.

22. The method of claim 21, further comprising:
selectively switching the selected segments of light emitting diodes into the series light emitting diode current path to provide a corresponding lighting effect.

23. The method of claim 21, further comprising:
selectively switching the selected segments of light emitting diodes into the series light emitting diode current path to provide a corresponding color temperature.

24. An apparatus couplable to receive an AC voltage, the apparatus comprising:
a rectifier configured to provide a rectified AC voltage;
a plurality of light emitting diodes coupled in series, wherein the plurality of light emitting diodes form a plurality of segments of light emitting diodes, and wherein the plurality of segments of light emitting diodes are coupled in series;
a plurality of switches correspondingly coupled to the plurality of segments of light emitting diodes and configured to switch a selected segment of light emitting diodes into or out of a series light emitting diode current path;
a current sensor configured to sense a light emitting diode current level; and
a controller coupled to the plurality of switches and the current sensor, wherein the controller is configured to:
during a first part of a rectified AC voltage interval and in response to the light emitting diode current level having increased to a first predetermined current level, switch a corresponding segment of light emitting diodes into the series light emitting diode current path; and
during a second part of the rectified AC voltage interval and in response to the light emitting diode current level having decreased to a second predetermined current level, switch the corresponding segment of light emitting diodes out of the series light emitting diode current path.

25. The apparatus of claim 24, wherein the controller is further configured to maintain the light emitting diode current level substantially constant at the first predetermined current level.

26. The apparatus of claim 24, wherein during the first part of the rectified AC voltage interval, when the light emitting diode current level has reached a third predetermined current level, the controller is further configured to switch a next corresponding segment of light emitting diodes into the series light emitting diode current path.

27. The apparatus of claim 24, wherein during the second part of the rectified AC voltage interval, when the light emitting diode current level has decreased to a fourth predetermined current level, the controller is further configured to switch a corresponding segment of light emitting diodes out of the series light emitting diode current path.

28. The apparatus of claim 24, further comprising:
a plurality of resistors, wherein each resistor of the plurality of resistors is coupled in series to a corresponding switch of the plurality of switches.

29. The apparatus of claim 28, wherein each resistor is coupled on a high voltage side of the corresponding switch.

30. The apparatus of claim 28, wherein each resistor is coupled on a low voltage side of the corresponding switch.

31. The apparatus of claim 24, further comprising:
a switch and a resistor coupled in series with a segment of light emitting diodes of the plurality of segments of light emitting diodes.

32. The apparatus of claim 24, wherein a last segment of light emitting diodes of the plurality of segments of light emitting diodes is always coupled in the series light emitting diode current path.

33. The apparatus of claim 24, wherein the controller is coupled to the plurality of segments of light emitting diodes and configured to receive corresponding node voltage levels.

34. The apparatus of claim 24, wherein a switch of the plurality of switches is coupled to the rectifier and configured to receive the rectified AC voltage.

35. The apparatus of claim 24, wherein the controller is further configured to:
during the first part of the rectified AC voltage interval, in response to the light emitting diode current level reaching a predetermined peak current level, switch the corresponding segment of light emitting diodes into the series light emitting diode current path; and
during the second part of the rectified AC voltage interval, in response to the light emitting diode current level decreasing to a corresponding value, switch the corresponding segment of light emitting diodes out of the series light emitting diode current path.

36. The apparatus of claim 35, wherein the controller further is further configured to switch the corresponding segments of light emitting diodes out of the series light emitting diode current path in a reverse order to the switching of the corresponding segments of light emitting diodes into the series light emitting diode current path.

37. The apparatus of claim 24, wherein the controller is further configured to determine whether the rectified AC voltage is phase-modulated.

38. The apparatus of claim 37, wherein in response to the rectified AC voltage being phase-modulated, the controller is further configured to switch into the series light emitting diode current path a segment of light emitting diodes which corresponds to a rectified AC voltage level.

39. The apparatus of claim 37, wherein in response to the rectified AC voltage being phase-modulated, the controller is further configured to switch into the series light emitting diode current path a segment of light emitting diodes which corresponds to a time interval of a rectified AC voltage level.

40. The apparatus of claim 37, wherein in response to the rectified AC voltage being phase-modulated, the controller is further configured to maintain a parallel light emitting diode current path through a first switch concurrently with switching a next segment of light emitting diodes into the series light emitting diode current path through a second switch.

41. The apparatus of claim 24, wherein the controller is further configured to determine whether sufficient time remains in the first part of the rectified AC voltage interval for the light emitting diode current level to reach a predetermined peak current level if a next segment of light emitting diodes is switched into the series light emitting diode current path.

42. The apparatus of claim 41, wherein the controller is further configured to:
in response to sufficient time remaining in the first part of the rectified AC voltage interval for the light emitting diode current level to reach the predetermined peak current level, switch the next segment of light emitting diodes into the series light emitting diode current path; and
in response to sufficient time not remaining in the first part of the rectified AC voltage interval for the light emitting diode current level to reach the predetermined peak current level, refrain from switching the next segment of light emitting diodes into the series light emitting diode current path.

43. The apparatus of claim 24, wherein the controller is further configured to:
switch a first plurality of segments of light emitting diodes to form a first series light emitting diode current path; and
switch a second plurality of segments of light emitting diodes to form a second series light emitting diode current path in parallel with the first series light emitting diode current path.

44. The apparatus of claim 24, wherein selected segments of light emitting diodes of the plurality of segments of light emitting diodes each comprise light emitting diodes having light emission spectra of different colors or wavelengths.

45. The apparatus of claim 44, wherein the controller is further configured to selectively switch the selected segments of light emitting diodes into the series light emitting diode current path to provide a corresponding lighting effect.

46. The apparatus of claim 44, wherein the controller is further configured to selectively switch the selected segments of light emitting diodes into the series light emitting diode current path to provide a corresponding color temperature.

47. The apparatus of claim 24, wherein the apparatus is configured to operate at a rectified AC voltage frequency of substantially about 100 Hz, 120 Hz, 300 Hz, 360 Hz, or 400 Hz.

48. The apparatus of claim 24, further comprising:
a plurality of phosphor coatings or layers, wherein each phosphor coating or layer is coupled to a corresponding light emitting diode of the plurality of light emitting diodes, and wherein each phosphor coating or layer includes a luminous decay time constant between about 2 to 3 msec.

49. An apparatus couplable to receive an AC voltage, the apparatus comprising:
a first plurality of light emitting diodes coupled in series, wherein the first plurality of light emitting diodes form a first plurality of segments of light emitting diodes, and wherein the first plurality of segments of light emitting diodes are coupled in series;
a first plurality of switches coupled to the first plurality of segments of light emitting diodes and configured to switch a selected segment of light emitting diodes into or out of a first series light emitting diode current path in response to a control signal;
a current sensor configured to determine a light emitting diode current level; and
a controller coupled to the first plurality of switches and to the current sensor, wherein the controller is configured to:
during a first part of an AC voltage interval and in response to the light emitting diode current level, generate a first control signal to switch a corresponding segment of light emitting diodes of the first plurality of segments of light emitting diodes into the first series light emitting diode current path; and
during a second part of the AC voltage interval and in response to the light emitting diode current level, switch the corresponding segment of light emitting diodes of the first plurality of segments of light emitting diodes out of the first series light emitting diode current path.

50. The apparatus of claim 49, wherein the controller is further configured to maintain the light emitting diode current level substantially constant at a first predetermined current level.

51. The apparatus of claim 49, further comprising:
a plurality of resistors, wherein each resistor of the plurality of resistors is coupled in series to a corresponding switch of the first plurality of switches.

52. The apparatus of claim 51, wherein each resistor is coupled on a high voltage side of the corresponding switch.

53. The apparatus of claim 51, wherein each resistor is coupled on a low voltage side of the corresponding switch.

54. The apparatus of claim 49, further comprising:
a switch and a resistor coupled in series with a segment of light emitting diodes of the first plurality of segments of light emitting diodes.

55. The apparatus of claim 49, wherein a last segment of light emitting diodes of the first plurality of segments of light emitting diodes is always coupled into the first series light emitting diode current path.

56. The apparatus of claim 49, wherein the controller is coupled to the first plurality of segments of light emitting diodes and configured to receive corresponding node voltage levels.

57. The apparatus of claim 49, further comprising a rectifier configured to provide a rectified AC voltage, wherein a switch of the first plurality of switches is coupled to the rectifier and configured to receive the rectified AC voltage.

58. The apparatus of claim 49, further comprising:
a second plurality of light emitting diodes coupled in series, wherein the second plurality of light emitting diodes form a second plurality of segments of light emitting diodes, and wherein the second plurality of segments of light emitting diodes are coupled in series; and
a second plurality of switches coupled to the second plurality of segments of light emitting diodes and configured to switch a selected segment of the second plurality of segments of light emitting diodes into or out of a second series light emitting diode current path;
wherein the controller is coupled to the second plurality of switches and is further configured to generate corresponding control signals to switch a plurality of segments of the second plurality of segments of light emitting diodes to form the second series light emitting diode current path in parallel with the first series light emitting diode current path.

59. The apparatus of claim 58, wherein the second series light emitting diode current path has a polarity opposite the first series light emitting diode current path.

60. The apparatus of claim 58, wherein a first current flow through the first series light emitting diode current path has an opposite direction to a second current flow through the second series light emitting diode current path.

61. The apparatus of claim 49, further comprising:
a current-limiting circuit.

62. The apparatus of claim 49, further comprising:
a dimming-interface circuit.

63. The apparatus of claim 49, further comprising:
a DC power source circuit coupled to the controller.

64. The apparatus of claim 49, further comprising:
a temperature-protection circuit.

65. A computer-readable storage medium having instructions stored thereon that, in response to execution by at least one computing device, cause the at least one computing device to:
monitor a first parameter;
during a first part of an AC voltage interval, in response to the first parameter having reached a first predetermined current level, switch a corresponding segment of one or more light emitting diodes from a plurality of segments of series coupled light emitting diodes into a series light emitting diode current path; and
during a second part of the AC voltage interval, in response to the first parameter having decreased to a second predetermined current level, switch the corresponding segment of one or more light emitting diodes out of the series light emitting diode current path.

66. The computer-readable storage medium of claim 65, wherein the first parameter is the current level of the series light emitting diode current path.

67. The computer-readable storage medium of claim 66, wherein the instructions further cause the at least one computing device to maintain the current level of the series light emitting diode current path substantially constant at the first predetermined current level.

68. The computer-readable storage medium of claim 66, wherein the instructions further cause the at least one computing device to, during the first part of the AC voltage interval, in response to the first parameter having reached a third predetermined current level, switch a next corresponding segment of one or more light emitting diodes into the series light emitting diode current path.

69. The computer-readable storage medium of claim 66, wherein the instructions further cause the at least one computing device to, during the second part of the AC voltage interval, in response to the first parameter having decreased to a fourth predetermined current level, switch a next corresponding segment of one or more light emitting diodes out of the series light emitting diode current path.

70. The computer-readable storage medium of claim 66, wherein the instructions further cause the at least one computing device to:
during the first part of the AC voltage interval, as a light emitting diode current successively reaches a predetermined peak current level, successively switch the corresponding segment of one or more light emitting diodes into the series light emitting diode current path; and
during the second part of the AC voltage interval, as an AC voltage level decreases to a corresponding voltage level, switch the corresponding segment of one or more light emitting diodes out of the series light emitting diode current path.

71. The computer-readable storage medium of claim 70, wherein the instructions further cause the at least one computing device to switch the corresponding segment of one or more light emitting diodes out of the series light emitting diode current path in a reverse order to the switching of the corresponding segment of one or more light emitting diodes into the series light emitting diode current path.

72. The computer-readable storage medium of claim 65, wherein the instructions further cause the at least one computing device to:
determine a first plurality of time intervals corresponding to a number of segments of one or more light emitting diodes for the first part of the AC voltage interval; and
determine a second plurality of time intervals corresponding to the number of segments of one or more light emitting diodes for the second part of the AC voltage interval.

73. The computer-readable storage medium of claim 72, wherein the instructions further cause the at least one computing device to:
during the first part of the AC voltage interval, at the expiration of each time interval of the first plurality of time intervals, switch a next segment of one or more light emitting diodes into the series light emitting diode current path; and
during the second part of the AC voltage interval, at the expiration of each time interval of the second plurality of time intervals, in a reverse order, switch the next segment of one or more light emitting diodes out of the series light emitting diode current path.

74. The computer-readable storage medium of claim 65, wherein the instructions further cause the at least one computing device to rectify the AC voltage to provide a rectified AC voltage.

75. The computer-readable storage medium of claim 65, wherein the instructions further cause the at least one computing device to determine whether the AC voltage is phase-modulated.

76. The computer-readable storage medium of claim 75, wherein the instructions further cause the at least one computing device to, in response to the AC voltage being phase-modulated, switch a segment of one or more light emitting diodes into the series light emitting diode current path which corresponds to a phase-modulated AC voltage level.

77. The computer-readable storage medium of claim 75, wherein the instructions further cause the at least one computing device to, in response to the AC voltage being phase-modulated, switch a segment of one or more light emitting diodes into the series light emitting diode current path which corresponds to a phase-modulated AC current level.

78. The computer-readable storage medium of claim 75, wherein the instructions further cause the at least one computing device to, in response to the AC voltage being phase-modulated, switch a segment of one or more light emitting diodes into the series light emitting diode current path which corresponds to a time interval of the phase-modulated AC voltage.

79. The computer-readable storage medium of claim 75, wherein the instructions further cause the at least one computing device to, in response to the AC voltage being phase-modulated, maintain a parallel light emitting diode current path through a first switch and concurrently switch a next segment of one or more light emitting diodes into the series light emitting diode current path through a second switch.

80. The computer-readable storage medium of claim 65, wherein the instructions further cause the at least one computing device to determine whether sufficient time remains in the first part of the AC voltage interval for a light emitting diode current to reach a predetermined peak current level if a next segment of one or more light emitting diodes is switched into the series light emitting diode current path.

81. The computer-readable storage medium of claim 80, wherein the instructions further cause the at least one computing device to, in response to sufficient time remaining in the first part of the AC voltage interval for the light emitting diode current to reach the predetermined peak current level, switch the next segment of one or more light emitting diodes into the series light emitting diode current path.

82. The computer-readable storage medium of claim 80, wherein the instructions further cause the at least one computing device to, in response to sufficient time not remaining in the first part of the AC voltage interval for the light emitting diode current to reach the predetermined peak current level, refrain from switching the next segment of one or more light emitting diodes into the series light emitting diode current path.

83. The computer-readable storage medium of claim 65, wherein the instructions further cause the at least one computing device to:
switch a first plurality of segments of series coupled light emitting diodes to form a first series light emitting diode current path; and
switch a second plurality of segments of series coupled light emitting diodes to form a second series light emitting diode current path in parallel with the first series light emitting diode current path.

84. The computer-readable storage medium of claim 65, wherein selected segments of one or more light emitting diodes of the plurality of segments of series coupled light emitting diodes each comprise light emitting diodes having light emission spectra of different colors or wavelengths.

85. The computer-readable storage medium of claim 84, wherein the instructions further cause the at least one computing device to selectively switch the selected segments of one or more light emitting diodes into the series light emitting diode current path to provide a corresponding lighting effect.

86. The computer-readable storage medium of claim 84, wherein the instructions further cause the at least one computing device to selectively switch the selected segments of one or more light emitting diodes into the series light emitting diode current path to provide a corresponding color temperature.

\* \* \* \* \*

UNITED STATES PATENT AND TRADEMARK OFFICE
CERTIFICATE OF CORRECTION

PATENT NO. : 8,410,717 B2
APPLICATION NO. : 12/729081
DATED : April 2, 2013
INVENTOR(S) : Shteynberg et al.

Page 1 of 1

It is certified that error appears in the above-identified patent and that said Letters Patent is hereby corrected as shown below:

In the Specification

In Column 43, Line 30, delete "minor)" and insert -- mirror) --, therefor.

In the Claims

In Column 60, Lines 43-44, in Claim 36, delete "controlled further" and insert -- controller --, therefor.

Signed and Sealed this
Twenty-second Day of October, 2013

Teresa Stanek Rea
*Deputy Director of the United States Patent and Trademark Office*